US012487558B2

(12) United States Patent
Konno et al.

(10) Patent No.: US 12,487,558 B2
(45) Date of Patent: Dec. 2, 2025

(54) IMAGE FORMING APPARATUS WITH INTERLOCKING MECHANISM FOR A SHUTTER MEMBER BLOCKING AN OPTICAL PATH OF A LASER BEAM

(71) Applicant: CANON KABUSHIKI KAISHA, Tokyo (JP)

(72) Inventors: Yuya Konno, Shizuoka (JP); Keita Sato, Shizuoka (JP); Satoshi Koga, Shizuoka (JP); Hiroki Ichimura, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 18/582,470

(22) Filed: Feb. 20, 2024

(65) Prior Publication Data

US 2024/0280936 A1 Aug. 22, 2024

(30) Foreign Application Priority Data

Feb. 21, 2023 (JP) ................................ 2023-025586

(51) Int. Cl.
*G03G 15/04* (2006.01)
*G03G 15/043* (2006.01)
*G03G 21/16* (2006.01)
*G03G 21/18* (2006.01)

(52) U.S. Cl.
CPC ....... *G03G 21/1832* (2013.01); *G03G 15/043* (2013.01); *G03G 21/1633* (2013.01); *G03G 21/1647* (2013.01); *G03G 2215/0404* (2013.01); *G03G 2221/1609* (2013.01); *G03G 2221/1654* (2013.01)

(58) Field of Classification Search
CPC ............. G03G 15/043; G03G 21/1633; G03G 21/1647; G03G 21/1666; G03G 21/1832; G03G 2215/0404; G03G 2221/1609; G03G 2221/1654
See application file for complete search history.

(56) References Cited

U.S. PATENT DOCUMENTS 5,729,796 A * 3/1998 Miura ............................ 399/114
2015/0362856 A1* 12/2015 Murakami .................... 399/110

FOREIGN PATENT DOCUMENTS

JP 2007-219269 8/2007
JP 2009-288310 12/2009

* cited by examiner

*Primary Examiner* — Sophia S Chen
(74) *Attorney, Agent, or Firm* — Venable LLP

(57) ABSTRACT

An image forming apparatus includes an apparatus body having an opening portion, an opening/closing member, a first unit configured to be attachable to and detachable from the apparatus body via the opening portion, a second unit configured to be attachable to and detachable from the apparatus body via the opening portion, an exposure unit provided in the apparatus body, a shutter member provided in the apparatus body and configured to move to a blocking position and a non-blocking position, and an interlocking mechanism provided in the apparatus body and configured to operate in an interlocking manner with the first unit, the second unit, and the opening/closing member. The interlocking mechanism is configured to position the shutter member at the non-blocking position in a state where the first unit and the second unit are attached to the apparatus body and the opening/closing member is positioned at the closed position.

19 Claims, 46 Drawing Sheets

IMAGE FORMING APPARATUS WITH INTERLOCKING MECHANISM FOR A SHUTTER MEMBER BLOCKING AN OPTICAL PATH OF A LASER BEAM

BACKGROUND OF THE INVENTION

Field of the Invention

The present technology relates to an image forming apparatus that forms an image on a recording material.

Description of the Related Art

In an electrophotographic image forming apparatus, an exposure unit irradiates a photosensitive member with light to form an electrostatic latent image on the photosensitive member. JP 2009-288310 A describes that a shutter member moves to a closing position where an optical path from an exposure unit to a photosensitive drum is blocked and an opening position where the optical path is not blocked in conjunction with opening and closing of an opening/closing member that is opened and closed in a case where a process cartridge is attached to and detached from an apparatus body of an image forming apparatus.

On the other hand, JP 2007-219269 A discloses an image forming apparatus including a process cartridge and a toner cartridge attachable to and detachable from an apparatus body of the image forming apparatus.

SUMMARY OF THE INVENTION

According to one aspect of the invention, an image forming apparatus includes an apparatus body having an opening portion, an opening/closing member configured to move with respect to the apparatus body between a closed position where the opening/closing member closes the opening portion and an open position where the opening portion is opened, a first unit that includes a photosensitive member and is configured to be attachable to and detachable from the apparatus body via the opening portion in a state where the opening/closing member is positioned at the open position, a second unit configured to be attachable to and detachable from the apparatus body via the opening portion in a state where the opening/closing member is positioned at the open position, an exposure unit provided in the apparatus body and configured to irradiate the photosensitive member with a laser beam to expose the photosensitive member, a shutter member provided in the apparatus body and configured to move to a blocking position where the shutter member blocks an optical path of the laser beam from the exposure unit toward the photosensitive member and a non-blocking position where the shutter member does not block the optical path, and an interlocking mechanism provided in the apparatus body and configured to operate in an interlocking manner with the first unit, the second unit, and the opening/closing member, wherein the interlocking mechanism is configured to position the shutter member at the non-blocking position in a state where the first unit and the second unit are attached to the apparatus body and the opening/closing member is positioned at the closed position, and wherein the shutter member is configured to be positioned at the blocking position in each of a case where the first unit is not attached to the apparatus body, a case where the second unit is not attached to the apparatus body, and a case where the opening/closing member is positioned at the open position.

Further features of the present invention will become apparent from the following description of exemplary embodiments with reference to the attached drawings.

DESCRIPTION OF THE EMBODIMENTS

Hereinafter, embodiments according to the present disclosure will be described with reference to the drawings.

First Embodiment

Figure 1:
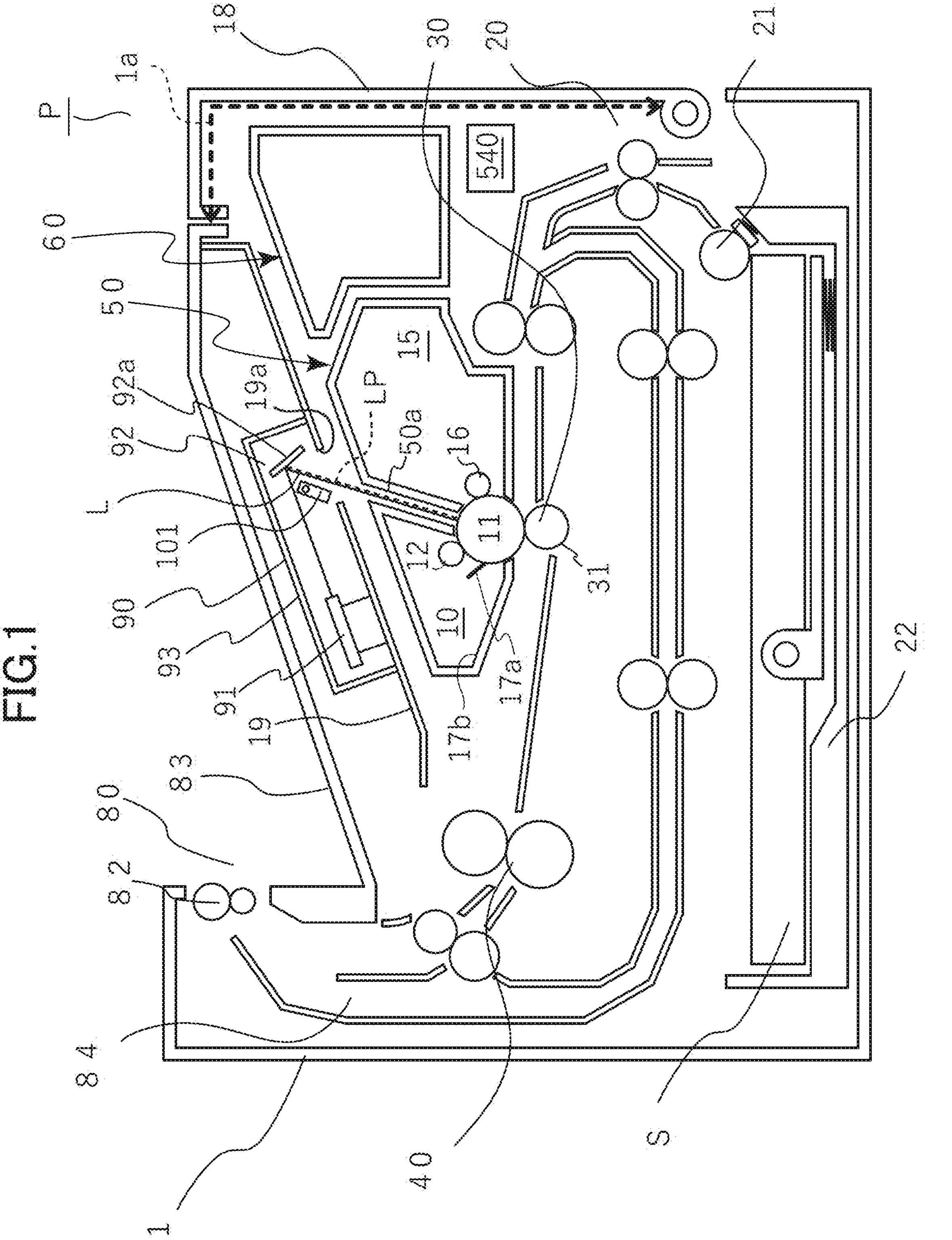
FIG. 1 is a schematic view of an image forming apparatus according to a first embodiment.

A first embodiment which is an embodiment of the present disclosure will be described. FIG. 1 is a cross-sectional view illustrating a schematic configuration of a printer P as an image forming apparatus according to a first embodiment. The printer P is a monochrome laser printer that forms an image on the sheet S based on image information received from the outside. As the sheet S as a recording material, various sheet materials having different sizes and materials, such as paper such as plain paper and thick paper, a sheet material subjected to surface treatment such as coated paper, a sheet material having a special shape such as an envelope and index paper, a plastic film, and cloth, can be used.

Outline of Image Forming Apparatus

As illustrated in FIG. 1, the printer P includes an image forming apparatus body (apparatus body 1), a door 18, and a process cartridge 50 and a toner cartridge 60 that are detachably attached to the apparatus body 1.

The apparatus body 1 has an opening portion 1*a*. The process cartridge 50 and the toner cartridge 60 are attached to and detached from the apparatus body 1 via the opening portion 1*a*. The process cartridge 50 is an example of a first unit that is detachably attached to the apparatus body 1. The toner cartridge 60 is an example of a second unit that is detachably attached to the apparatus body 1. In the present embodiment, the apparatus body 1 means a casing that includes a frame body and an exterior of the printer P and in which an attachment space for the process cartridge 50 and the toner cartridge 60 is formed.

The process cartridge 50 includes a photosensitive drum 11 as a photosensitive member (image bearing member) and at least one process member that acts on the photosensitive drum 11. In the photosensitive drum 11, a photosensitive layer is formed of an organic photosensitive member or the like on a drum-shaped (cylindrical) base. The process cartridge 50 is a unit (cartridge) in which a plurality of members are configured to be collectively detachable from the apparatus body 1. The process cartridge 50 of the present embodiment includes, as process members, a charging roller 12 as a charging member and a developing roller 16 as a developing member (developer bearing member).

The process cartridge 50 of the present embodiment includes a drum unit 10 including a photosensitive drum 11 and a charging roller 12, and a developing unit 15 including a developing roller 16. The developing unit 15 further includes a toner storage (developing container) that stores toner as a developer, and a receiving port that receives the toner so as to enable toner supply from the toner cartridge 60 to the toner storage. The drum unit 10 further includes a cleaning member 17*a* that cleans the surface of the photosensitive drum 11, and a waste toner storage 17*b* that stores the waste toner collected by the cleaning member 17*a*.

The toner cartridge 60 includes a storage unit (first storage unit) that stores developer (toner for supply) to be supplied to the process cartridge 50, and a supply mechanism that supplies the toner in the storage unit to the developing unit 15.

The toner cartridge 60 of the present embodiment includes a waste toner collection unit that collects waste toner from the process cartridge 50. The waste toner collection unit includes, for example, a receiving port for receiving waste toner discharged from the drum unit 10 of the process cartridge 50, and a storage unit (second storage unit) for waste toner separated from a storage unit (first storage unit) for supplying toner. That is, the toner cartridge 60 is a toner cartridge (supply container) that stores a developer for supply, and also serves as a waste toner cartridge that collects waste toner. Note that the toner cartridge and the waste toner cartridge may be separate units, and may be independently attachable to and detachable from the apparatus body 1.

The door 18 is an opening/closing member movable between a closed position (position in FIG. 1) where the opening portion 1*a* of the apparatus body 1 is closed and an open position where the opening portion 1*a* is opened. The process cartridge 50 and the toner cartridge 60 are allowed to be attached to and detached from the apparatus body 1 via the opening portion 1*a* in a state where the door 18 is positioned at the open position. The toner cartridge 60 is allowed to be attached to and detached from the apparatus body 1 in a state where the process cartridge 50 is attached to the apparatus body 1. In a state where the door 18 is positioned at the closed position, the outer surface of the door 18 forms a part of the exterior surface of the printer P. In addition, in a state where each of the process cartridge 50 and the toner cartridge 60 is attached to a predetermined attachment position in the apparatus body and the door 18 is positioned at the closed position, the printer P can execute an image forming operation described later.

The apparatus body 1 includes a sheet feeding unit 20, a transfer unit 30, a fixing unit 40, a sheet discharge unit 80, a laser scanner 90, a shutter 101, a shutter opening/closing mechanism 120 (FIG. 2A), and a control unit 540.

The sheet feeding unit 20 includes a cassette 22 as a stacking portion (storage portion) on which the sheet S is stacked and stored, and a feeding roller 21 as a feeding unit that feeds the sheet S. The transfer unit 30 is formed by the photosensitive drum 11 of the process cartridge 50 and the transfer roller 31 facing the photosensitive drum 11. The fixing unit 40 includes a fixing roller and a pressure roller that nip and convey the sheet S, and a heating unit such as a halogen lamp that heats the fixing roller. The sheet discharge unit 80 includes a sheet discharge roller pair 82 as a discharge unit that discharges the sheet S to the outside of the apparatus body 1. The apparatus body 1 includes a sheet discharge tray 83 on which the sheet S discharged from the sheet discharge unit 80 is stacked.

The laser scanner 90 is an example of an exposure unit (optical unit) that irradiates the photosensitive drum 11 with laser beam to expose the photosensitive drum 11. The laser scanner 90 of the present embodiment includes a light emitter (light source) 91 that emits the laser beam L, an optical system 92 that irradiates the photosensitive drum 11 with the laser beam L emitted by the light emitter 91, and a case 93 that stores the light emitter 91 and the optical system 92. The optical system 92 includes a mirror 92*a* facing the photosensitive drum 11. The optical system 92 includes a polygon mirror, an fθ lens, and the like in addition to the mirror 92*a*.

In the present embodiment, the mirror 92*a* and the photosensitive drum 11 face each other via the first opening 19*a* provided in the frame 19 of the apparatus body 1 and the second opening 50*a* provided in the process cartridge 50. That is, an optical path LP through which the laser beam L reflected by the mirror 92*a* reaches the surface of the photosensitive drum 11 through the first opening 19*a* and the second opening 50*a* is formed between the mirror 92*a* and the photosensitive drum 11. The frame 19 is a part of the frame body of the apparatus body 1. The laser scanner 90 is supported by the frame 19.

The shutter 101 is a shutter member movable between a non-blocking position at which the optical path LP is not blocked (open position at which the optical path LP is opened, position in FIG. 1) and a blocking position at which the shutter 101 blocks the optical path LP. The laser beam L emitted by the laser scanner 90 can reach the photosensitive drum 11 in a state where the shutter 101 is positioned at the non-blocking position. That is, the exposure of the photosensitive drum 11 becomes possible in a state where the shutter 101 is positioned at the non-blocking position. In a state where the shutter 101 is positioned at the blocking position, the laser beam L is blocked by the shutter 101 and does not substantially reach the photosensitive drum 11. That is, the exposure of the photosensitive drum 11 is not performed in a state where the shutter 101 is positioned at the blocking position.

The shutter opening/closing mechanism 120 (FIG. 2A) is an example of an interlocking mechanism that interlocks with the door 18, the process cartridge 50, and the toner cartridge 60. Specific configurations of the shutter 101 and the shutter opening/closing mechanism 120 will be described later. In the present disclosure, "interlocking" means that a plurality of members is mechanically interlocked so that movement of some members causes movement of other members.

The control unit 540 controls the operation of each unit of the printer P. The control unit 540 includes at least one processor (CPU) that executes a program and a storage device as a non-transitory storage medium that stores the program and data. When the processor reads and executes the program from the storage device, the operation of the printer P exemplifying the image forming operation is realized.

Image Forming Operation

An image forming operation performed by the printer P will be described. The printer P starts an image forming operation when the control unit 540 receives image information from the outside.

When the image forming operation is started, the photosensitive drum 11 is rotationally driven by a driving source provided in the apparatus body 1. The charging roller 12 uniformly charges the surface of the photosensitive drum 11 to a predetermined potential. The laser scanner 90 irradiates the photosensitive drum 11 with the laser beam L according to a video signal generated based on the image information, and exposes the photosensitive drum 11. As a result, charges are removed from the surface of the photosensitive drum 11, and an electrostatic latent image is formed. The developing roller 16 is rotated while bearing toner, and supplies the toner to a developing unit in which the developing roller 16 and the photosensitive drum 11 face each other. As a result, the electrostatic latent image on the surface of the photosensitive drum 11 is developed into a toner image.

On the other hand, the sheet S is conveyed in parallel with the toner image forming operation. That is, the feeding roller 21 rotates, and the uppermost sheet S in the cassette 22 is separated one by one and fed. The fed sheet S is conveyed to the transfer unit 30 in accordance with the timing at which the toner image on the photosensitive drum 11 reaches the transfer unit 30. While the sheet S passes through the transfer unit 30, the toner image is transferred from the photosensitive drum 11 to the sheet S by the transfer roller 31 to which the transfer voltage is applied. The sheet S that has passed through the transfer unit 30 is conveyed to the fixing unit 40. The fixing unit 40 heats and pressurizes the toner image on the sheet S while nipping and conveying the sheet S between the fixing roller and the pressure roller. As a result, an image fixed to the sheet S is obtained.

In a case where an image is formed only on one surface of the sheet S, the sheet S having passed through the fixing unit 40 is discharged to the outside of the apparatus body 1 by the sheet discharge roller pair 82 and is stacked on the sheet discharge tray 83. In a case where images are formed on both surfaces of the sheet S, the sheet S having passed through the fixing unit 40 in a state where the toner image is transferred to the first surface is reversely conveyed (switched back) by the sheet discharge roller pair 82 and sent to the re-conveyance path 84. Then, after an image is formed on the second surface of the sheet S by passing through the transfer unit 30 and the fixing unit 40 again in a state where the first surface and the second surface are exchanged, the sheet S is discharged to the outside of the apparatus body 1 by the sheet discharge roller pair 82 and is stacked on the sheet discharge tray 83.

Shutter Member

The shutter 101 will be described. In the following description and each of FIG. 2A and subsequent drawings, a direction (rotation axis direction) of a rotation axis of the photosensitive drum 11 is referred to as an "X direction". The X direction may be referred to as a main scanning direction when the laser scanner 90 scans the surface of the photosensitive drum 11 with the laser beam L in order to expose the photosensitive drum 11.

Figure 2A:
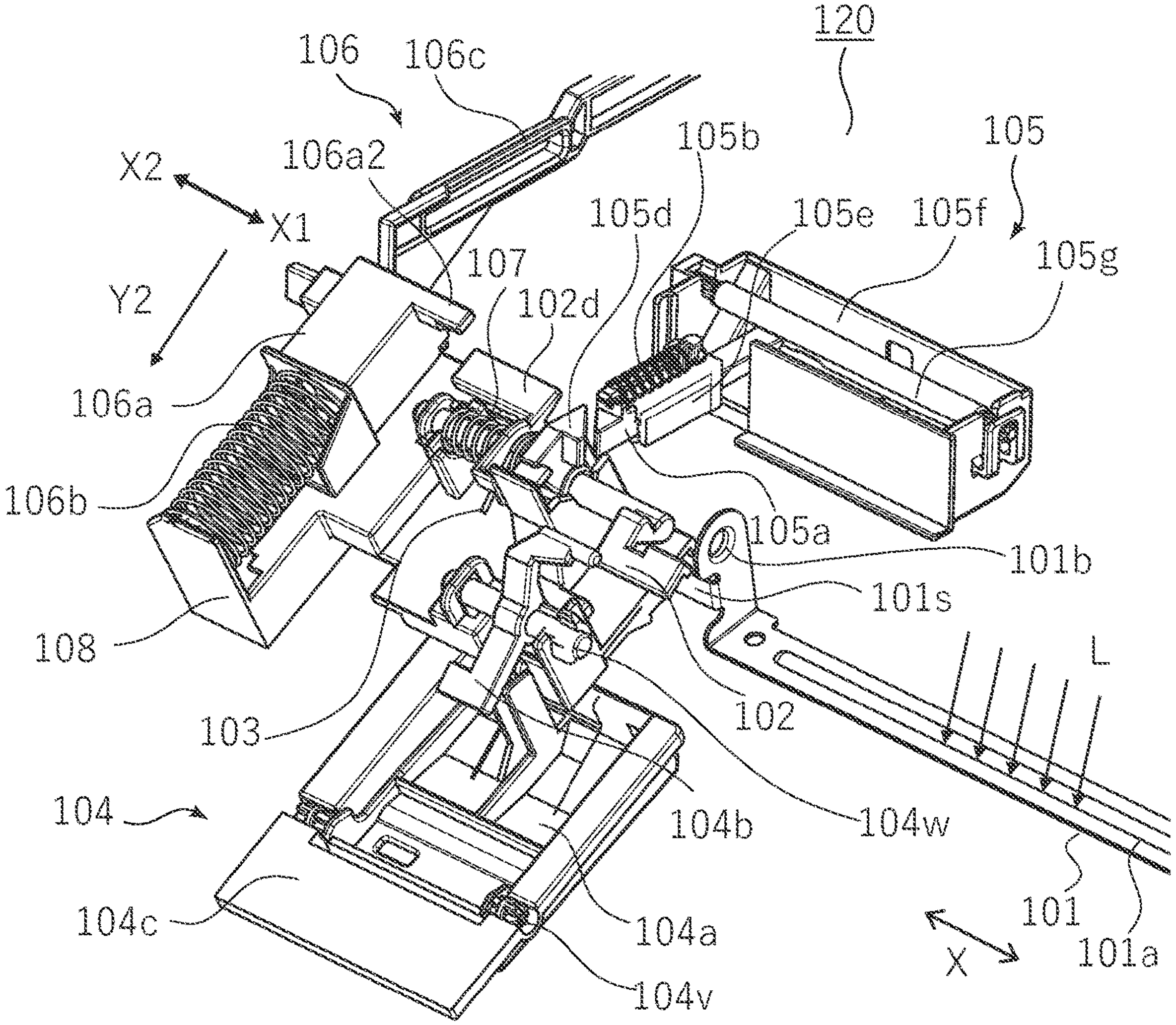
FIG. 2A is a view illustrating a shutter opening/closing mechanism according to the first embodiment.

As illustrated in FIG. 2A, the shutter 101 includes a blocking portion 101*a*, a hole 101*b* (supported portion) fitted in a boss shape provided in the laser scanner 90, and a contacting portion 10 is. Although one hole 101*b* is illustrated in the drawing, the hole 101*b* is arranged at both ends of the shutter 101 in the X direction.

The shutter 101 is rotatable (rotatable and swingable) about an axis in the X direction (a center line of a boss shape) passing through the hole 101*b*. The shutter 101 is movable to a non-blocking position at which the optical path LP from the laser scanner 90 toward the photosensitive drum 11 is opened and a blocking position at which the optical path LP is blocked. Among the rotation directions of the shutter 101, the rotation direction Ra from the blocking position to the non-blocking position (FIG. 2B) is referred to as a closing direction, and the rotation direction from the non-blocking position to the blocking position is referred to as an opening direction.

The blocking portion 101*a* is formed in a plate shape elongated in the X direction. When the shutter 101 is positioned at the blocking position, the blocking portion 101*a* intersects the optical path LP over the entire area of the optical path LP in the X direction. That is, when the shutter 101 is positioned at the blocking position, the blocking portion 101*a* blocks the optical path LP.

The contacting portion 101*s* is a portion that comes into contact with a shutter opening/closing member 102 of the shutter opening/closing mechanism 120 described later.

In a case where the laser beam L emitted from the light emitter 91 is constant, the amount of light emitted to the outside of the laser scanner 90 through the first opening 19*a* in a case where the shutter 101 is positioned at the blocking position is smaller than the amount of light in a case where the shutter 101 is positioned at the non-blocking position. The outside of the laser scanner 90 is a space outside a space surrounded by the case 93 and the frame 19 of the laser scanner 90 (an internal space of the laser scanner 90 in which the light emitter 91 is disposed). The door 18, the process cartridge 50, and the toner cartridge 60 have a function as an obstruct that suppresses leakage of the laser beam L to the outside of the printer P. Therefore, since the process cartridge 50 and the toner cartridge 60 are attached to the apparatus body 1 and the door 18 is positioned at the closed position, the possibility that the laser beam L leaks to the outside of the printer P when the shutter 101 is positioned at the non-blocking position can be further reduced.

Shutter Opening/Closing Mechanism

As illustrated in FIG. 2A, the shutter opening/closing mechanism 120 includes a shutter opening/closing member 102, a torsion coil spring 103, a compression spring 107, a P-link mechanism 104, a T-link mechanism 105, and a D-link mechanism 106.

The shutter opening/closing member 102 directly acts on the shutter 101 to move the shutter 101. The torsion coil spring 103 is an urging member that urges the shutter opening/closing member 102 in a predetermined rotation direction. The compression spring 107 is an urging member that urges the shutter opening/closing member 102 in a predetermined moving direction. The P-link mechanism 104 is configured to connect (couple) the process cartridge 50 and the shutter opening/closing member 102 in an interlocking manner. The T-link mechanism 105 is configured to connect (couple) the toner cartridge 60 and the shutter opening/closing member 102 in an interlocking manner. The D-link mechanism 106 is configured to connect (couple) the door 18 and the shutter opening/closing member 102 in an interlocking manner.

The shutter opening/closing member 102 is an example of a moving member that moves the shutter member. In the present embodiment, the shutter opening/closing member 102 moves the shutter member by coming into contact with the shutter member. The P-link mechanism 104 is an example of a first interlocking portion that moves the moving member in an interlocking manner with attachment of the first unit to the apparatus body. The T-link mechanism 105 is an example of a second interlocking portion that moves the moving member in an interlocking manner with attachment of the second unit to the apparatus body. The D-link mechanism 106 is an example of a third interlocking portion that moves the moving member in an interlocking manner with the movement of the opening/closing member from the open position to the closed position. In the present embodiment, by providing these moving members and the three interlocking portions, it is possible to move the shutter 101 interlocked with the process cartridge 50, the toner cartridge 60, and the door 18.

The torsion coil spring 103 is an example of a first urging member that urges the moving member, and the compression spring 107 is an example of a second urging member that urges the moving member in a direction different from the first urging member. As described in detail below, the P-link mechanism 104 as the first interlocking portion is configured to move the moving member against the urging force of the first urging member in an interlocking manner with the attachment of the first unit to the apparatus body. In addition, the T-link mechanism 105 as the second interlocking portion is configured to move the moving member against the urging force of the second urging member in an interlocking manner with attachment of the second unit to the apparatus body. This enables position control of the moving member in an interlocking manner with attachment of each of the first unit and the second unit.

Hereinafter, the configuration and operation of each unit of the shutter opening/closing mechanism 120 according to the first embodiment will be described with reference to FIGS. 2A to 6C.

FIGS. 2A to 2E are diagrams illustrating a state of the apparatus when both the process cartridge 50 and the toner cartridge 60 are not attached to the apparatus body 1 and the door 18 is at the open position. FIGS. 3A to 3C are diagrams illustrating a state of the apparatus when the process cartridge 50 is attached to the apparatus body 1, the toner cartridge 60 is not attached to the apparatus body 1, and the door 18 is at the open position. FIGS. 4A to 4D are diagrams illustrating a state of the apparatus when both the process cartridge 50 and the toner cartridge 60 are attached to the apparatus body 1 and the door 18 is at the open position. FIGS. 5A to 5D are diagrams illustrating a state of the apparatus when both the process cartridge 50 and the toner cartridge 60 are attached to the apparatus body 1 and the door 18 is at the closed position. FIGS. 6A to 6C are diagrams illustrating a state of the apparatus when the process cartridge 50 is not attached to the apparatus body 1 and the toner cartridge 60 is attached to the apparatus body 1.

FIGS. 2A, 3A, 4A, 5A, and 6A are perspective views of the shutter 101 and the shutter opening/closing mechanism 120. FIGS. 2B, 3B, 4B, and 5B are views of the shutter 101 and the shutter opening/closing mechanism 120 as viewed in the X direction. FIGS. 2C, 3C, 4C, 5C, and 6B are views of the shutter 101 and the shutter opening/closing mechanism 120 as viewed from above. In FIGS. 2B, 2C, 3B, 3C, 4B, 4C, 5B, 5C, and 6B, illustration of a non-movable part such as a holder may be omitted for ease of understanding. In any of the drawings, in order to facilitate understanding, the appearance of the process cartridge 50 and the toner cartridge 60 is simplified, and the optical path of the laser beam L is represented by an arrow indicating a part of a light beam. Details of the other drawings will be described as necessary.

Shutter Opening/Closing Member

The shutter opening/closing member 102 will be described mainly with reference to FIGS. 2A, 2D, and 2E. FIG. 2D is a perspective view illustrating the shutter opening/closing member 102 and a part (T-cam 105*d*) of the T-link mechanism 105. FIG. 2E is a view of the shutter opening/closing member 102, the torsion coil spring 103, and the T-cam 105*d* as viewed from the upper side of FIG. 2B.

As illustrated in FIGS. 2D and 2E, the shutter opening/closing member 102 includes a shaft portion 102*a*, a shutter contact portion 102*s*, a P-link pressed portion 102*p*, a T-link pressed portion 102*t*, a D-link pressed portion 102*d*, and a spring holding portion 102*u*.

The shaft portion 102*a* is a shaft-shaped portion extending along the X direction. The shaft portion 102*a* is supported by a holder 108 (FIG. 2A) fixed to the frame body of the apparatus body 1 so as to be movable (linearly movable) in the X1 direction along the X direction and the opposite X2 direction, and so as to be rotatable in the R3 direction (FIG. 2B) and the opposite direction around the axis of the X direction. That is, the moving member (shutter opening/closing member 102) of the present embodiment has at least two degrees of freedom of movement, that is, linear movement in the first direction (X direction) and rotation in the rotation direction around the axis extending in the first direction.

The shutter contact portion 102*s* is a portion that contacts the contacting portion 101*s* of the shutter 101. The P-link pressed portion 102*p* is a force receiving portion (first force receiving portion) in which the shutter opening/closing member 102 receives a force from the P-link mechanism 104 (first interlocking portion). The T-link pressed portion 102*t* is a force receiving portion (second force receiving portion) in which the shutter opening/closing member 102 receives a force from the T-link mechanism 105 (second interlocking portion). The D-link pressed portion 102*d* is a force receiving portion (third force receiving portion) in which the shutter opening/closing member 102 receives a force from the D-link mechanism 106 (third interlocking portion). The functions of the pressed portions and the shutter contact portion 102*s* will be described later.

In the present embodiment, the shutter opening/closing member 102 is movable to the following five positions.

Figure 2B:
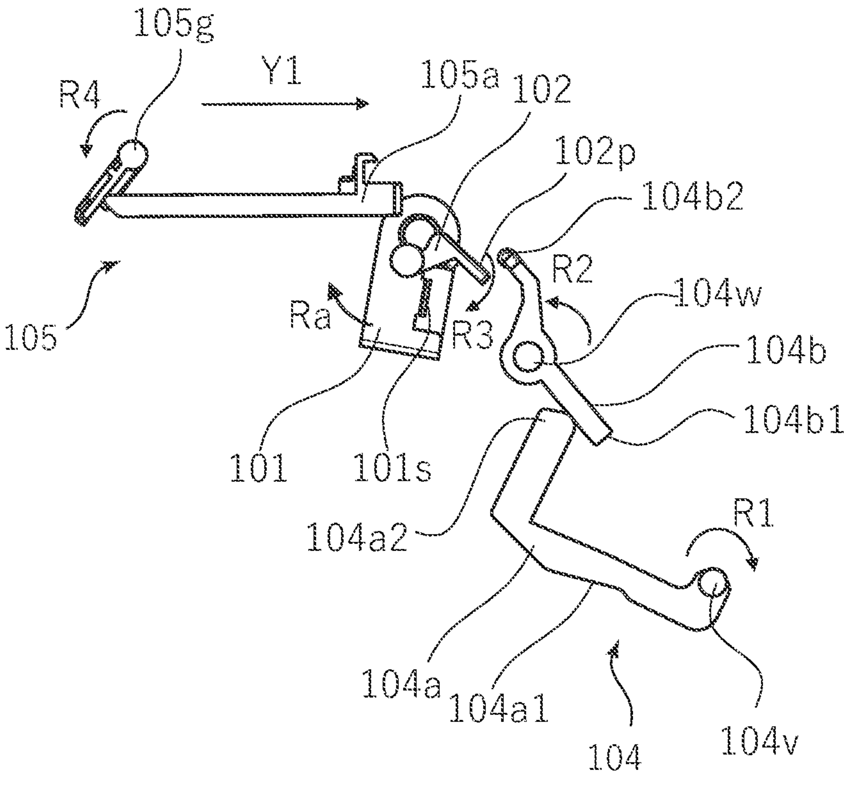
FIG. 2B is a view illustrating the shutter opening/closing mechanism according to the first embodiment.
Figure 2C:
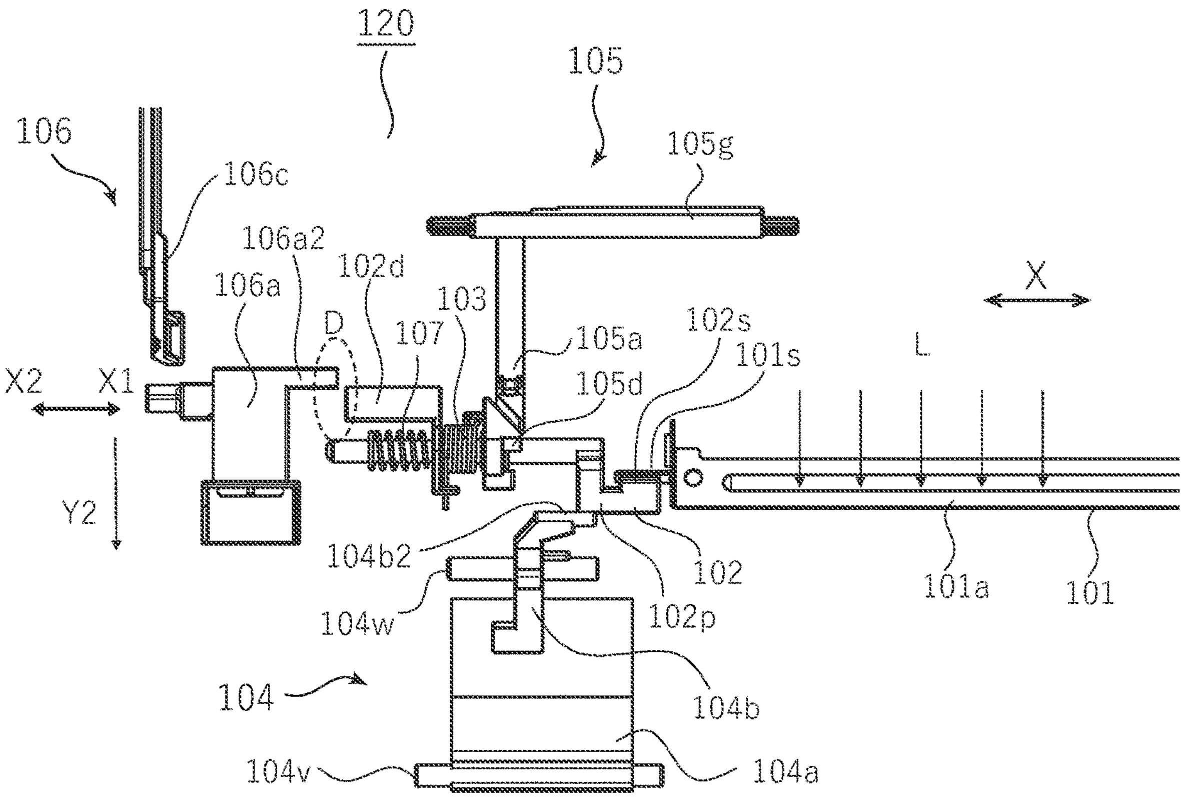
FIG. 2C is a view illustrating the shutter opening/closing mechanism according to the first embodiment.
Figure 2D:
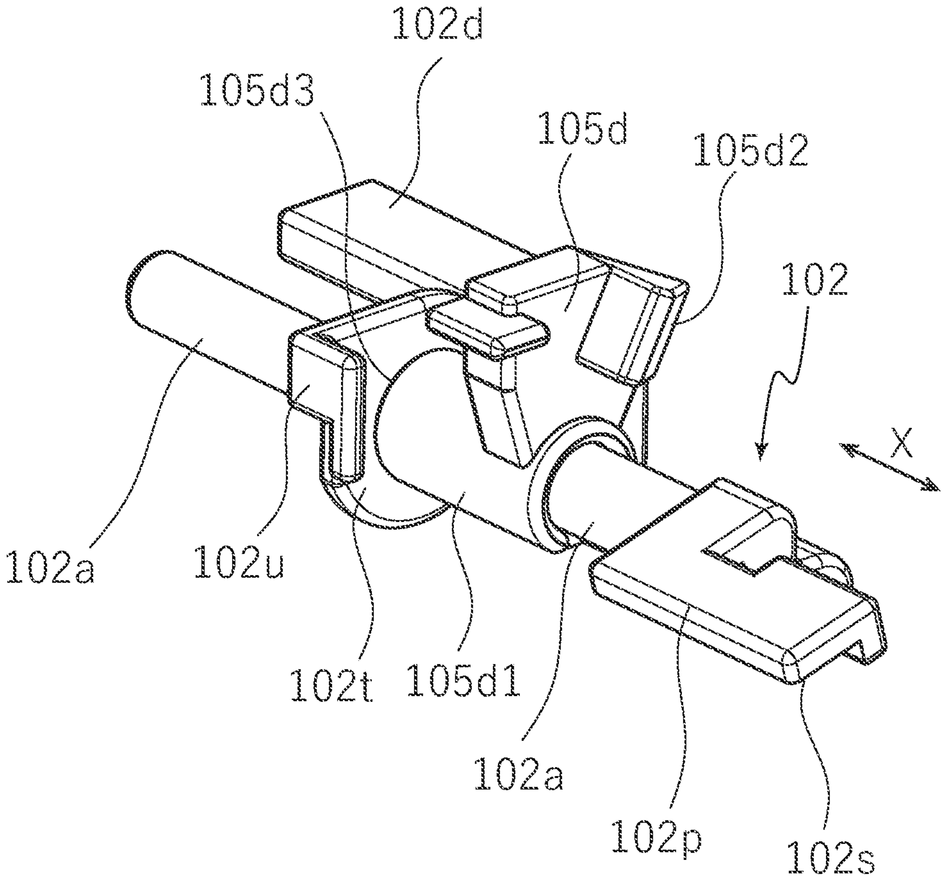
FIG. 2D is a view illustrating a part of the shutter opening/closing member and a T-link mechanism according to the first embodiment.
Figure 2E:
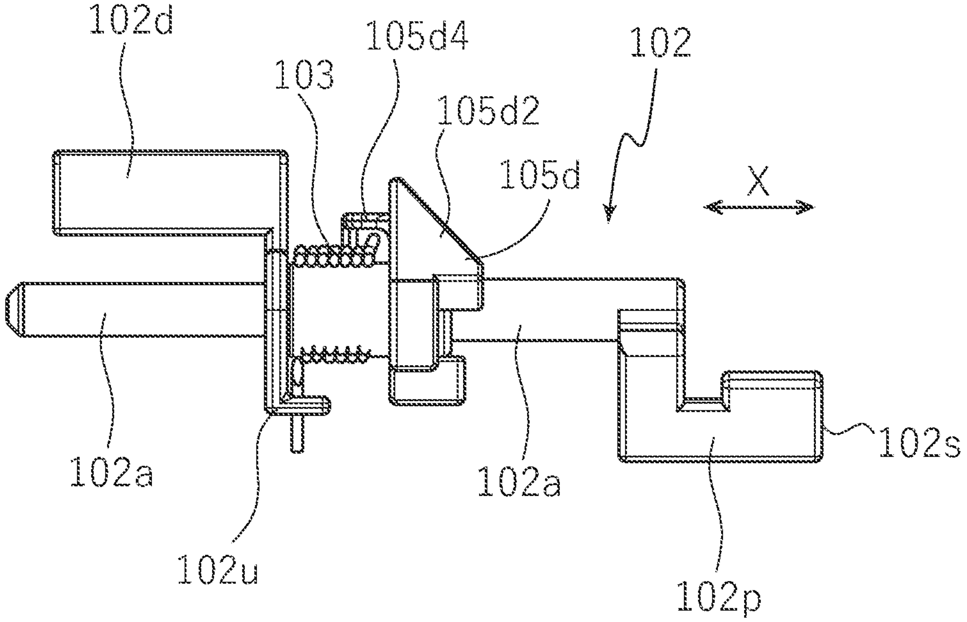
FIG. 2E is a view illustrating a part of the shutter opening/closing member and the T-link mechanism according to the first embodiment.
Figure 3A:
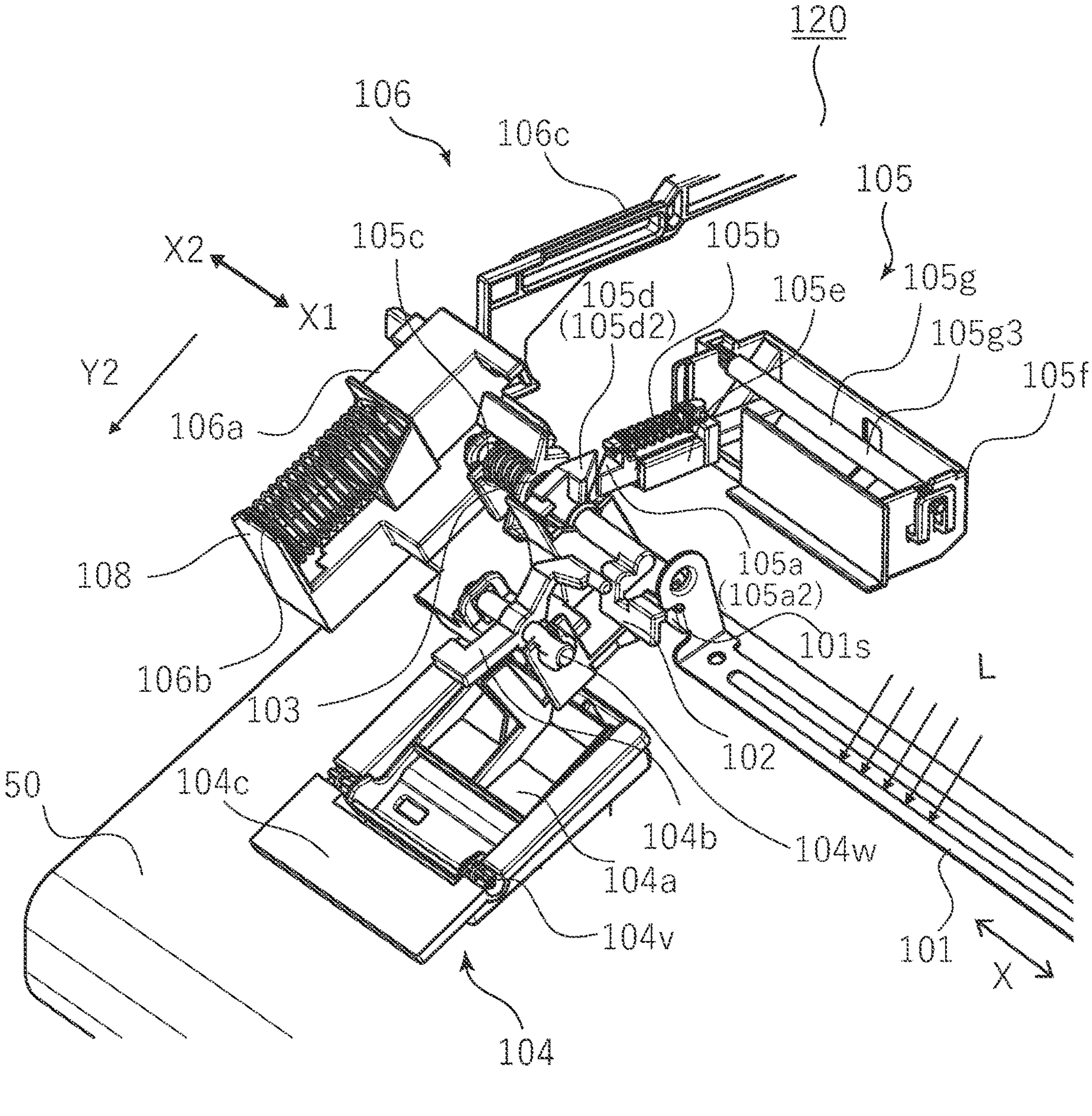
FIG. 3A is a view illustrating the shutter opening/closing mechanism according to the first embodiment.
Figure 3B:
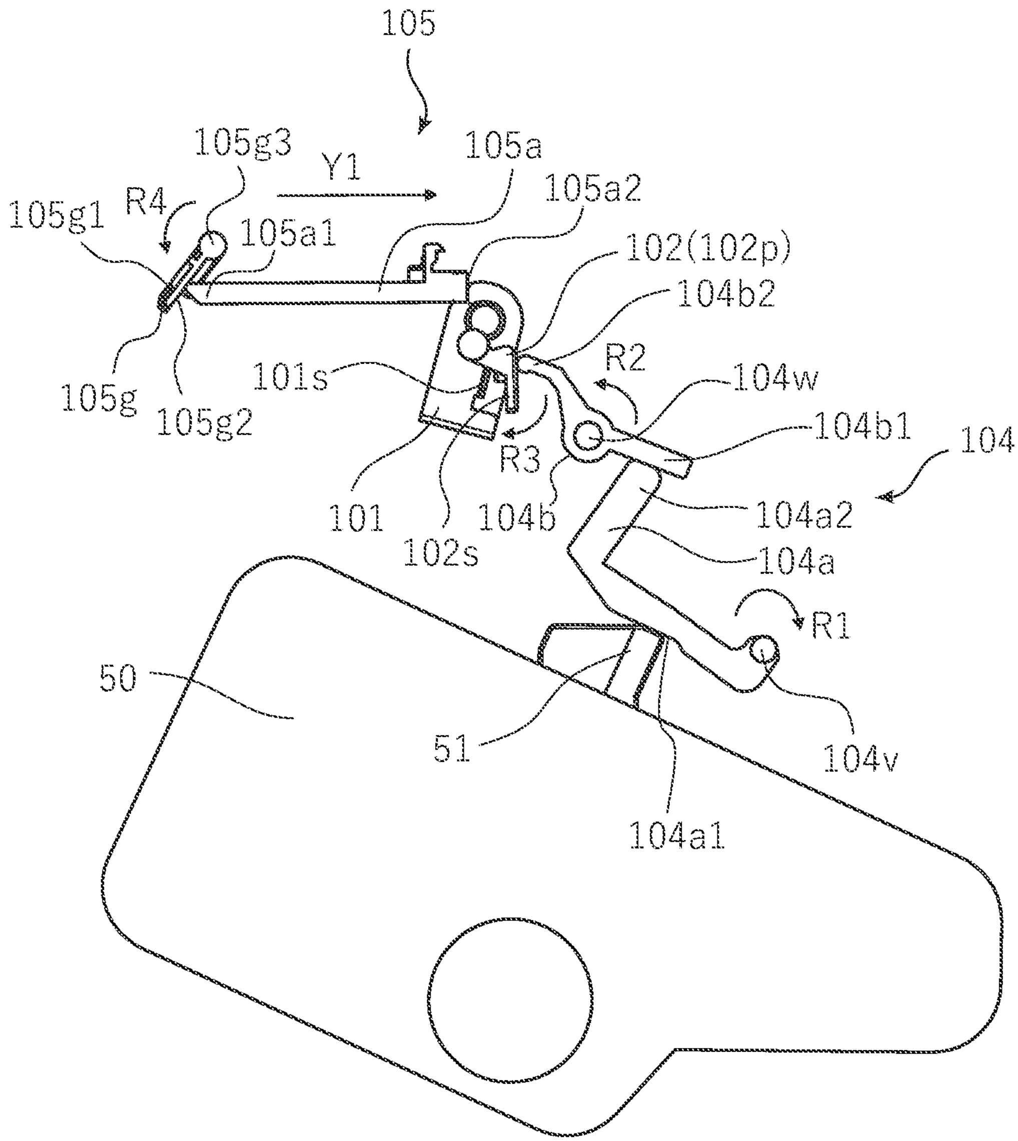
FIG. 3B is a view illustrating the shutter opening/closing mechanism according to the first embodiment.
Figure 3C:
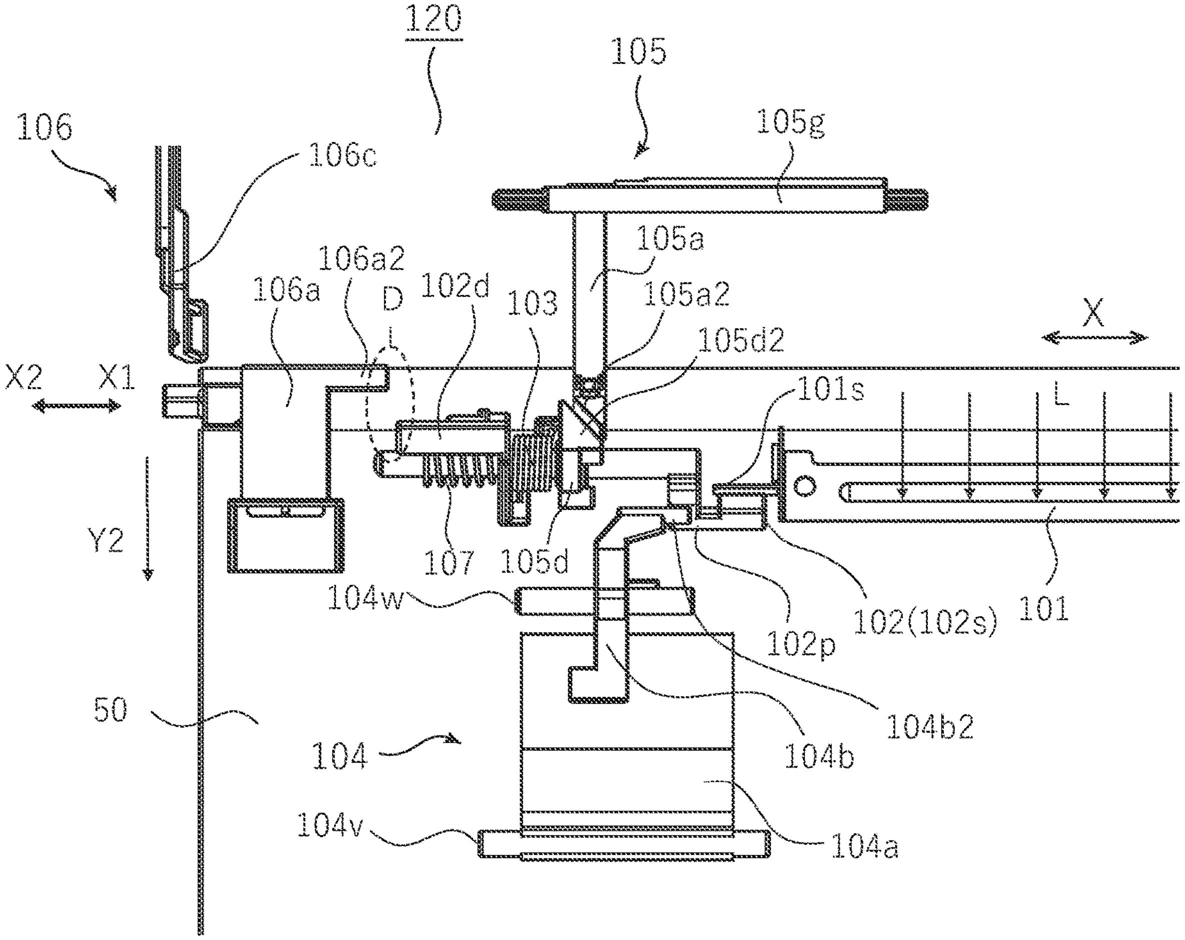
FIG. 3C is a view illustrating the shutter opening/closing mechanism according to the first embodiment.

First position: a position at which both the process cartridge 50 and the toner cartridge 60 are not attached to the apparatus body 1 and the door 18 is in the open position (FIGS. 2A to 2C).

Second position: a position at which the process cartridge 50 is attached to the apparatus body 1, the toner cartridge 60 is not attached to the apparatus body 1, and the door 18 is at the open position (FIGS. 3A to 3C).

Third position: a position at which both the process cartridge 50 and the toner cartridge 60 are attached to the apparatus body 1 and the door 18 is in the open position (FIGS. 4A to 4D).

Fourth position: a position at which both the process cartridge 50 and the toner cartridge 60 are attached to the apparatus body 1 and the door 18 is in the closed position (FIGS. 5A to 5D).

Fifth position: a position in a case where the process cartridge 50 is not attached to the apparatus body 1 and the toner cartridge 60 is attached to the apparatus body 1 (FIGS. 6A to 6C).

The shutter opening/closing member 102 is configured to move from the first position to the fourth position through the second position and the third position when the door 18 is closed after the process cartridge 50 and the toner cartridge 60 are attached to the apparatus body 1 in this order. The shutter opening/closing member 102 moves the shutter 101 from the blocking position to the non-blocking position when moving from the third position to the fourth position. When the shutter opening/closing member 102 is positioned at the fourth position, the shutter 101 is held at the non-blocking position.

When the shutter opening/closing member 102 is at a position other than the fourth position, the shutter 101 is configured to remain at the blocking position. The shutter 101 may be urged toward the blocking position by an urging member (a torsion coil spring or the like) (not illustrated). In addition, for example, in a case where the contacting portion 101*s* is not pressed by the shutter opening/closing member 102, the shutter 101 may remain at the blocking position by its own weight.

The shutter opening/closing member 102 is urged in a direction opposite to a rotation direction (direction R3 in FIG. 2B) from the first position to the second position by the torsion coil spring 103 (FIG. 2A). As illustrated in FIG. 2E, in the torsion coil spring 103, the shutter opening/closing member 102 has a coil portion attached around the shaft portion 102*a*. One end of the torsion coil spring 103 is held by the spring holding portion 102*u* of the shutter opening/closing member 102, and the other end of the torsion coil spring 103 is held by the spring holding portion 105*d*4 of the T-cam 105*d* described later.

Further, the shutter opening/closing member 102 is urged in a direction (X2 direction) opposite to the moving direction from the second position to the third position by the compression spring 107 (FIG. 2A).

The first position and the second position are the same position in the X direction, and the rotation angles of the shutter opening/closing member 102 at both positions are different. The second position and the third position are different positions in the X direction, and the rotation angles of the shutter opening/closing member 102 at both positions are the same. The third position and the fourth position are the same position in the X direction, and the rotation angles of the shutter opening/closing member 102 at both positions are different. The fifth position is the same position as the third position in the X direction and corresponds to a position at the same rotation angle as the first position.

In the present embodiment, the third position is a position where the shutter opening/closing member 102 can receive a force from the D-link mechanism 106 when the door 18 is closed after the process cartridge 50 and the toner cartridge 60 are attached. That is, the third position is an example of a predetermined position where the force receiving portion can receive the force from the third interlocking portion when the opening/closing member is moved from the open position to the closed position after the first unit and the second unit are attached.

As described below, in the process of attaching the process cartridge 50 and the toner cartridge 60 to the apparatus body 1, the P-link mechanism 104 (first interlocking portion) and the T-link mechanism 105 (second interlocking portion) move the shutter opening/closing member 102 to the third position (predetermined position). As a result, the shutter 101 is allowed to move in an interlocking manner with the door 18 only when both the process cartridge 50 and the toner cartridge 60 are attached to the apparatus body 1.

P-Link Mechanism

The P-link mechanism 104 interlocked with attachment and detachment of the process cartridge 50 will be described mainly with reference to FIGS. 2A to 2C and FIGS. 3A to 3C.

As illustrated in FIGS. 2A to 2C, the P-link mechanism 104 includes a P-flap 104*a* and a P-lever 104*b*. The P-flap 104*a* is configured to move by being brought into contact with a portion of the process cartridge 50. The P-lever 104*b* moves by being brought into contact with the P-flap 104*a*, and is configured to press the shutter opening/closing member 102.

The P-flap 104*a* includes a boss portion 104*v* rotatably supported by a holder 104*c* fixed to the frame body of the apparatus body 1, and a contacting portion 104*a*1 (FIG. 2B: first contacting portion) brought into contact with the process cartridge 50. In addition, the P-flap 104*a* has a lever contact portion 104*a*2 that comes into contact with the P-lever 104*b*. The P-flap 104*a* is rotatable about the boss portion 104*v*. The P-flap 104*a* of the present embodiment rotates about an axis extending substantially in the X direction.

The P-lever 104*b* includes a shaft portion 104*w* rotatably supported by the holder 108 fixed to the frame body of the apparatus body 1, and a contacting portion 104*b*1 (FIG. 2B) brought into contact with the lever contact portion 104*a*2 of the P-flap 104*a*. In addition, the P-lever 104*b* has a pressing portion 104*b*2 (first pressing portion) capable of pressing the P-link pressed portion 102*p* of the shutter opening/closing member 102. The P-lever 104*b* is rotatable about the shaft portion 104*w*. The P-lever 104*b* of the present embodiment rotates about an axis extending substantially in the X direction.

The operation of the P-link mechanism 104 when the process cartridge 50 is attached to the apparatus body 1 will be described.

In FIGS. 2A to 2C, the process cartridge 50 and the toner cartridge 60 are not attached to the apparatus body 1, and the door 18 is positioned at the open position. In this case, the shutter opening/closing member 102 is positioned at the first position, and the pressing portion 104*b*2 of the P-lever 104*b* is not in contact with the P-link pressed portion 102*p* of the shutter opening/closing member 102 (FIG. 2B). Further, since the shutter opening/closing member 102 is positioned at the first position, the shutter 101 is positioned at the blocking position.

As illustrated in FIGS. 3A to 3C, in the process of attaching the process cartridge 50 to the apparatus body 1, a part of the process cartridge 50 comes into contact with the P-flap 104*a*. Specifically, the rib 51 provided in the process cartridge 50 comes into contact with the contacting portion 104*a*1 of the P-flap 104*a* (FIG. 3B), and rotates the P-flap 104*a* in the R1 direction. Then, the lever contact portion 104*a*2 of the P-flap 104*a* comes into contact with the contacting portion 104*b*1 of the P-lever 104*b*, and rotates the P-lever 104*b* in the R2 direction. Further, the pressing portion 104*b*2 of the P-lever 104*b* presses the P-link pressed portion 102*p* of the shutter opening/closing member 102, and rotates the shutter opening/closing member 102 in the R3 direction. As a result, the shutter opening/closing member 102 moves from the first position to the second position.

That is, the P-link mechanism 104 moves the shutter opening/closing member 102 from the first position to the second position in an interlocking manner with the attachment of the process cartridge 50 to the apparatus body 1. In the present embodiment, the P-flap 104*a* and the P-lever 104*b* are separate components, but a portion coming into contact with the process cartridge 50 and a portion pressing the shutter opening/closing member 102 may be integrated.

In the process in which the shutter opening/closing member 102 moves from the first position to the second position, the shutter contact portion 102*s* of the shutter opening/closing member 102 does not come into contact with the contacting portion 101*s* of the shutter 101. Therefore, the shutter 101 remains at the blocking position at which the laser beam L is blocked (FIG. 3A). Further, even when the shutter opening/closing member 102 moves (rotates) from the first position (FIG. 2C) to the second position (FIG. 3C), the position of the shutter opening/closing member 102 in the X direction does not change.

When the process cartridge 50 is removed from the apparatus body 1 in the state of FIGS. 3A to 3C, the shutter opening/closing member 102 moves from the second position to the first position in a process opposite to the above-described operation.

T-Link Mechanism

The T-link mechanism 105 interlocked with attachment and detachment of the toner cartridge 60 will be described mainly with reference to FIGS. 3A to 3C and FIGS. 4A to 4C.

As illustrated in FIGS. 3A to 3C, the T-link mechanism 105 includes a T-flap 105*g*, a T-slider 105*a*, and a T-cam 105*d*. The T-flap 105*g* is configured to move by being brought into contact with a part of the toner cartridge 60. The T-slider 105*a* moves by being brought into contact with the T-flap 105*g*, and is configured to be brought into contact with the T-cam 105*d*. The T-cam 105*d* is configured to move by being brought into contact with the T-slider 105*a* and to press the shutter opening/closing member 102.

The T-flap 105*g* includes a shaft portion 105*g*3, a contacting portion 105*g*1 (FIG. 3B: second contacting portion) coming into contact with the toner cartridge 60, and a slider contact portion 105*g*2 coming into contact with the T-slider 105*a*. The shaft 105*g*3 is rotatably supported by holder 105*f* (FIG. 3A) fixed to the frame body of apparatus body 1. The T-flap 105*g* is rotatable about the shaft portion 105*g*3. The T-flap 105*g* of the present embodiment rotates about an axis extending substantially in the X direction.

The T-slider 105*a* includes a contacting portion 105*a*1 (FIG. 3B) coming into contact with the slider contact portion

105g2 of the T-flap 105g and a cam surface 105a2 (FIG. 3C) coming into contact with the T-cam 105d. The T-slider 105a is movably supported in the Y1 direction and the opposite direction by a holder 105e fixed to the frame body of the apparatus body 1. The Y1 direction is a direction intersecting (preferably orthogonal to) the X direction. The T-slider 105a is urged in the opposite direction of the Y1 direction by a tension spring 105b (FIG. 3A).

The T-cam 105d has a cylindrical portion 105d1 (FIG. 2D) externally fitted to the shaft portion 102a of the shutter opening/closing member 102 and a contacting surface 105d2 (FIGS. 2D and 3A) brought into contact with a cam surface 105a2 of the T-slider 105a. In addition, the T-cam 105d includes a pressing portion 105d3 (FIG. 2D: second pressing portion) capable of pressing the T-link pressed portion 102t of the shutter opening/closing member 102, and a spring holding portion 105d4 (FIG. 2E) that holds the end of the torsion coil spring 103 described above.

The T-cam 105d can move the shutter opening/closing member 102 in the X direction by receiving a force in the X direction at the contact portion between the cam surface 105a2 of the T-slider 105a and the contacting surface 105d2. In addition, the T-cam 105d allows the shutter opening/closing member 102 to rotate relative to the T-cam 105d.

The shutter opening/closing member 102 is urged by the compression spring 107 so as to be pressed against the T-cam 105d in the X direction. Therefore, the T-cam 105d and the shutter opening/closing member 102 move in the X2 direction while maintaining the state in which the pressing portion 105d3 and the T-link pressed portion 102t are in contact with each other.

The cam surface 105a2 of the T-slider 105a and the contacting surface 105d2 of the T-cam 105d constitute a cam mechanism that converts the movement of the T-slider 105a in the Y1 direction into the movement of the T-cam 105d and the shutter opening/closing member 102 in the X2 direction. In the present embodiment, both the cam surface 105a2 and the contacting surface 105d2 are inclined surfaces inclined with respect to both the X2 direction and the Y1 direction, but only one of them may be an inclined surface.

The operation of the T-link mechanism 105 when the toner cartridge 60 is attached to the apparatus body 1 will be described.

In FIGS. 3A to 3C, the process cartridge 50 is attached to the apparatus body 1, the toner cartridge 60 is not attached to the apparatus body 1, and the door 18 is positioned at the open position. In this case, the shutter opening/closing member 102 is positioned at the second position, and the cam surface 105a2 of the T-slider 105a is not in contact with the contacting surface 105d2 of the T-cam 105d (FIG. 3C).

Figure 4A:
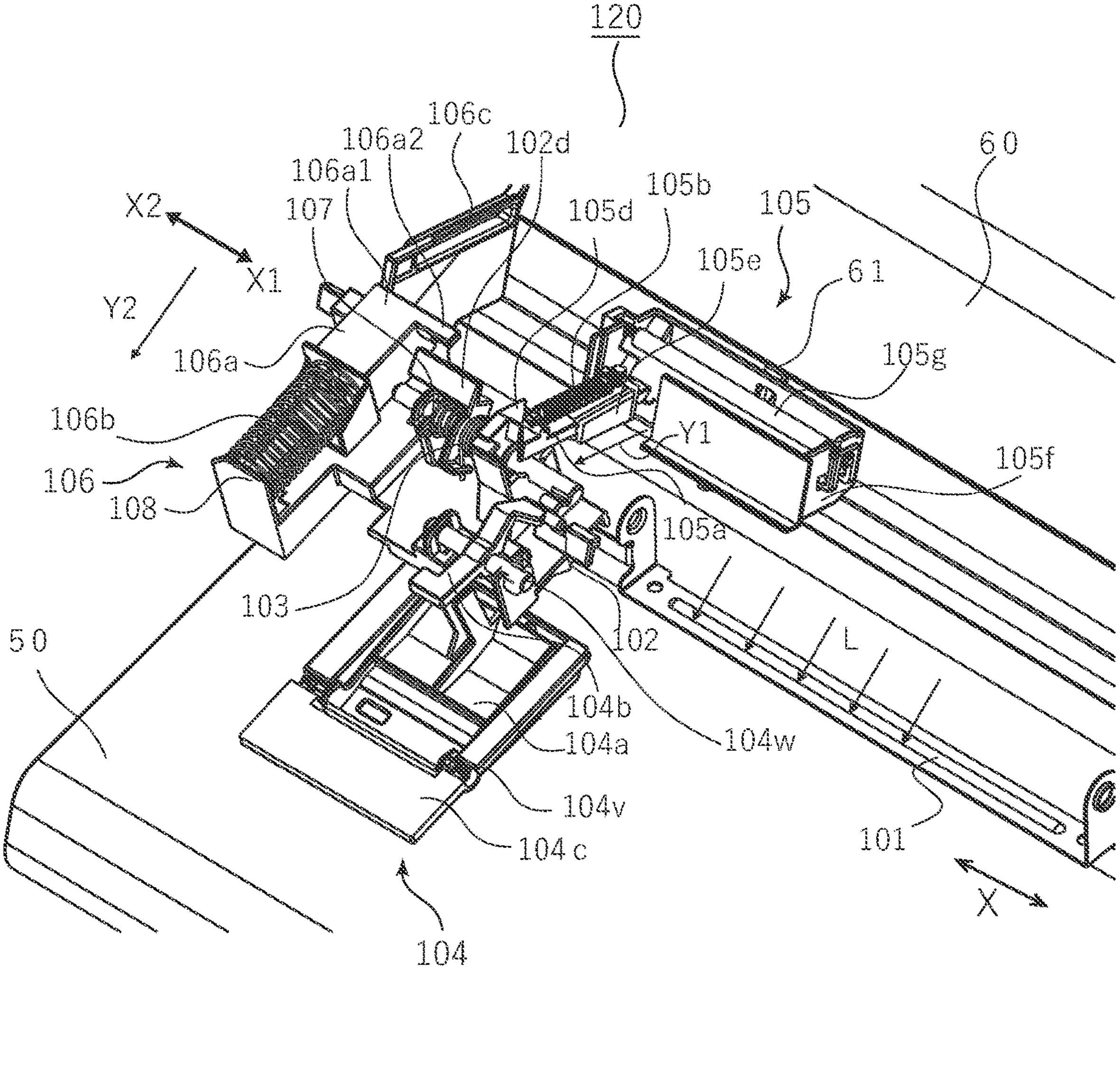
FIG. 4A is a view illustrating the shutter opening/closing mechanism according to the first embodiment.
Figure 4B:
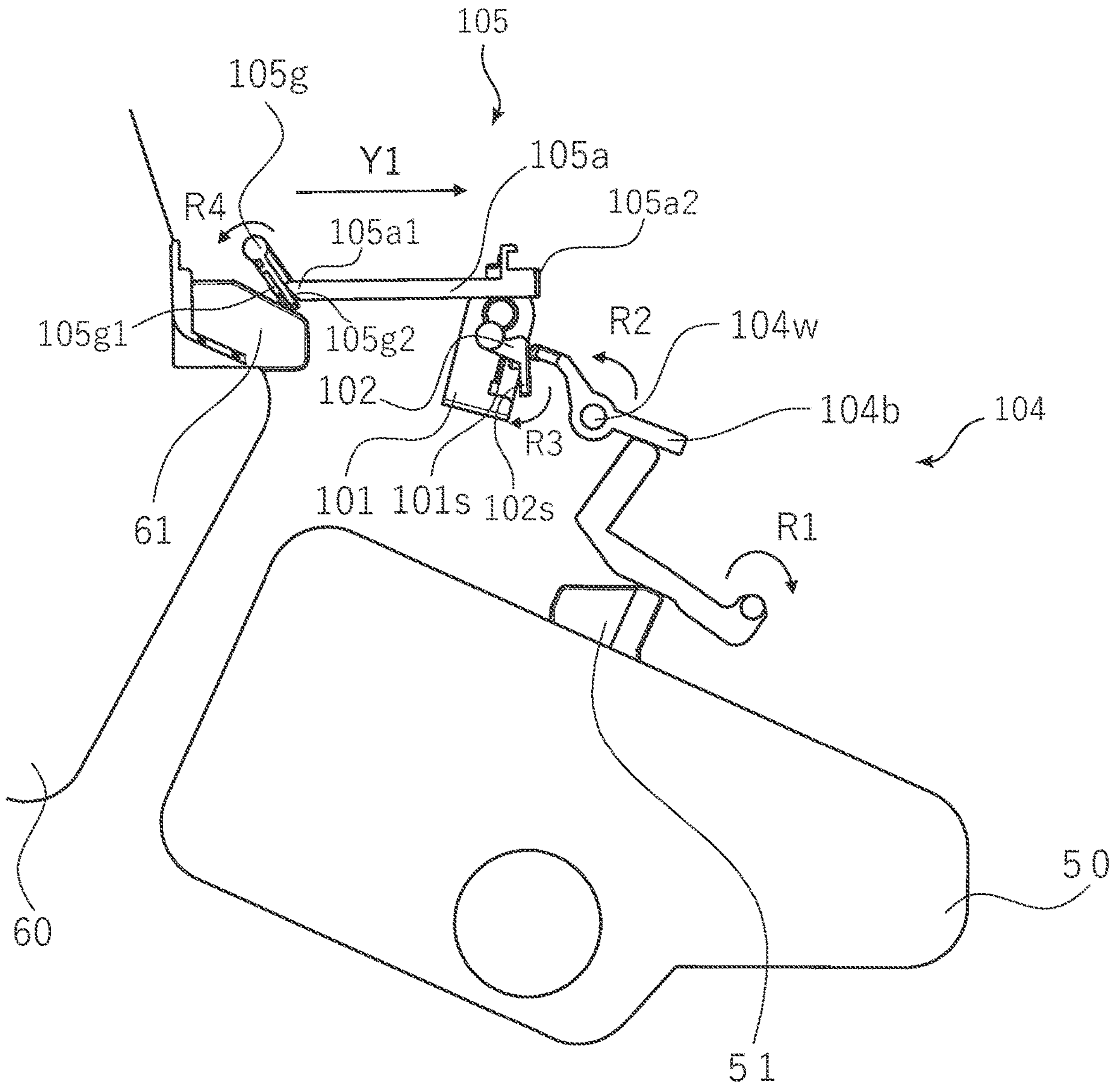
FIG. 4B is a view illustrating the shutter opening/closing mechanism according to the first embodiment.
Figure 4C:
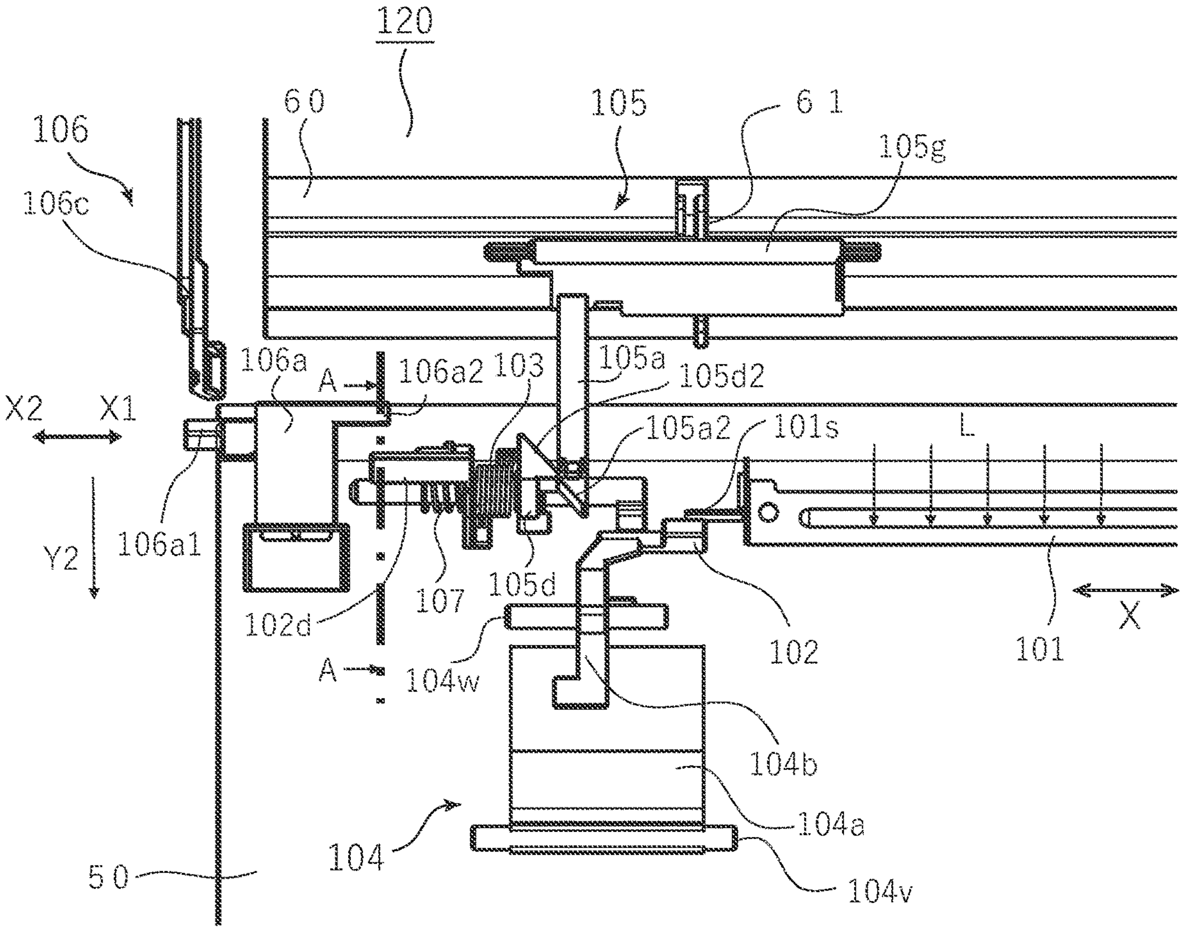
FIG. 4C is a view illustrating the shutter opening/closing mechanism according to the first embodiment.

As illustrated in FIGS. 4A to 4C, in the process of attaching the toner cartridge 60 to the apparatus body 1, a part of the toner cartridge 60 comes into contact with the T-flap 105g. Specifically, the rib 61 provided in the toner cartridge 60 comes into contact with the contacting portion 105g1 of the T-flap 105g (FIG. 4B), and rotates the T-flap 105g in the R4 direction. Then, the slider contact portion 105g2 of the T-flap 105g comes into contact with the contacting portion 105a1 of the T-slider 105a, and moves the T-slider 105a in the Y1 direction against the urging force of the tension spring 105b.

The movement of the T-slider 105a causes the cam surface 105a2 of the T-slider 105a to slide on the contacting surface 105d2 of the T-cam 105d (FIGS. 3A and 3C). As a result, the T-cam 105d moves in the X2 direction against the urging force of the compression spring 107. In addition, the shutter opening/closing member 102 linearly moves in the X2 direction integrally with the T-cam 105d by pressing the T-link pressed portion 102t against the pressing portion 105d3 (FIG. 2D) of the T-cam 105d. As a result, the shutter opening/closing member 102 moves from the second position to the third position.

That is, the T-link mechanism 105 moves the shutter opening/closing member 102 from the second position to the third position in an interlocking manner with the attachment of the toner cartridge 60 to the apparatus body 1. In the present embodiment, the T-slider 105a and the T-cam 105d are separate components, but a portion coming into contact with the toner cartridge 60 and a portion pressing the shutter opening/closing member 102 may be integrated.

When the shutter opening/closing member 102 is positioned at the third position, as illustrated in FIG. 4B, the shutter contact portion 102s of the shutter opening/closing member 102 does not come into contact with the contacting portion 101s of the shutter 101. Therefore, the shutter 101 remains at the blocking position at which the laser beam L is blocked (FIG. 4A). Further, even when the shutter opening/closing member 102 moves (linearly moves) from the second position (FIG. 3C) to the third position (FIG. 4C), the rotation angle of the shutter opening/closing member 102 does not change.

When the toner cartridge 60 is removed from the apparatus body 1 in the state of FIGS. 4A to 4C, the shutter opening/closing member 102 moves from the third position to the second position in a process opposite to the above-described operation.

D-Link Mechanism

Figure 4D:
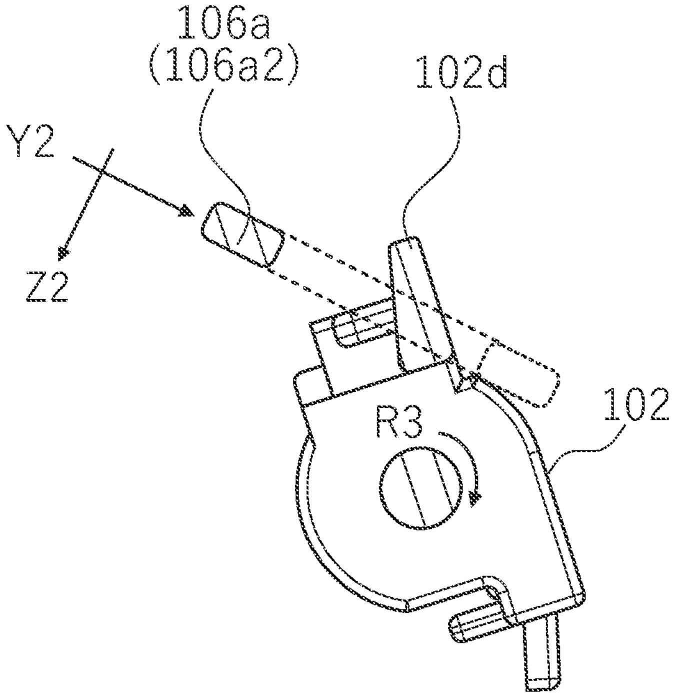
FIG. 4D is a view illustrating a part of the shutter opening/closing member and a D-link mechanism according to the first embodiment.

The D-link mechanism 106 interlocked with opening and closing of the door 18 will be described mainly with reference to FIGS. 4A to 4D and FIGS. 5A to 5D. FIG. 4D is a view illustrating a cross-section of the device taken along line A-A in FIG. 4C. FIG. 5D is a view illustrating a cross-section of the device taken along line B-B in FIG. 5C.

As illustrated in FIGS. 4A and 4C, the D-link mechanism 106 includes a D-rod 106c, a D-slider 106a, and a compression spring 106b. The D-rod 106c is configured to move in an interlocking manner with movement of the door 18 (FIG. 1). The D-slider 106a moves by being brought into contact with the D-rod 106c, and is configured to press the shutter opening/closing member 102.

The D-rod 106c is a member elongated in a direction intersecting (preferably orthogonal to) the X direction. The first end of the D-rod 106c is connected to the door 18. The D-rod 106c may be formed by a part of the door 18. For example, the boss portion provided at the first end of the D-rod 106c is fitted into the elongated hole of the door 18, and the moving direction of the D-rod 106c is regulated in a direction along the guide portion provided in the apparatus body 1. The D-rod 106c moves in a direction toward the D-slider 106a when the door 18 is moved from the open position to the closed position, and moves in a direction away from the D-slider 106a when the door 18 is moved from the closed position to the open position. The moving direction of the D-rod 106c is a direction intersecting (preferably orthogonal to) the X direction.

The D-slider 106a includes a contacting portion 106a1 coming into contact with the D-rod 106c and a pressing portion 106a2 (third pressing portion) capable of pressing the D-link pressed portion 102d of the shutter opening/closing member 102. The D-slider 106a is supported by the above-described holder 108 so as to be movable in the Y2 direction and the opposite direction. The compression spring 106b urges the D-slider 106a in a direction opposite to the Y2 direction. The Y2 direction is a direction intersecting (preferably orthogonal to) the X direction. The Y2 direction is not necessarily parallel to the moving direction of the D-rod 106*c* and the Y3 direction (the moving direction of the T-slider 105*a*).

The operation of the D-link mechanism 106 when the door 18 is closed will be described.

In FIGS. 4A to 4C, the process cartridge 50 and the toner cartridge 60 are attached to the apparatus body 1, and the door 18 is positioned at the open position. In this case, the shutter opening/closing member 102 is positioned at the third position, and the D-rod 106*c* is not in contact with the D-slider 106*a*. As illustrated in FIG. 4D, the pressing portion 106*a*2 of the D-slider 106*a* does not come into contact with the D-link pressed portion 102*d* of the shutter opening/closing member 102. Here, as indicated by a dotted line in FIG. 4D, a space through which the pressing portion 106*a*2 passes when the door 18 moves between the open position and the closed position is referred to as a movement trajectory of the pressing portion 106*a*2. In a state where the process cartridge 50 and the toner cartridge 60 are attached to the apparatus body 1 (a state where the shutter opening/closing member 102 is positioned at the third position), the movement locus of the pressing portion 106*a*2 and the D-link pressed portion 102*d* overlap each other. On the other hand, in a state where at least one of the process cartridge 50 and the toner cartridge 60 is not attached to the apparatus body 1, the movement locus of the pressing portion 106*a*2 and the D-link pressed portion 102*d* do not overlap each other.

Figure 5A:
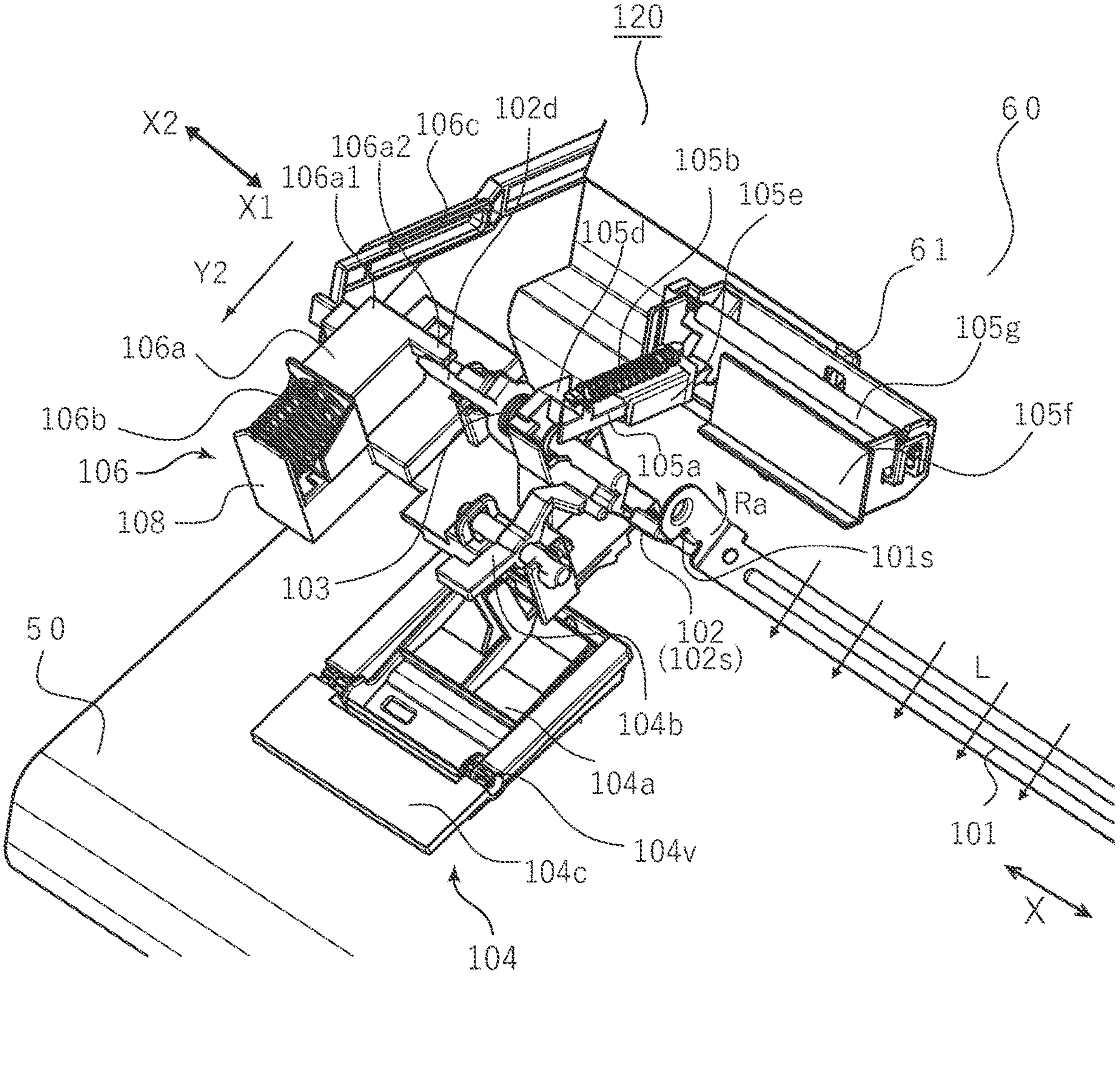
FIG. 5A is a view illustrating a shutter opening/closing mechanism according to the first embodiment.
Figure 5B:
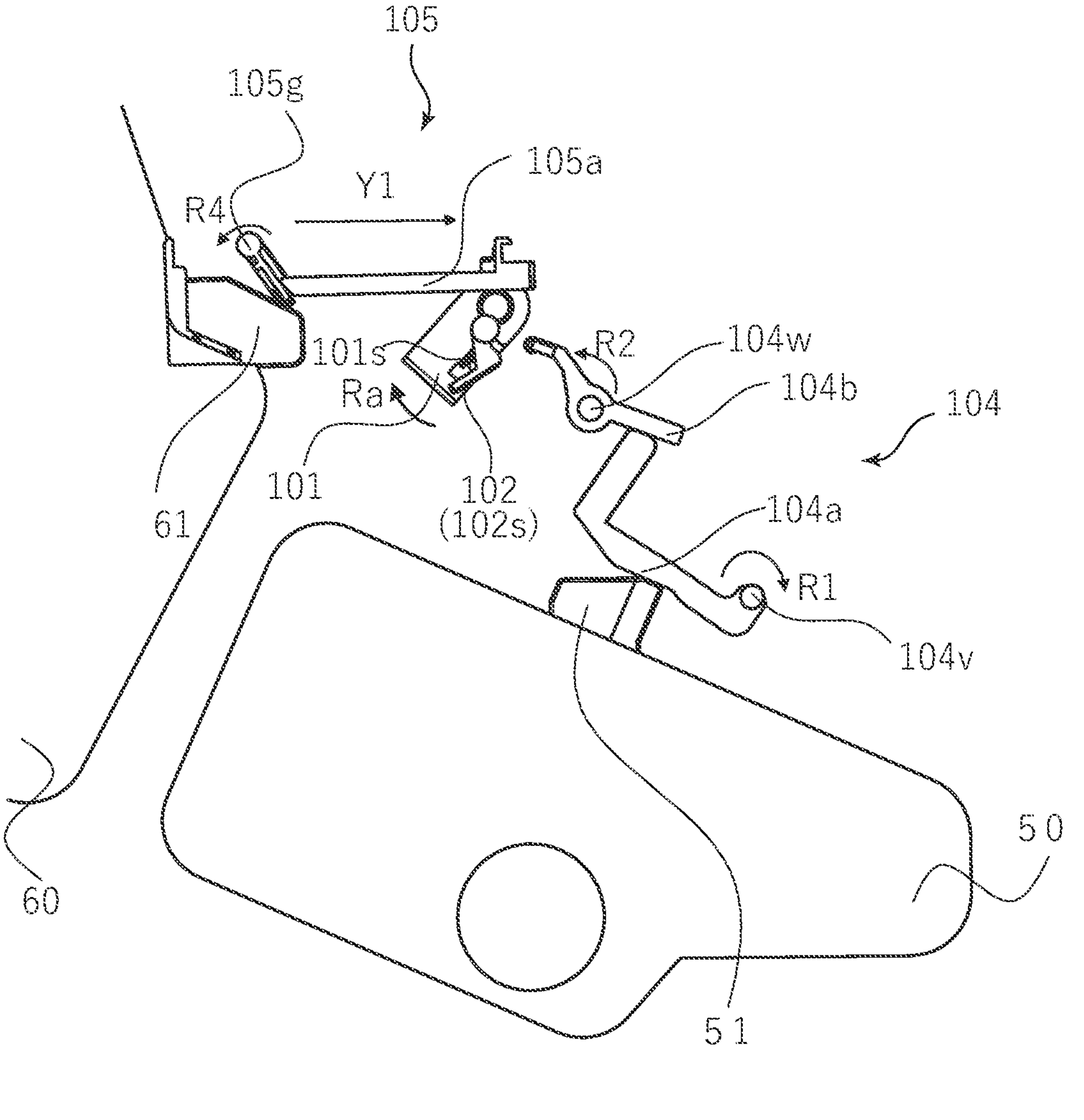
FIG. 5B is a view illustrating a shutter opening/closing mechanism according to the first embodiment.
Figure 5C:
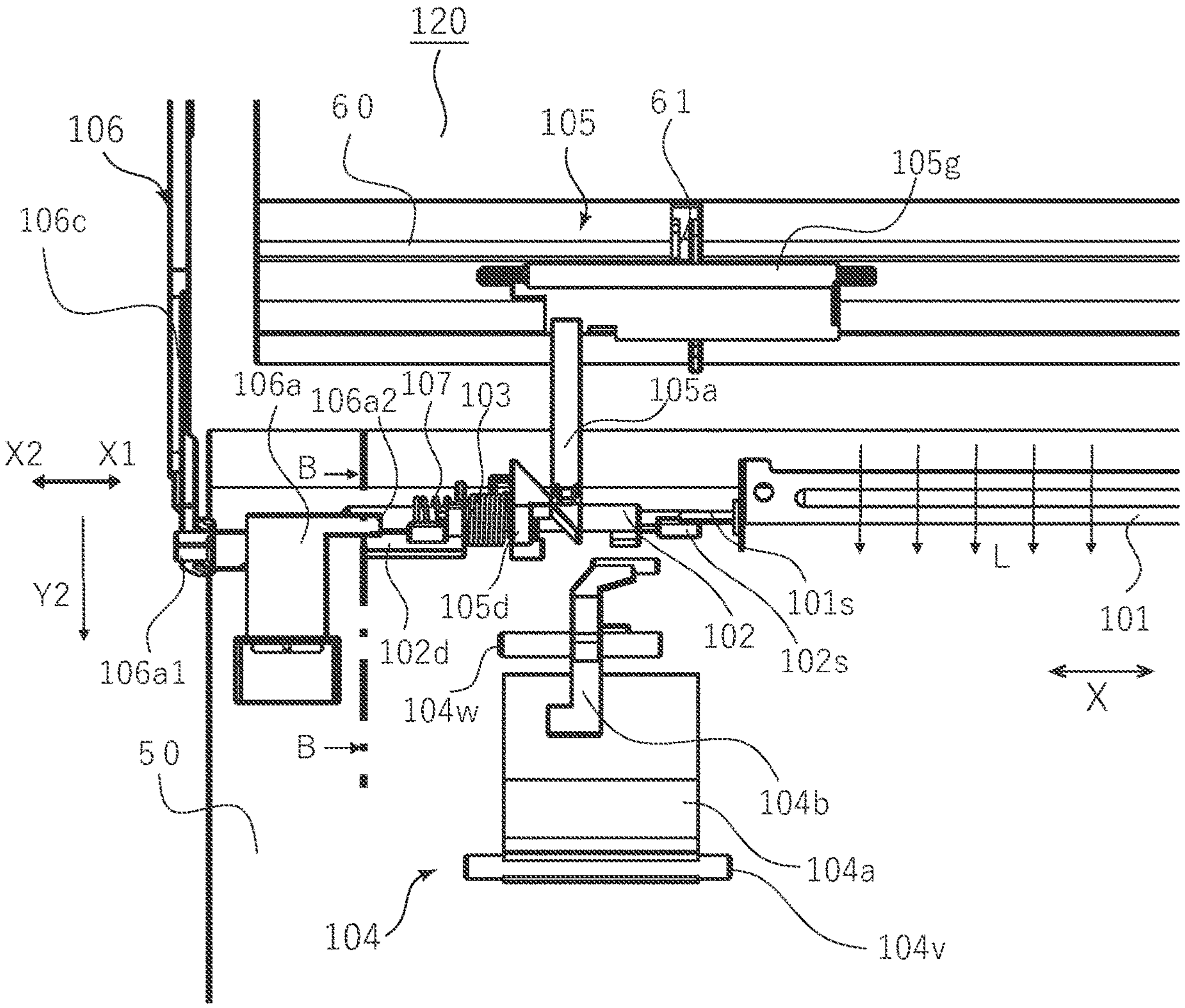
FIG. 5C is a view illustrating a shutter opening/closing mechanism according to the first embodiment.
Figure 5D:
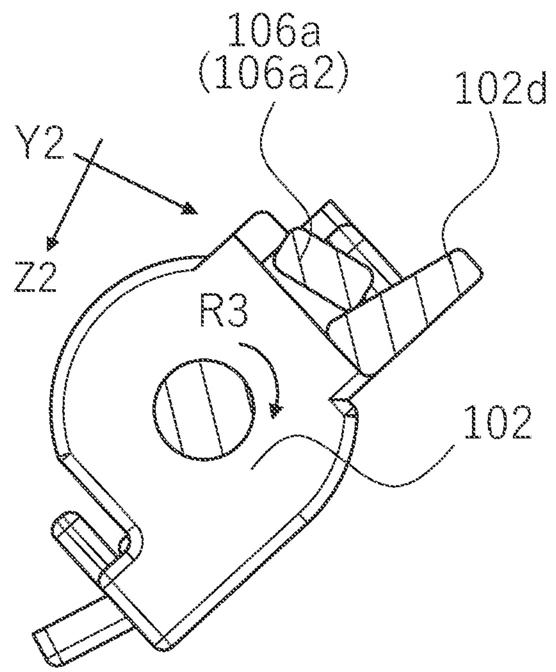
FIG. 5D is a view illustrating a part of the shutter opening/closing member and the D-link mechanism according to the first embodiment.
Figure 6A:
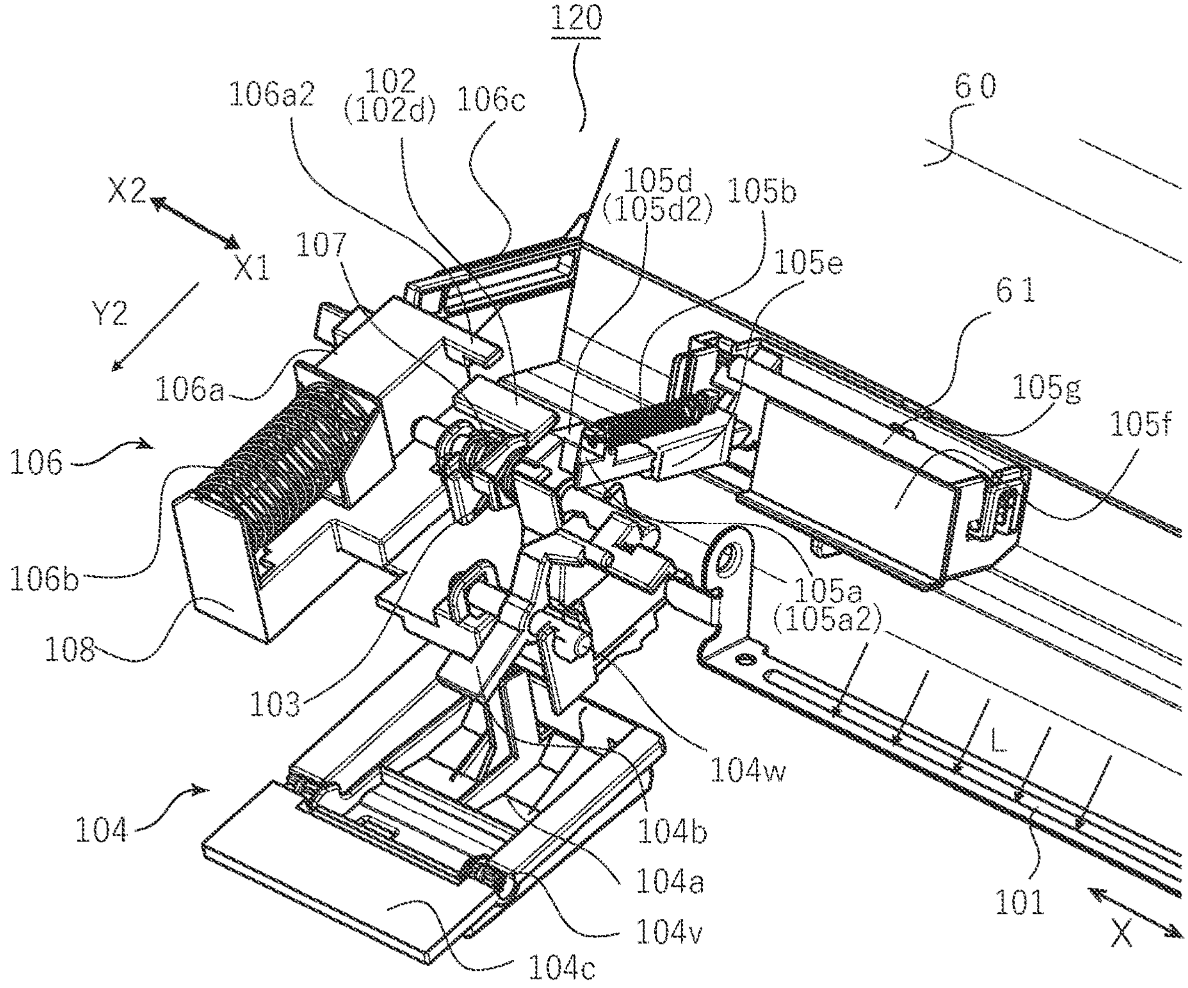
FIG. 6A is a view illustrating the shutter opening/closing mechanism according to the first embodiment.
Figure 6B:
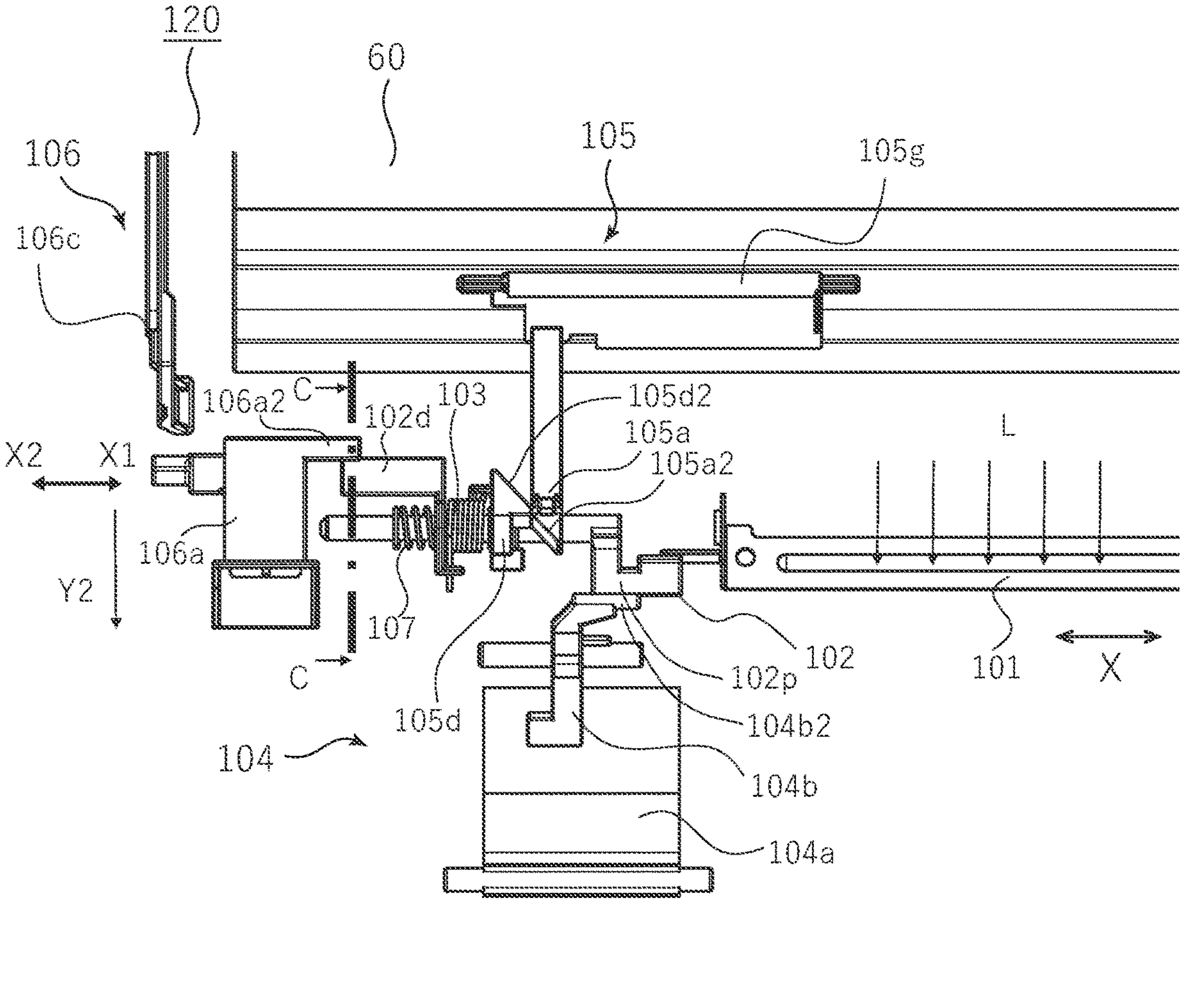
FIG. 6B is a view illustrating the shutter opening/closing mechanism according to the first embodiment.
Figure 6C:
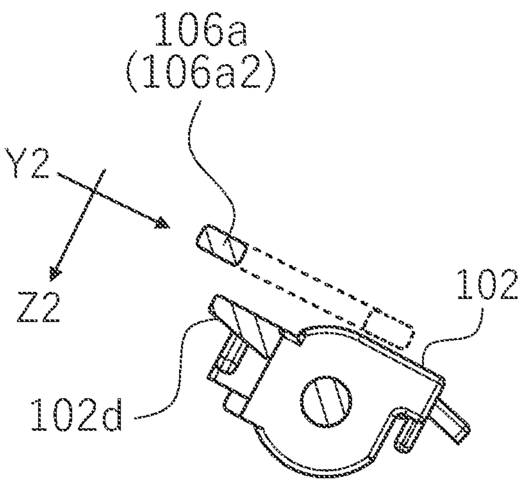
FIG. 6C is a view illustrating a part of the shutter opening/closing member and the D-link mechanism according to the first embodiment.

As illustrated in FIGS. 5A and 5C, as the door 18 moves from the open position to the closed position, the D-rod 106*c* moves toward the D-slider 106*a* and comes into contact with the contacting portion 106*a*1 of the D-slider 106*a*. The D-slider 106*a* is pressed by the D-rod 106*c* to move in the Y2 direction against the urging force of the compression spring 106*b*. Then, as illustrated in FIG. 5D, the pressing portion 106*a*2 of the D-slider 106*a* comes into contact with the D-link pressed portion 102*d* of the shutter opening/closing member 102. The shutter opening/closing member 102 rotates in the R3 direction by being pressed by the D-slider 106*a*, and moves from the third position to the fourth position.

That is, the D-link mechanism 106 moves the shutter opening/closing member 102 from the third position to the fourth position in an interlocking manner with the movement of the door 18 from the open position to the closed position. The D-slider 106*a* can be referred to as a main-body-side pressing portion of the D-link mechanism 106, and the D-rod 106*c* can be referred to as a door-side pressing portion of the D-link mechanism 106. Note that the shutter opening/closing member 102 may be directly pressed by the door-side pressing portion.

In the process in which the shutter opening/closing member 102 moves from the third position to the fourth position, the shutter contact portion 102*s* of the shutter opening/closing member 102 comes into contact with the contacting portion 101*s* of the shutter 101, and the shutter opening/closing member 102 is rotated in the Ra direction (FIG. 5B). As a result, the shutter 101 moves from the blocking position to the non-blocking position, and the optical path of the laser beam L is opened (FIGS. 5A and 5C).

When the door 18 is moved from the closed position to the open position from the state of FIGS. 5A to 5D, the shutter opening/closing member 102 moves from the fourth position to the third position in a process opposite to the above-described operation, and the shutter 101 moves from the non-blocking position to the blocking position.

Case where Door is Closed without Attaching Toner Cartridge

Next, an operation of the shutter opening/closing mechanism 120 when the door 18 is moved from the open position to the closed position in a state where the process cartridge 50 is attached to the apparatus body 1 and the toner cartridge 60 is not attached to the apparatus body 1 will be described.

When the process cartridge 50 is attached to the apparatus body 1, the toner cartridge 60 is not attached to the apparatus body 1, and the door 18 is positioned at the open position, the apparatus is in the state illustrated in FIGS. 3A to 3C, and the shutter opening/closing member 102 is positioned at the second position. In a state where the shutter opening/closing member 102 is positioned at the second position by the P-link mechanism 104, the movement locus of the pressing portion 106*a*2 overlaps the D-link pressed portion 102*d* when viewed in the X direction. Therefore, when viewed in the X direction, the positional relationship between the movement locus of the pressing portion 106*a*2 and the D-link pressed portion 102*d* is the same as the positional relationship illustrated in FIG. 4D. On the other hand, the position of the pressing portion 106*a*2 and the position of the D-link pressed portion 102*d* in the X direction do not overlap. Specifically, as illustrated in a region D surrounded by a broken line in FIG. 3C, the D-link pressed portion 102*d* of the shutter opening/closing member 102 is positioned at a position away from the pressing portion 106*a*2 of the D-slider 106*a* of the D-link mechanism 106 in the X direction. Therefore, even if the door 18 is moved from the open position to the closed position, the pressing portion 106*a*2 of the D-slider 106*a* does not come into contact with the D-link pressed portion 102*d* of the shutter opening/closing member 102, and the shutter opening/closing member 102 remains at the second position.

That is, when the door 18 is moved from the open position to the closed position in a state where the process cartridge 50 is attached to the apparatus body 1 and the toner cartridge 60 is not attached to the apparatus body 1, the shutter opening/closing member 102 remains at the second position. Since the shutter opening/closing member 102 remains at the second position, the shutter 101 is maintained at the blocking position.

Case where Door is Closed without Attaching Process Cartridge

Next, an operation of the shutter opening/closing mechanism 120 when the door 18 is moved from the open position to the closed position in a state where the process cartridge 50 is not attached to the apparatus body 1 and the toner cartridge 60 is attached to the apparatus body 1 will be described with reference to FIGS. 6A to 6C. FIG. 6C is a view illustrating a cross-section of the device taken along line C-C in FIG. 6B.

When both the process cartridge 50 and the toner cartridge 60 are not attached to the apparatus body 1, the apparatus is in the state illustrated in FIGS. 2A to 2C, and the shutter opening/closing member 102 is positioned at the first position.

When only the toner cartridge 60 is attached to the apparatus body 1 in this state, as illustrated in FIGS. 6A and 6B, the T-link mechanism 105 moves the shutter opening/closing member 102 in the X2 direction in an interlocking manner with the attachment of the toner cartridge 60. Specifically, the T-flap 105*g* rotates by being pressed by the rib 61 of the toner cartridge 60, and the T-slider 105*a* moves in the Y1 direction by being pressed by the T-flap 105*g*. Then, by being pressed by the cam surface 105*a*2 of the T-slider 105*a*, the T-cam 105*d* moves in the X2 direction together with the shutter opening/closing member 102.

However, since the process cartridge 50 is not attached, the shutter opening/closing member 102 is moved in the X2 direction in a state where it is not subjected to the action of the rotation by the P-link mechanism 104 (rotation from the rotation angle in FIG. 2B to the rotation angle in FIG. 3B). Therefore, the shutter opening/closing member 102 is positioned at the same position as the third position in the X direction and at the same rotation angle as the first position, that is, at the fifth position. In a state where the shutter opening/closing member 102 is positioned at the fifth position, the position of the pressing portion 106*a*2 and the position of the D-link pressed portion 102*d* in the X direction overlap with each other.

As indicated by a dotted line in FIG. 6C, when the shutter opening/closing member 102 is positioned at the fifth position, the movement locus of the pressing portion 106*a*2 does not overlap the D-link pressed portion 102*d* when viewed in the X direction. More specifically, the D-link pressed portion 102*d* of the shutter opening/closing member 102 is positioned at a position away from the pressing portion 106*a*2 of the D-slider 106*a* of the D-link mechanism 106 in the Z2 direction. The Z2 direction is a direction orthogonal to the Y2 direction when viewed in the X direction. Therefore, even if the door 18 is moved from the open position to the closed position, the pressing portion 106*a*2 of the D-slider 106*a* does not come into contact with the D-link pressed portion 102*d* of the shutter opening/closing member 102, and the shutter opening/closing member 102 remains at the fifth position.

That is, when the door 18 is moved from the open position to the closed position in a state where the process cartridge 50 is not attached to the apparatus body 1 and the toner cartridge 60 is attached to the apparatus body 1, the shutter opening/closing member 102 remains at the fifth position. Since the shutter opening/closing member 102 remains at the fifth position, the shutter 101 is maintained at the blocking position.

Case where Door is Closed without Attaching Both Cartridges

Next, an operation of the shutter opening/closing mechanism 120 when the door 18 is moved from the open position to the closed position in a state where both the process cartridge 50 and the toner cartridge 60 are not attached to the apparatus body 1 will be described.

When both the process cartridge 50 and the toner cartridge 60 are not attached to the apparatus body 1, the apparatus is in the state illustrated in FIGS. 2A to 2C, and the shutter opening/closing member 102 is positioned at the first position.

In this case, as illustrated in a region D surrounded by a broken line in FIG. 2C, the D-link pressed portion 102*d* of the shutter opening/closing member 102 is positioned at a position away from the pressing portion 106*a*2 of the D-slider 106*a* of the D-link mechanism 106 in the X direction. Therefore, even if the door 18 is moved from the open position to the closed position, the pressing portion 106*a*2 of the D-slider 106*a* does not come into contact with the D-link pressed portion 102*d* of the shutter opening/closing member 102, and the shutter opening/closing member 102 remains at the first position.

In addition, when the shutter opening/closing member 102 is positioned at the first position, the D-link pressed portion 102*d* of the shutter opening/closing member 102 is positioned at a position away from the pressing portion 106*a*2 of the D-slider 106*a* of the D-link mechanism 106 in the Z2 direction. Therefore, even if the door 18 is moved from the open position to the closed position, the pressing portion 106*a*2 of the D-slider 106*a* does not come into contact with the D-link pressed portion 102*d* of the shutter opening/closing member 102, and the shutter opening/closing member 102 remains at the first position.

That is, when the door 18 is moved from the open position to the closed position in a state where both the process cartridge 50 and the toner cartridge 60 are not attached to the apparatus body 1, the shutter opening/closing member 102 remains at the first position. Since the shutter opening/closing member 102 remains at the first position, the shutter 101 is maintained at the blocking position.

Case where Process Cartridge is Attached and Door is Closed after Attachment of Toner Cartridge Next, the operation of the shutter opening/closing mechanism 120 when the process cartridge 50 is attached to the apparatus body 1 and the door 18 is further moved from the open position to the closed position after the toner cartridge 60 is attached to the apparatus body 1 will be described. In the present embodiment, the process cartridge 50 is attached to the apparatus body 1 before the toner cartridge 60 is attached to the apparatus body 1. However, even when the process cartridge 50 is attached to the apparatus body 1 after the toner cartridge 60 is attached to the apparatus body 1, the interlocking mechanism can move the shutter 101 from the blocking position to the non-blocking position. Hereinafter, a description will be given assuming that the process cartridge 50 can be attached to the apparatus body 1 after the toner cartridge 60 is attached to the apparatus body 1.

When both the process cartridge 50 and the toner cartridge 60 are not attached to the apparatus body 1, the apparatus is in the state illustrated in FIGS. 2A to 2C, and the shutter opening/closing member 102 is positioned at the first position.

When only the toner cartridge 60 is attached to the apparatus body 1 in this state, as illustrated in FIGS. 6A and 6B, the T-link mechanism 105 moves the shutter opening/closing member 102 in the X2 direction in an interlocking manner with the attachment of the toner cartridge 60. As a result, the shutter opening/closing member 102 moves from the first position to the fifth position.

A case where the process cartridge 50 is attached in the state of FIGS. 6A and 6B will be considered. In this case, as described with reference to FIGS. 3A to 3C, the P-link mechanism 104 operates in an interlocking manner with attachment of the process cartridge 50. Specifically, the P-flap 104*a* rotates in the R1 direction in FIG. 3B by being pressed by the rib 51 of the process cartridge 50, and the P-lever 104*b* rotates in the R2 direction in FIG. 3B by being pressed by the P-flap 104*a*.

Here, as illustrated in FIG. 6B, the P-link pressed portion 102*p* of the shutter opening/closing member 102 is in a positional relationship capable of coming into contact with the pressing portion 104*b*2 of the P-lever 104*b* even when the shutter opening/closing member 102 is positioned at the fifth position. Therefore, by the rotation of the P-lever 104*b* in the R2 direction, the P-link pressed portion 102*p* is pressed by the pressing portion 104*b*2, and the shutter opening/closing member 102 rotates in the R3 direction in FIGS. 3B and 6C. As a result, the shutter opening/closing member 102 moves (rotates) from the fifth position illustrated in FIG. 6C to the third position illustrated in FIG. 4D.

A case where the door 18 is further closed after the process cartridge 50 is attached is considered. In this case, similarly to the case where the door 18 is closed after the process cartridge 50 and the toner cartridge 60 are sequentially attached, the door 18 is closed in a state where the shutter opening/closing member 102 is positioned at the third position. Therefore, the shutter opening/closing member 102 is moved from the third position to the fourth position by the D-link mechanism 106 in an interlocking manner with the movement of the door 18 from the open position to the closed position. Then, when the shutter opening/closing member 102 moves from the third position to the fourth position, the shutter 101 is moved from the blocking position to the non-blocking position.

As described above, the shutter opening/closing mechanism 120 of the present embodiment can cope with both a case where the toner cartridge 60 is attached after the process cartridge 50 and a case where the process cartridge 50 is attached after the toner cartridge 60.

That is, in the present embodiment, when the second unit is attached to the apparatus body in a state where the moving member is positioned at the first position, the moving member is moved from the first position to the fifth position by the second interlocking portion. When the first unit is attached to the apparatus body with the moving member positioned at the fifth position, the first interlocking portion moves the first unit from the fifth position to the third position. When the moving member is moved to the third position, the third interlocking portion can move the moving member from the third position to the fourth position in an interlocking manner with the operation of closing the opening/closing member. That is, regardless of the attachment order of the first unit and the second unit, the movement of the shutter in an interlocking manner with operation of the opening/closing member can be permitted only in a state where both units are attached.

As a modified example, the toner cartridge 60 may be attachable to the apparatus body 1 only in a state where the process cartridge 50 is already attached to the apparatus body 1. In this case, the P-link mechanism 104 may not have a function of moving the shutter opening/closing member 102 from the fifth position to the third position in an interlocking manner with the attachment of the process cartridge 50.

Summary of Present Embodiment

As described above, the shutter opening/closing mechanism 120 positions the shutter 101 at the non-blocking position when both the process cartridge 50 and the toner cartridge 60 are attached to the apparatus body 1 and the door 18 is at the closed position. In each of a case where the process cartridge 50 is not attached to the apparatus body 1, a case where the toner cartridge 60 is not attached to the apparatus body 1, and a case where the door 18 is at the open position, the shutter 101 is positioned at the blocking position.

In other words, in the interlocking mechanism of the present embodiment, the shutter member is positioned at the non-blocking position in a state where the first unit and the second unit are attached to the apparatus body and the opening/closing member is positioned at the closed position. In each of the case where the first unit is not attached to the apparatus body, the case where the second unit is not attached to the apparatus body, and the case where the opening/closing member is positioned at the open position, the shutter member is positioned at the blocking position.

With this configuration, in the configuration in which the two units (50, 60) are attachable to and detachable from the apparatus body 1, even if the opening/closing member is closed in a state where any of the units is not attached, the possibility that the laser beam leaks to the outside of the image forming apparatus can be reduced.

In the present embodiment, the position control of the shutter 101 described above is realized by an interlocking mechanism (shutter opening/closing mechanism 120) interlocked with the process cartridge 50, the toner cartridge 60, and the door 18. Therefore, for example, the number of electrical components can be reduced as compared with a case where the irradiation control of the laser beam L is performed by a configuration using a plurality of interlock switches corresponding to each cartridge and each door 18. In the configuration using the plurality of interlock switches, for example, only when all of a switch for detecting attachment of the process cartridge 50, a switch for detecting attachment of the toner cartridge 60, and a switch for detecting the closed state of the door 18 are turned on, electrical control for permitting the laser scanner 90 to emit the laser beam L is performed. According to the present embodiment, it is possible to reduce the possibility that the laser beam leaks to the outside of the printer P while reducing the number of electric components as compared with such a configuration.

In the present embodiment, the P-link mechanism 104 rotates the shutter opening/closing member 102 to the same position as a predetermined position (third position) in the Ra direction in an interlocking manner with the attachment of the process cartridge 50 to the apparatus body 1. The T-link mechanism 105 linearly moves the shutter opening/closing member 102 to the same position as a predetermined position (third position) in the X direction in an interlocking manner with the attachment of the toner cartridge 60 to the apparatus body 1. In other words, the first interlocking portion rotates the moving member to the same position as the predetermined position in the rotation direction in an interlocking manner with attachment of the first unit to the apparatus body. The second interlocking portion linearly moves the moving member to the same position as the predetermined position in the first direction in an interlocking manner with attachment of the second unit to the apparatus body.

As described above, by disposing the moving member having two or more degrees of freedom of movement and moving the moving member in different directions when the first unit is attached and when the second unit is attached, it is possible to reduce the possibility of leakage of the laser beam to the outside with a relatively simple configuration.

Modified Example

In the first embodiment, the configuration example in which the P-link mechanism 104 rotates the shutter opening/closing member 102 in an interlocking manner with the attachment of the process cartridge 50 and the T-link mechanism 105 linearly moves the shutter opening/closing member 102 in an interlocking manner with the attachment of the toner cartridge 60 has been described. Alternatively, the P-link mechanism 104 may linearly move the shutter opening/closing member 102 in an interlocking manner with the attachment of the process cartridge 50, and the T-link mechanism 105 may rotate the shutter opening/closing member 102 in an interlocking manner with the attachment of the toner cartridge 60. That is, the first interlocking portion may be configured to linearly move the moving member to the same position as the predetermined position in the first direction in an interlocking manner with attachment of the first unit to the apparatus body. The second interlocking portion may be configured to rotate the moving member to the same position as the predetermined position in the rotation direction in an interlocking manner with attachment of the second unit to the apparatus body.

Specifically, the components of the P-link mechanism 104 of the first embodiment may be rearranged in an interlocking manner with the attachment of the toner cartridge 60, and the components of the T-link mechanism 105 of the first embodiment may be rearranged in an interlocking manner with the attachment of the process cartridge 50. Even in this case, by disposing the moving member having two or more degrees of freedom of movement and moving the moving member in different directions when the first unit is attached and when the second unit is attached, it is possible to reduce the possibility of leakage of the laser beam to the outside with a relatively simple configuration.

Second Embodiment

A second embodiment will be described. Hereinafter, elements denoted with the same reference numerals as those in the first embodiment will have substantially the same configurations and functions as those described in the first embodiment unless otherwise specified, and portions different from those in the first embodiment will be mainly described. The present embodiment is different from the first embodiment in the specific configuration of the shutter opening/closing mechanism 220, and the other parts are basically common to the first embodiment.

Figure 7A:
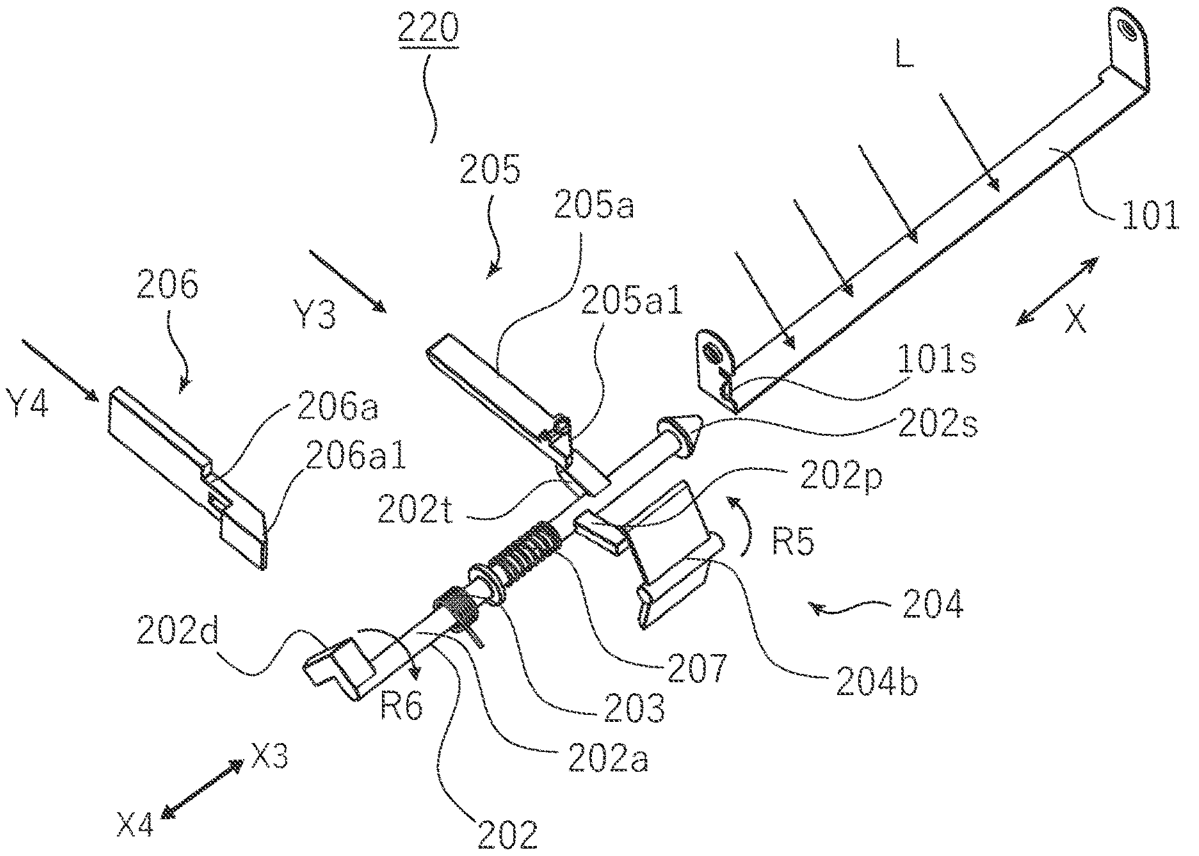
FIG. 7A is a view illustrating a shutter opening/closing mechanism according to a second embodiment.

As illustrated in FIG. 7A, the shutter opening/closing mechanism 220 of the second embodiment includes a shutter opening/closing member 202, a torsion coil spring 203, a compression spring 207, a P-link mechanism 204, a T-link mechanism 205, and a D-link mechanism 206.

The shutter opening/closing member 202 is an example of a moving member that acts on the shutter 101. The torsion coil spring 203 is an example of an urging member (first urging member) that urges the shutter opening/closing member 202 in a predetermined rotation direction. The compression spring 207 is an example of an urging member (second urging member) that urges the shutter opening/closing member 202 in a predetermined moving direction. The P-link mechanism 204 is an example of a first interlocking portion that connects (couples) the process cartridge 50 and the shutter opening/closing member 202 in an interlocking manner. The T-link mechanism 205 is an example of a second interlocking portion that connects (couples) the toner cartridge 60 and the shutter opening/closing member 202 in an interlocking manner. The D-link mechanism 206 is an example of a third interlocking portion that connects (couples) the door 18 and the shutter opening/closing member 202 in an interlocking manner.

Hereinafter, the configuration and operation of each unit of the shutter opening/closing mechanism 220 according to the second embodiment will be described with reference to FIGS. 7A to 10B.

Figure 7B:
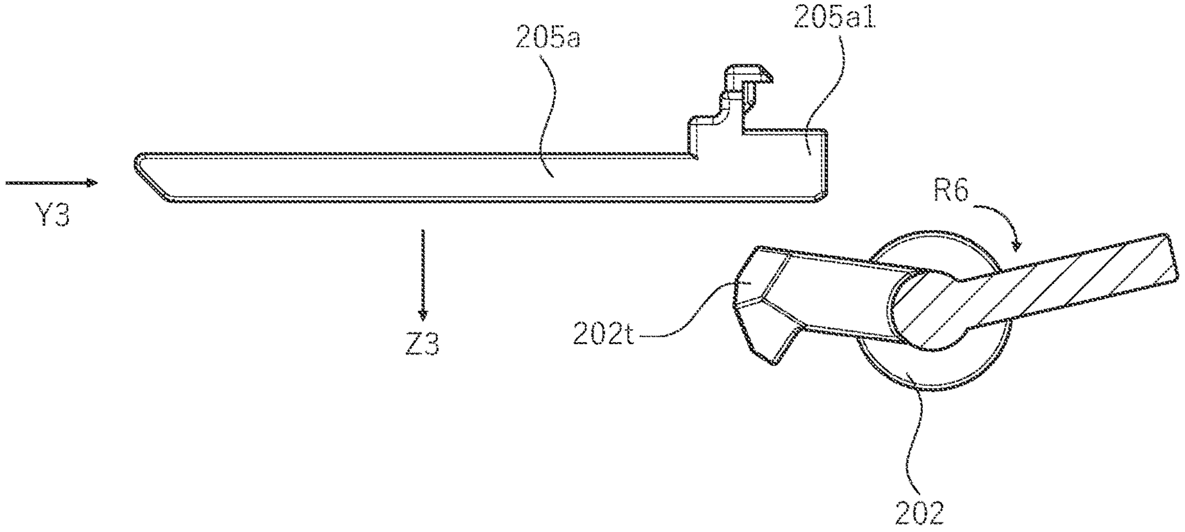
FIG. 7B is a view illustrating a part of the shutter opening/closing member and a T-link mechanism according to the second embodiment.
Figure 7C:
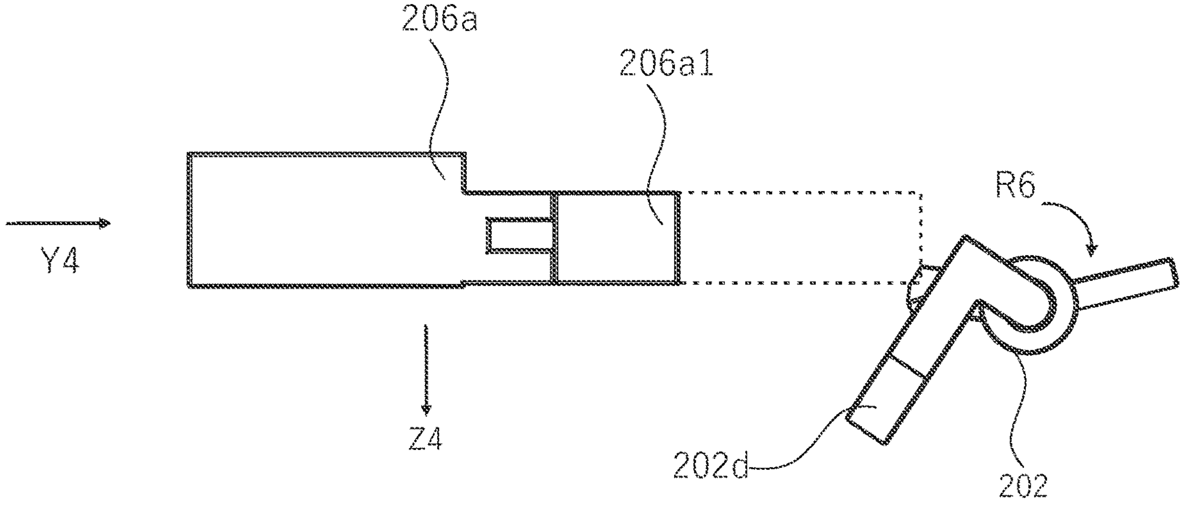
FIG. 7C is a view illustrating a part of the shutter opening/closing member and a D-link mechanism according to the second embodiment.
Figure 9A:
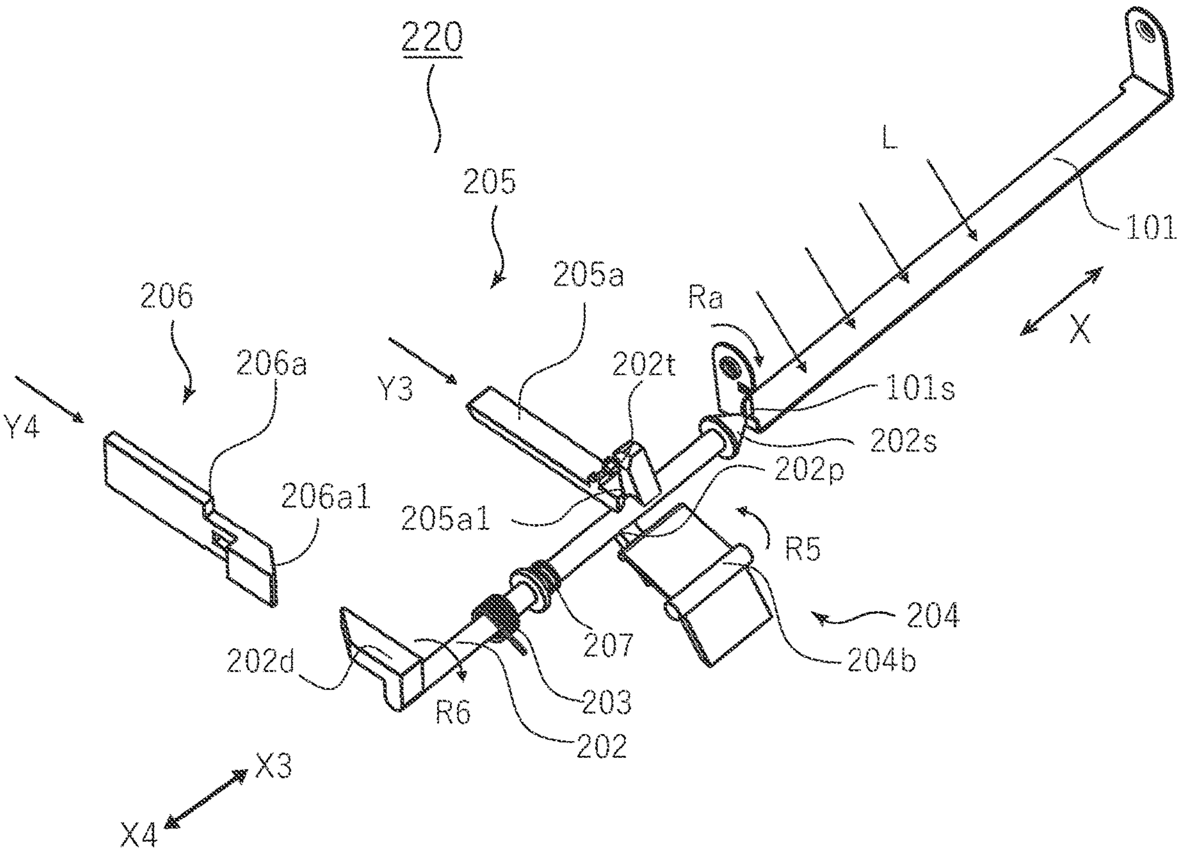
FIG. 9A is a view illustrating the shutter opening/closing mechanism according to the second embodiment.
Figure 9B:
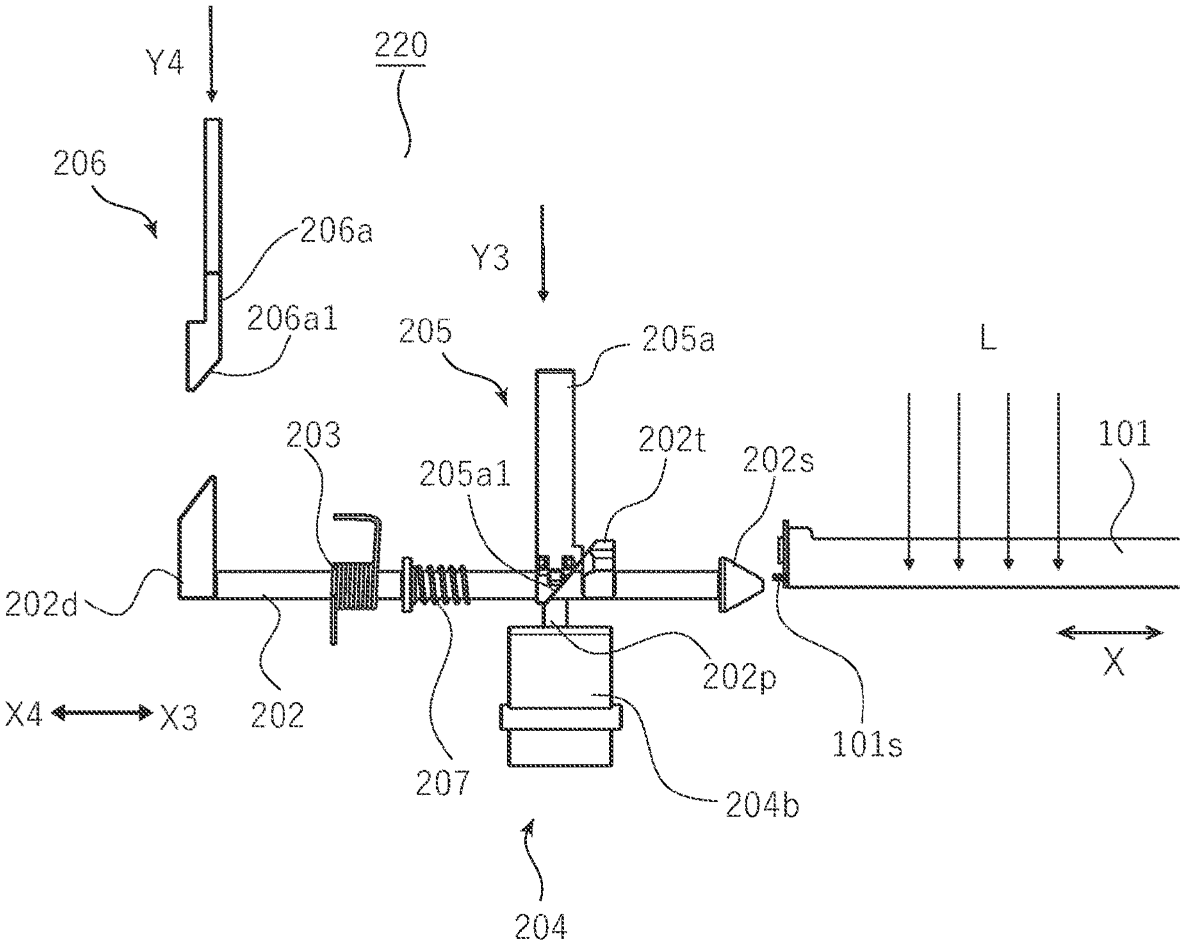
FIG. 9B is a view illustrating the shutter opening/closing mechanism according to the second embodiment.
Figure 10A:
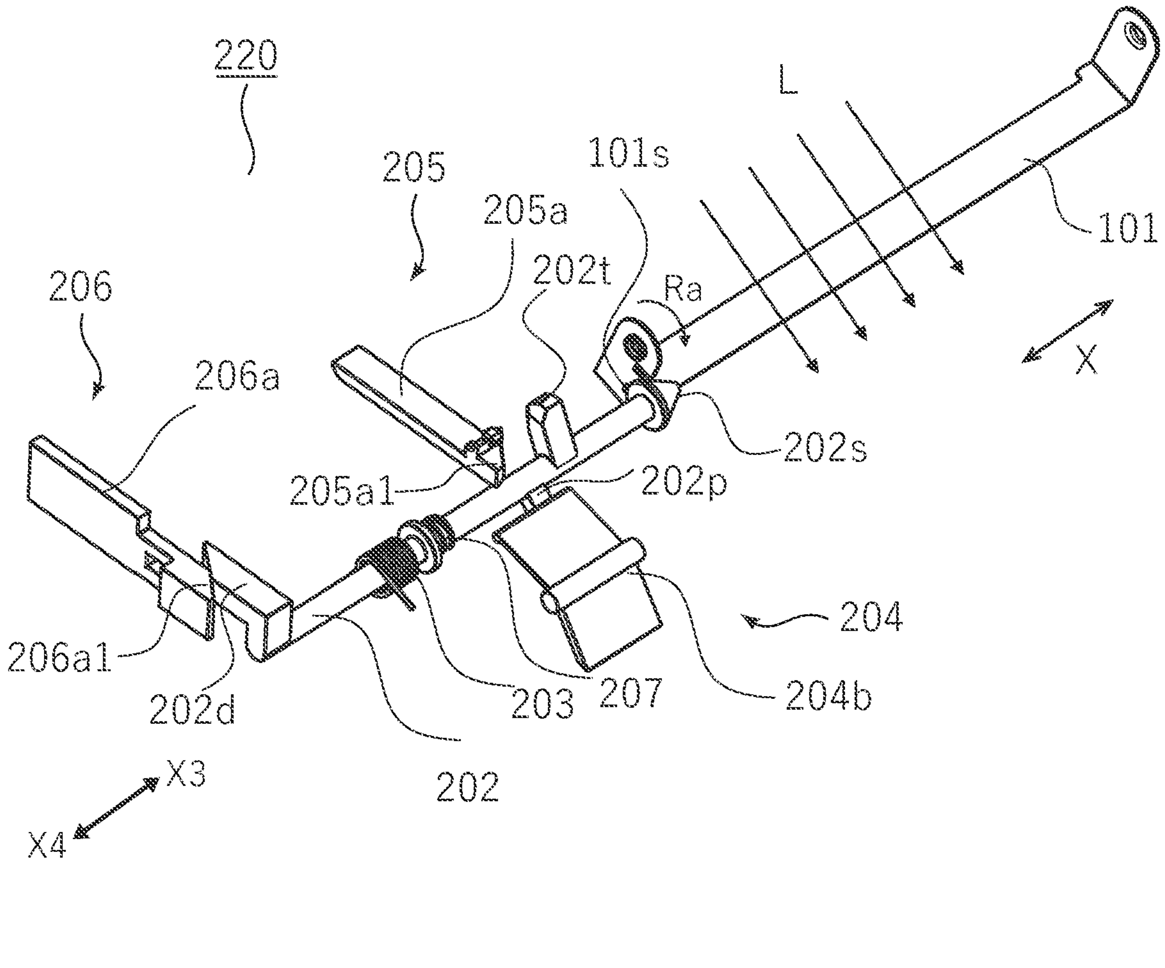
FIG. 10A is a view illustrating the shutter opening/closing mechanism according to the second embodiment.
Figure 10B:
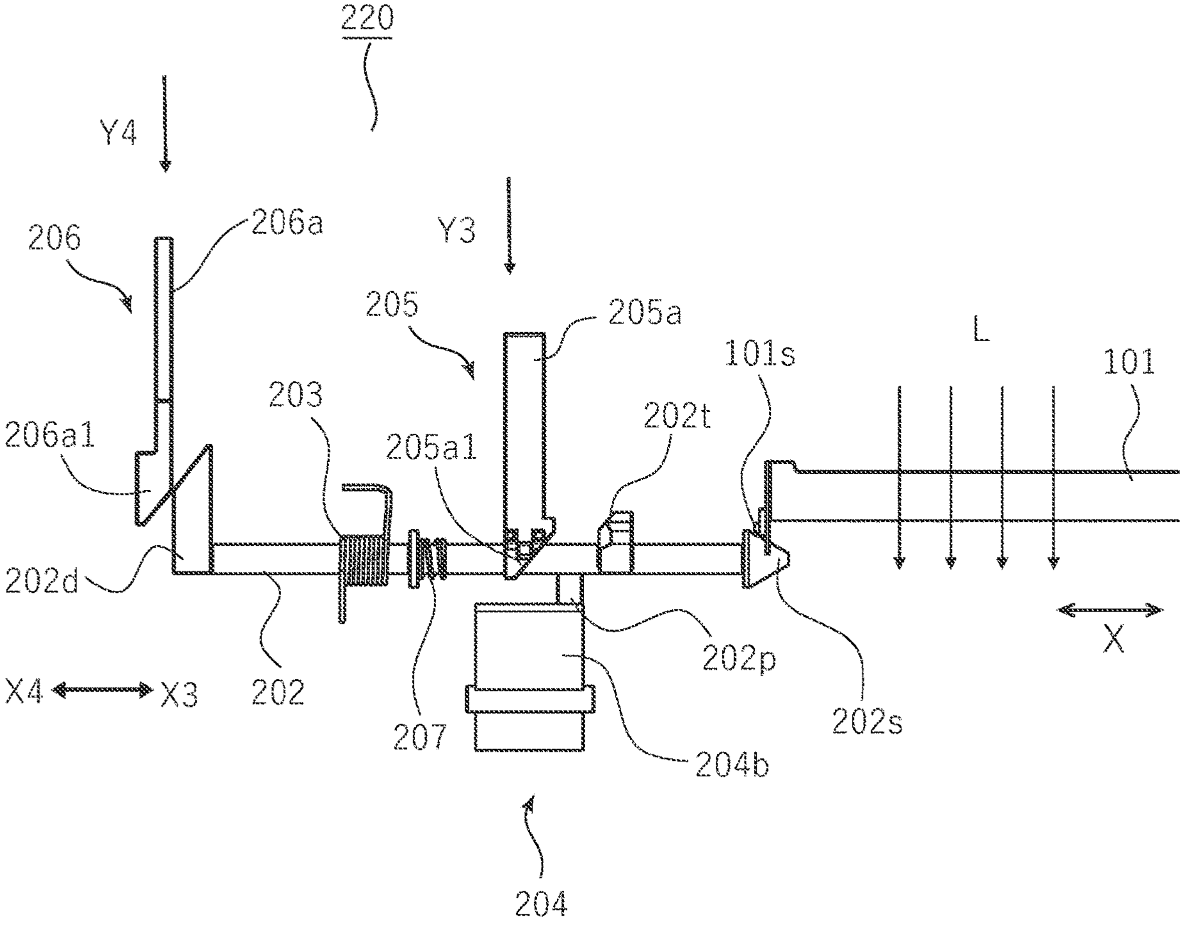
FIG. 10B is a view illustrating the shutter opening/closing mechanism according to the second embodiment.

FIGS. 7A to 7C are diagrams illustrating a state of the apparatus when both the process cartridge 50 and the toner cartridge 60 are not attached to the apparatus body 1 and the door 18 is at the open position. FIGS. 8A to 8D are diagrams illustrating a state of the apparatus when the process cartridge 50 is attached to the apparatus body 1, the toner cartridge 60 is not attached to the apparatus body 1, and the door 18 is at the open position. FIGS. 9A and 9B are diagrams illustrating a state of the apparatus when both the process cartridge 50 and the toner cartridge 60 are attached to the apparatus body 1 and the door 18 is at the open position. FIGS. 10A and 10B are diagrams illustrating a state of the apparatus when both the process cartridge 50 and the toner cartridge 60 are attached to the apparatus body 1 and the door 18 is at the closed position.

FIGS. 7A, 8A, 9A, and 10A are perspective views of the shutter 101 and the shutter opening/closing mechanism 220. FIGS. 7B and 8C are views of the shutter 101 and a part of the shutter opening/closing mechanism 220 as viewed in the X direction. FIGS. 7C and 8D are views of the shutter 101 and a part of the shutter opening/closing mechanism 220 as viewed in the X direction. FIGS. 8B, 9B, and 10B are views of the shutter 101 and the shutter opening/closing mechanism 220 as viewed from above. In each of FIGS. 7A to 10B, illustration of non-movable parts such as a holder, the process cartridge 50, and the toner cartridge 60 may be omitted for easy understanding. In any of the drawings, the optical path of the laser beam L is indicated by an arrow indicating a part of the light beam.

Shutter Opening/Closing Member

As illustrated in FIG. 7A, the shutter opening/closing member 202 includes a shaft portion 202*a*, a shutter contact portion 202*s*, a P-link pressed portion 202*p*, a T-link pressed portion 202*t*, and a D-link pressed portion 202*d*.

The shaft portion 202*a* is a shaft-shaped portion extending along the X direction. The shaft portion 202*a* is supported by a holder fixed to the frame body of the apparatus body 1 so as to be linearly movable in the X3 direction along the X direction and the opposite X4 direction, and to be rotatable in the R6 direction and the opposite direction around an axis extending in the X direction. That is, the moving member (shutter opening/closing member 202) of the present embodiment has at least two degrees of freedom of movement, that is, linear movement in the first direction (X direction) and rotation in the rotation direction around the axis extending in the first direction.

The shutter contact portion 202*s* is a portion that contacts the contacting portion 101*s* of the shutter 101. The shutter contact portion 202*s* of the present embodiment is formed in a substantially conical shape with an axis extending in the X direction as a center line. The P-link pressed portion 202*p* is a portion where the shutter opening/closing member 202 receives a force from the P-link mechanism 204. The T-link pressed portion 202*t* is a portion where the shutter opening/closing member 202 receives a force from the T-link mechanism 205. The D-link pressed portion 202*d* is a portion where the shutter opening/closing member 202 receives a force from the D-link mechanism 206. The functions of the pressed portions and the shutter contact portion 202*s* will be described later.

In the second embodiment, the shutter opening/closing member 202 is movable to the following four positions.

First position: a position at which both the process cartridge 50 and the toner cartridge 60 are not attached to the apparatus body 1 and the door 18 is in the open position (FIGS. 7A to 7C).

Second position: a position at which the process cartridge 50 is attached to the apparatus body 1, the toner cartridge 60 is not attached to the apparatus body 1, and the door 18 is at the open position (FIGS. 8A to 8D).

Third position: a position at which both the process cartridge 50 and the toner cartridge 60 are attached to the apparatus body 1 and the door 18 is in the open position (FIGS. 9A and 9B).

Fourth position: a position at which both the process cartridge 50 and the toner cartridge 60 are attached to the apparatus body 1 and the door 18 is in the closed position (FIGS. 10A and 10B).

The shutter opening/closing member 202 is configured to move from the first position to the fourth position through the second position and the third position when the door 18 is closed after the process cartridge 50 and the toner cartridge 60 are attached to the apparatus body 1 in this order. The shutter opening/closing member 202 moves the shutter 101 from the blocking position to the non-blocking position when moving from the third position to the fourth position. When the shutter opening/closing member 202 is positioned at the fourth position, the shutter 101 is held at the non-blocking position. When the shutter opening/closing member 202 is at a position other than the fourth position, the shutter 101 is configured to remain at the blocking position as in the first embodiment.

The shutter opening/closing member 202 is urged in a direction opposite to the rotation direction (direction R6) from the first position to the second position by the torsion coil spring 203 (FIG. 7A).

Further, the shutter opening/closing member 202 is urged in a direction (X4 direction) opposite to the moving direction from the second position to the third position by the compression spring 207 (FIG. 7A).

The first position and the second position are the same position in the X direction, and the rotation angle of the shutter opening/closing member 202 is different. The second position and the third position are different positions in the X direction, and the rotation angle of the shutter opening/closing member 202 is the same. The third position and the fourth position are different positions in the X direction, and the rotation angle of the shutter opening/closing member 202 is the same. The third position is a position between the second position and the fourth position in the X direction.

P-Link Mechanism

The P-link mechanism 204 interlocked with attachment and detachment of the process cartridge 50 will be described mainly with reference to FIGS. 7A and 8A.

As illustrated in FIG. 7A, the P-link mechanism 204 includes a P-lever 204*b*. The P-lever 204*b* is configured to move by being brought into contact with a part of the process cartridge 50 to press the shutter opening/closing member 202. Note that the P-flap 104*a* (FIG. 2B) similar to that of the first embodiment may be added, and when the P-flap 104*a* comes into contact with a part of the process cartridge 50 and moves, the P-lever 204*b* may be pressed by the P-flap 104*a* and move.

The P-lever 204*b* has a shaft portion rotatably supported by a holder fixed to the frame body of the apparatus body 1, and a contacting portion (first contacting portion) brought into contact with a part of the process cartridge 50. In addition, the P-lever 204*b* has a pressing portion (first pressing portion) capable of pressing the P-link pressed portion 202*p* of the shutter opening/closing member 202. The P-lever 204*b* is rotatable about the shaft portion. The P-lever 204*b* of the present embodiment rotates about an axis extending substantially in the X direction.

The operation of the P-link mechanism 204 when the process cartridge 50 is attached to the apparatus body 1 will be described.

In FIG. 7A, the process cartridge 50 and the toner cartridge 60 are not attached to the apparatus body 1, and the door 18 is positioned at the open position. In this case, the shutter opening/closing member 202 is positioned at the first position, and the P-lever 204*b* is not in contact with the P-link pressed portion 202*p* of the shutter opening/closing member 202. Further, since the shutter opening/closing member 202 is positioned at the first position, the shutter 101 is positioned at the blocking position.

Figure 8A:
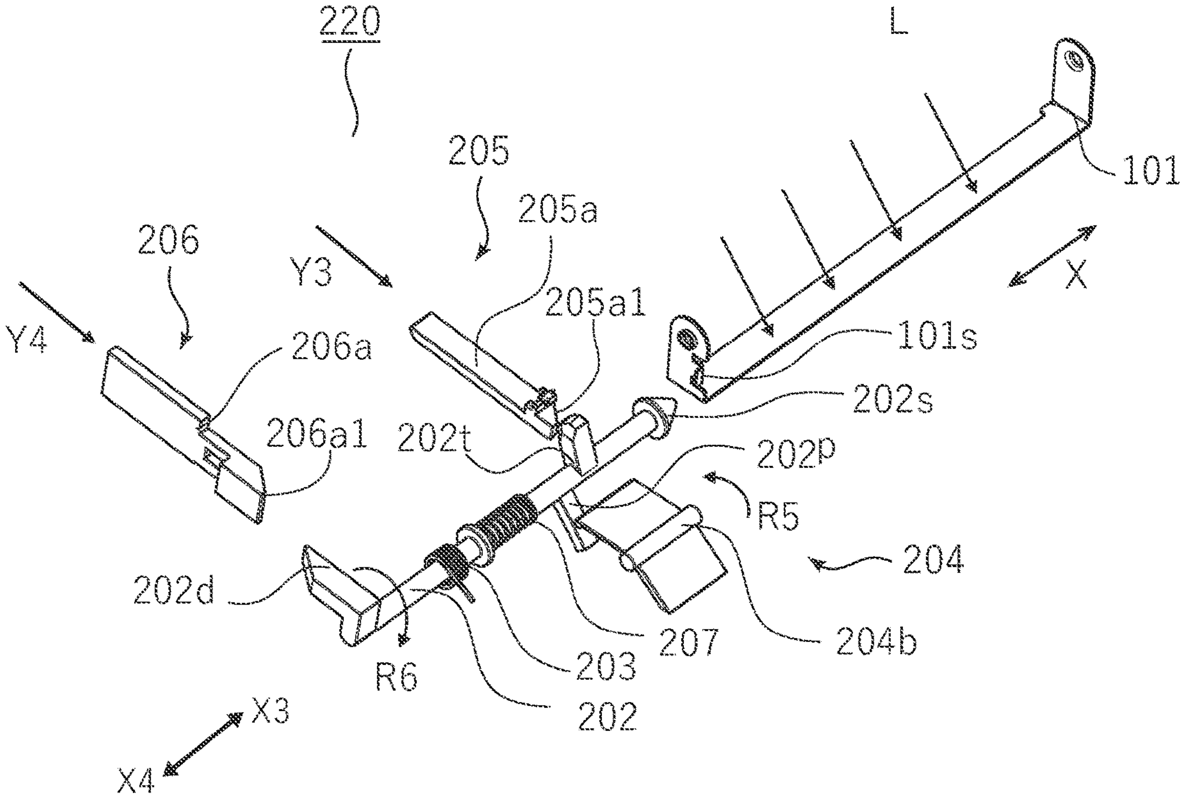
FIG. 8A is a view illustrating the shutter opening/closing mechanism according to the second embodiment.
Figure 8B:
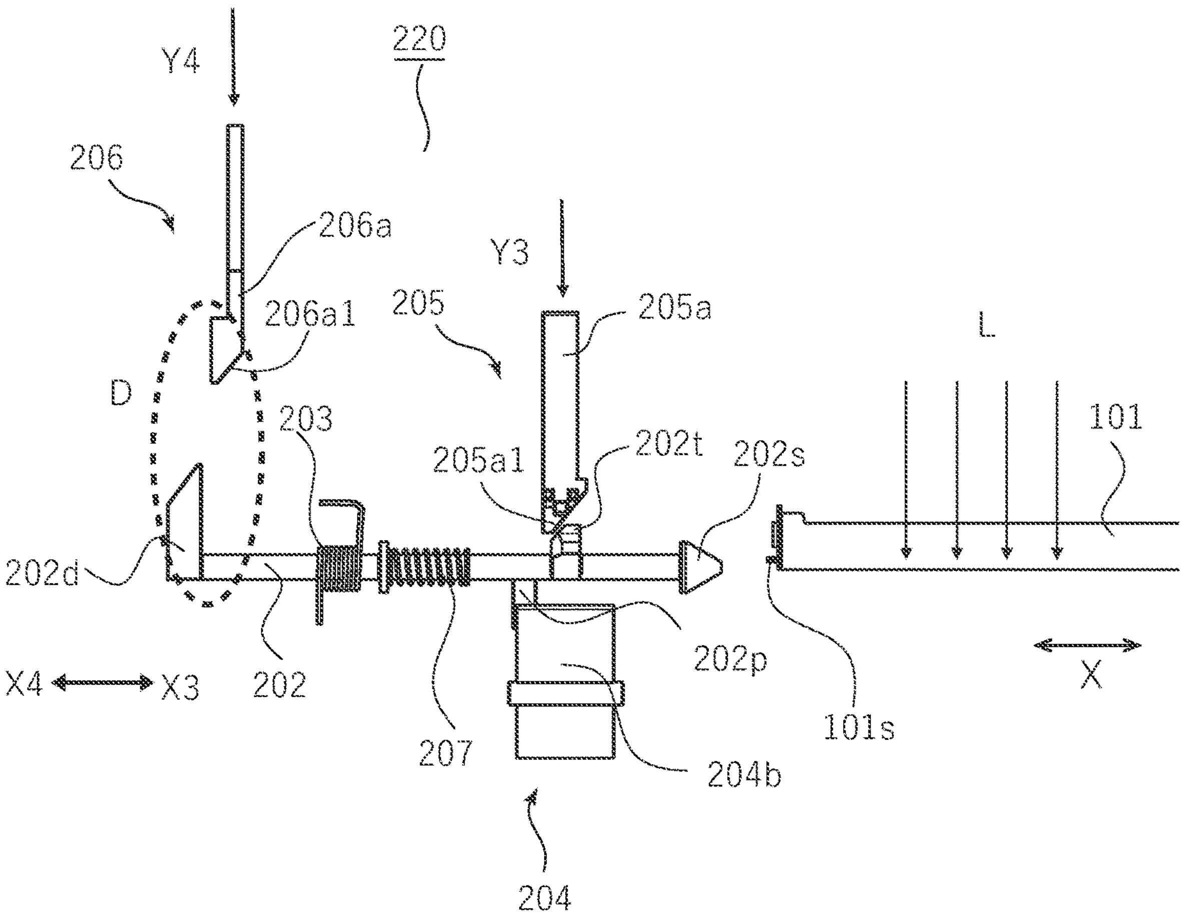
FIG. 8B is a view illustrating the shutter opening/closing mechanism according to the second embodiment.
Figure 8C:
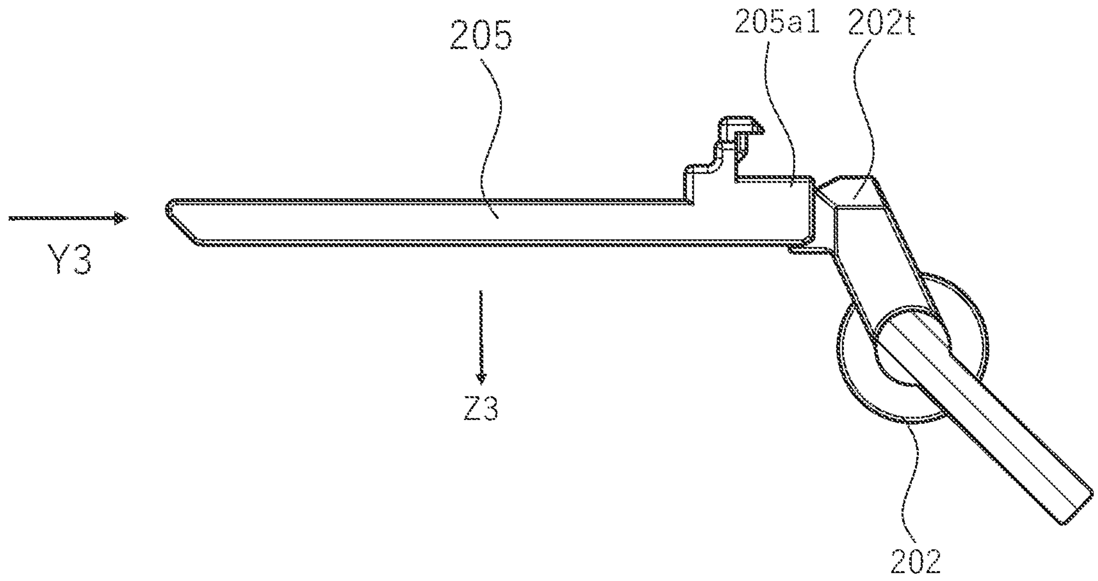
FIG. 8C is a view illustrating a part of the shutter opening/closing member and the T-link mechanism according to the second embodiment.
Figure 8D:
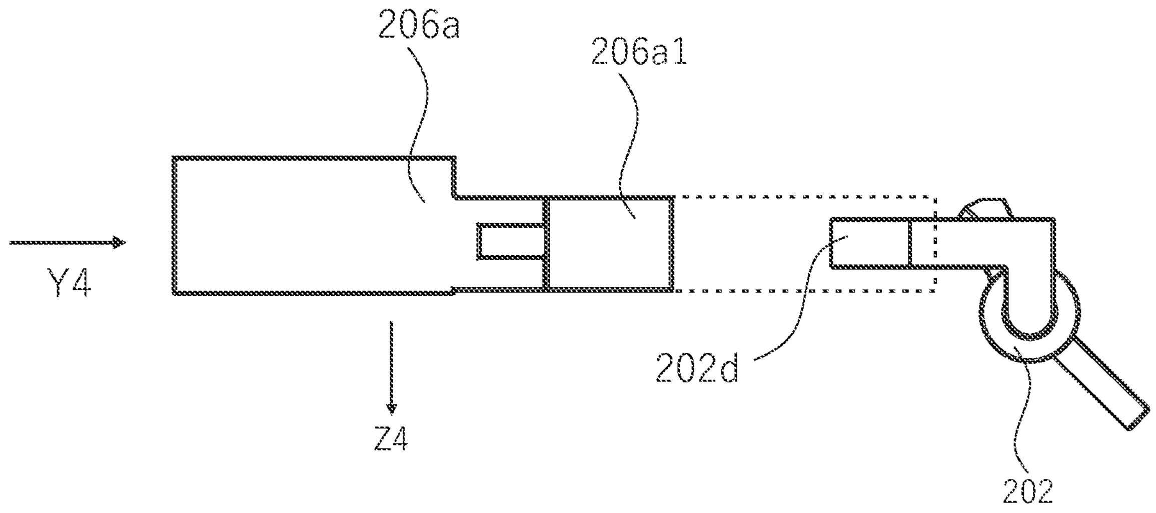
FIG. 8D is a view illustrating a part of the shutter opening/closing member and the D-link mechanism according to the second embodiment.

As illustrated in FIG. 8A, in the process of attaching the process cartridge 50 to the apparatus body 1, a part of the process cartridge 50 comes into contact with the P-lever 204*b*, and the P-lever 204*b* is rotated in the R5 direction. Then, the pressing portion of the P-lever 204*b* presses the P-link pressed portion 202*p* of the shutter opening/closing member 202, and rotates the shutter opening/closing member 202 in the R6 direction. As a result, the shutter opening/closing member 202 moves from the first position to the second position.

That is, the P-link mechanism 204 moves the shutter opening/closing member 202 from the first position to the second position in an interlocking manner with the attachment of the process cartridge 50 to the apparatus body 1.

While the shutter opening/closing member 202 moves from the first position to the second position, the shutter contact portion 202*s* of the shutter opening/closing member 202 does not come into contact with the contacting portion 101*s* of the shutter 101. Therefore, the shutter 101 remains at the blocking position at which the laser beam L is blocked (FIG. 8A). Note that even when the shutter opening/closing member 202 moves (rotates) from the first position (FIG. 7A) to the second position (FIG. 8A), the position of the shutter opening/closing member 202 in the X direction does not change.

In addition, as the shutter opening/closing member 202 moves (rotates) from the first position (FIG. 7B) to the second position (FIG. 8B), the T-link pressed portion 202*t* of the shutter opening/closing member 202 moves to a position where it can come into contact with the T-slider 205*a* of the T-link mechanism 205.

Note that when the process cartridge 50 is removed from the apparatus body 1 in the state of FIG. 8A, the shutter opening/closing member 202 moves from the second position to the first position in a process opposite to the above-described operation.

T-Link Mechanism

The T-link mechanism 205 interlocked with attachment and detachment of the toner cartridge 60 will be described mainly with reference to FIGS. 8A to 8C, 9A, and 9B.

As illustrated in FIGS. 8A to 9C, the T-link mechanism 205 includes a T-slider 205*a*. The T-slider 205*a* moves by being brought into contact with a part of the toner cartridge 60, and is configured to press the shutter opening/closing member 202. Note that the T-flap 105*g* (FIG. 4B) similar to that of the first embodiment may be added, and the T-slider 205*a* may be pressed by the T-flap 105*g* and moved when the T-flap 105*g* comes into contact with a part of the toner cartridge 60 and moves.

The T-slider 205*a* includes a contacting portion (second contacting portion) that comes into contact with a part of the toner cartridge 60 and a pressing portion 205*a*1 (FIGS. 8A and 8B, second pressing portion) that comes into contact with the T-link pressed portion 202*t* of the shutter opening/closing member 202. The T-slider 205*a* is movably supported in the Y3 direction and the opposite direction by a holder fixed to the frame body of the apparatus body 1. The Y3 direction is a direction intersecting (preferably orthogonal to) the X direction. The T-slider 205*a* is urged in the opposite direction of the Y3 direction by a tension spring.

The pressing portion 205*a*1 of the T-slider 205*a* and the T-link pressed portion 202*t* of the shutter opening/closing member 202 constitute a cam mechanism that converts the movement of the T-slider 205*a* in the Y3 direction into the movement of the shutter opening/closing member 202 in the X3 direction. In the present embodiment, both the pressing portion 205*a*1 and the T-link pressed portion 202*t* are inclined surfaces inclined with respect to both the X3 direction and the Y3 direction, but only one of them may be an inclined surface.

The operation of the T-link mechanism 205 when the toner cartridge 60 is attached to the apparatus body 1 will be described.

In FIGS. 8A to 8C, the process cartridge 50 is attached to the apparatus body 1, the toner cartridge 60 is not attached to the apparatus body 1, and the door 18 is positioned at the open position. In this case, the shutter opening/closing member 202 is positioned at the second position, and the pressing portion 205*a*1 of the T-slider 205*a* is not in contact with the T-link pressed portion 202*t* of the shutter opening/closing member 202 (FIG. 8B).

As illustrated in FIGS. 9A and 9B, in the process of attaching the toner cartridge 60 to the apparatus body 1, a part of the toner cartridge 60 comes into contact with the contacting portion of the T-slider 205*a*, and the T-slider 205*a* is moved in the Y3 direction. Then, the pressing portion 205*a*1 of the T-slider 205*a* slides on the T-link pressed portion 202*t* of the shutter opening/closing member 202. Then, the shutter opening/closing member 202 moves in the X3 direction against the urging force of the compression spring 207. As a result, the shutter opening/closing member 202 moves from the second position to the third position.

That is, the T-link mechanism 205 moves the shutter opening/closing member 202 from the second position to the third position in an interlocking manner with the attachment of the toner cartridge 60 to the apparatus body 1.

While the shutter opening/closing member 202 moves from the second position to the third position, the shutter contact portion 202*s* of the shutter opening/closing member 202 does not come into contact with the contacting portion 101*s* of the shutter 101. Therefore, the shutter 101 remains at the blocking position at which the laser beam L is blocked (FIGS. 9A and 9B).

In addition, as the shutter opening/closing member 202 moves (rotates) from the second position (FIG. 8B) to the third position (FIG. 9B), the D-link pressed portion 202*d* of the shutter opening/closing member 202 moves to a position where the D-link mechanism 206 can come into contact with the D-slider 206*a*.

When the toner cartridge 60 is removed from the apparatus body 1 in the state of FIGS. 9A and 9B, the shutter opening/closing member 202 moves from the third position to the second position in a process opposite to the above-described operation.

D-Link Mechanism

The D-link mechanism 206 interlocked with opening and closing of the door 18 will be described mainly with reference to FIGS. 9A, 9B, and 10A.

As illustrated in FIGS. 9A and 9B, the D-link mechanism 206 includes a D-slider 206*a*. The D-slider 206*a* moves in an interlocking manner with movement of the door 18 (FIG. 1) and presses the shutter opening/closing member 202. Note that the D-slider 206*a* may be directly connected (coupled) to the door 18, or may be connected (coupled) to the door 18 via, for example, the D-rod 106*c* (FIG. 2A) of the first embodiment.

The D-slider 206*a* has a pressing portion 206*a*1 (third pressing portion) capable of pressing the D-link pressed portion 202*d* of the shutter opening/closing member 202. The D-slider 206*a* is movably supported in the Y4 direction and the opposite direction by a holder fixed to the apparatus body 1. The Y4 direction is a direction intersecting (preferably orthogonal to) the X direction. The Y4 direction is not necessarily parallel to the Y3 direction (the moving direction of the T-slider 205*a*).

The pressing portion 206*a*1 (cam surface) of the D-slider 206*a* and the D-link pressed portion 202*d* of the shutter opening/closing member 202 constitute a cam mechanism that converts the movement of the D-slider 206*a* in the Y4 direction into the movement of the shutter opening/closing member 202 in the X3 direction. In the present embodiment, both the pressing portion 206*a*1 and the D-link pressed portion 202*d* are inclined surfaces inclined with respect to both the X3 direction and the Y4 direction, but only one of them may be an inclined surface.

The operation of the D-link mechanism 206 when the door 18 is closed will be described.

In FIGS. 9A and 9B, the process cartridge 50 and the toner cartridge 60 are attached to the apparatus body 1, and the door 18 is positioned at the open position. In this case, the shutter opening/closing member 202 is positioned at the third position, and the D-slider 206*a* is not in contact with the D-link pressed portion 202*d* of the shutter opening/closing member 202. In a state where the process cartridge 50 and the toner cartridge 60 are attached to the apparatus body 1 (a state where the shutter opening/closing member 202 is positioned at the third position), the movement locus of the pressing portion 206*a*1 and the D-link pressed portion 202*d* overlap each other. On the other hand, in a state where at least one of the process cartridge 50 and the toner cartridge 60 is not attached to the apparatus body 1, the movement locus of the pressing portion 206*a*1 and the D-link pressed portion 202*d* do not overlap each other.

As illustrated in FIGS. 10A and 10B, the D-slider 206*a* moves in the Y4 direction along with the movement of the door 18 from the open position to the closed position. Then, the pressing portion 206*a*1 of the D-slider 206*a* and the D-link pressed portion 202*d* of the shutter opening/closing member 202 slide, and the shutter opening/closing member 202 is moved in the X3 direction against the urging force of the compression spring 207. As a result, the shutter opening/closing member 202 moves from the third position to the fourth position.

That is, the D-link mechanism 206 moves the shutter opening/closing member 202 from the third position to the fourth position in an interlocking manner with the movement of the door 18 from the open position to the closed position.

In the process in which the shutter opening/closing member 202 moves from the third position to the fourth position, the shutter contact portion 202*s* of the shutter opening/closing member 202 comes into contact with the contacting portion 101*s* of the shutter 101, and the shutter opening/closing member 202 is rotated in the Ra direction of FIG. 9A. As a result, the shutter 101 moves from the blocking position to the non-blocking position, and the optical path of the laser beam L is opened (FIGS. 10A and 10B).

When the door 18 is moved from the closed position to the open position in the state of FIGS. 10A and 10B, the shutter opening/closing member 202 moves from the fourth position to the third position in a process opposite to the above-described operation.

Case where Door is Closed without Attaching Toner Cartridge

Next, an operation of the shutter opening/closing mechanism 220 when the door 18 is moved from the open position to the closed position in a state where the process cartridge 50 is attached to the apparatus body 1 and the toner cartridge 60 is not attached to the apparatus body 1 will be described.

In this case, as illustrated in FIG. 8B, in a state where the shutter opening/closing member 202 is positioned at the second position, the D-slider 206*a* moves in the Y3 direction in an interlocking manner with the movement of the door 18 from the open position to the closed position. In a state where the shutter opening/closing member 202 is positioned at the second position by the P-link mechanism 204, as indicated by a dotted line in FIG. 8D, the movement locus of the pressing portion 206*a*1 overlaps with the D-link pressed portion 202*d* when viewed in the X direction. On the other hand, the position of the pressing portion 206*a*1 and the position of the D-link pressed portion 202*d* in the X direction do not overlap. Specifically, as illustrated in a region D surrounded by a broken line in FIG. 8B, in a state where the shutter opening/closing member 202 is positioned at the second position, the D-link pressed portion 202*d* of the shutter opening/closing member 202 is separated from the pressing portion 206*a*1 of the D-slider 206*a* in the X direction. Therefore, even if the door 18 is moved from the open position to the closed position, the pressing portion 206*a*1 of the D-slider 206*a* does not come into contact with the D-link pressed portion 202*d* of the shutter opening/closing member 202, and the shutter opening/closing member 202 remains at the second position.

That is, when the door 18 is moved from the open position to the closed position in a state where the process cartridge 50 is attached to the apparatus body 1 and the toner cartridge 60 is not attached to the apparatus body 1, the shutter opening/closing member 202 remains at the second position. Since the shutter opening/closing member 202 remains at the second position, the shutter 101 is maintained at the blocking position.

Case where Door is Closed without Attaching Process Cartridge

Next, an operation of the shutter opening/closing mechanism 220 when the door 18 is moved from the open position to the closed position in a state where the process cartridge 50 is not attached to the apparatus body 1 and the toner cartridge 60 is attached to the apparatus body 1 will be described.

In this case, as illustrated in FIG. 7A, in a state where the shutter opening/closing member 202 is positioned at the first position, the T-slider 205*a* moves in the Y3 direction in an interlocking manner with the attachment of the toner cartridge 60. However, in a state where the shutter opening/closing member 202 is positioned at the first position, as illustrated in FIG. 7B, the T-link pressed portion 202*t* is positioned away from the pressing portion 205*a*1 of the T-slider 205*a* in the Z3 direction orthogonal to the Y3 direction when viewed in the X direction. Therefore, even if the T-slider 205*a* moves in the Y3 direction, the pressing portion 205*a*1 does not come into contact with the T-link pressed portion 202*t*. That is, even when the toner cartridge 60 is attached in a state where the process cartridge 50 is not attached to the apparatus body 1, the shutter opening/closing member 202 remains at the first position.

Then, in a state where the shutter opening/closing member 202 is positioned at the first position, as indicated by a dotted line in FIG. 7C, the D-link pressed portion 202*d* does not overlap the movement locus of the pressing portion 206*a*1. That is, the D-link pressed portion 202*d* is positioned away from the pressing portion 206*a*1 of the D-slider 206*a* in the Z4 direction orthogonal to the Y4 direction when viewed in the X direction. Therefore, even if the D-slider 206*a* moves in the Y4 direction in an interlocking manner with the movement of the door 18 from the open position to the closed position, the pressing portion 206*a*1 does not come into contact with the D-link pressed portion 202*d*, and the shutter opening/closing member 202 remains at the first position.

That is, when the door 18 is moved from the open position to the closed position in a state where the process cartridge 50 is not attached to the apparatus body 1 and the toner cartridge 60 is attached to the apparatus body 1, the shutter opening/closing member 202 remains at the first position. Since the shutter opening/closing member 202 remains at the first position, the shutter 101 is maintained at the blocking position.

Case where Door is Closed without Attaching Both Cartridges

Next, an operation of the shutter opening/closing mechanism 220 when the door 18 is moved from the open position to the closed position in a state where both the process cartridge 50 and the toner cartridge 60 are not attached to the apparatus body 1 will be described.

In this case, as illustrated in FIG. 7A, in a state where the shutter opening/closing member 202 is positioned at the first position, the D-slider 206*a* moves in the Y4 direction in an interlocking manner with the movement of the door 18 from the open position to the closed position. However, in a state where the shutter opening/closing member 202 is positioned at the first position, as illustrated in FIG. 7C, in the Z4 direction orthogonal to the Y4 direction when viewed in the X direction, the D-link pressed portion 202*d* is positioned away from the pressing portion 206*a*1 of the D-slider 206*a*. Therefore, even if the D-slider 206*a* moves in the Y4 direction, the pressing portion 206*a*1 does not come into contact with the D-link pressed portion 202*d*, and the shutter opening/closing member 202 remains at the first position.

That is, when the door 18 is moved from the open position to the closed position in a state where both the process cartridge 50 and the toner cartridge 60 are not attached to the apparatus body 1, the shutter opening/closing member 202 remains at the first position. Since the shutter opening/closing member 202 remains at the first position, the shutter 101 is maintained at the blocking position.

Summary of Present Embodiment

As described above, when both the process cartridge 50 and the toner cartridge 60 are attached to the apparatus body 1 and the door 18 is at the closed position, the shutter opening/closing mechanism 220 according to the present embodiment positions the shutter 101 at the non-blocking position. In each of a case where the process cartridge 50 is not attached to the apparatus body 1, a case where the toner cartridge 60 is not attached to the apparatus body 1, and a case where the door 18 is at the open position, the shutter 101 is positioned at the blocking position.

In other words, in the interlocking mechanism of the present embodiment, the shutter member is positioned at the non-blocking position in a state where the first unit and the second unit are attached to the apparatus body and the opening/closing member is positioned at the closed position. In each of the case where the first unit is not attached to the apparatus body, the case where the second unit is not attached to the apparatus body, and the case where the opening/closing member is positioned at the open position, the shutter member is positioned at the blocking position.

With this configuration, in the configuration in which the two units (50, 60) are attachable to and detachable from the apparatus body 1, even if the opening/closing member is closed in a state where any of the units is not attached, the possibility that the laser beam leaks to the outside of the image forming apparatus can be reduced.

Further, in the present embodiment, the above-described position control of the shutter 101 is realized by the shutter opening/closing mechanism 220 interlocked with the process cartridge 50, the toner cartridge 60, and the door 18. Therefore, it is possible to reduce the possibility that the laser beam leaks to the outside of the printer P while reducing the number of electric components as compared with a configuration using a plurality of interlock switches.

Also in the present embodiment, the first interlocking portion rotates the moving member to the same position as the predetermined position in the rotation direction in an interlocking manner with the attachment of the first unit to the apparatus body. The second interlocking portion linearly moves the moving member to the same position as the predetermined position in the first direction in an interlocking manner with attachment of the second unit to the apparatus body. As described above, by disposing the moving member having two or more degrees of freedom of movement and moving the moving member in different directions when the first unit is attached and when the second unit is attached, it is possible to reduce the possibility of leakage of the laser beam to the outside with a relatively simple configuration. Similarly to the modified example of the first embodiment, the components of the P-link mechanism 204 and the T-link mechanism 205 may be replaced such that the P-link mechanism 204 (first interlocking portion) linearly moves the moving member and the T-link mechanism 205 (second interlocking portion) rotates the moving member.

Third Embodiment

A third embodiment will be described. Hereinafter, elements denoted by reference numerals common to the first and second embodiments are assumed to have substantially the same configurations and functions as those described in the first and second embodiments unless otherwise specified, and portions different from the first and second embodiments will be mainly described. The present embodiment is different from the second embodiment in the specific configuration of the P-link mechanism 304, and the other parts are basically common to the second embodiment.

Figure 11A:
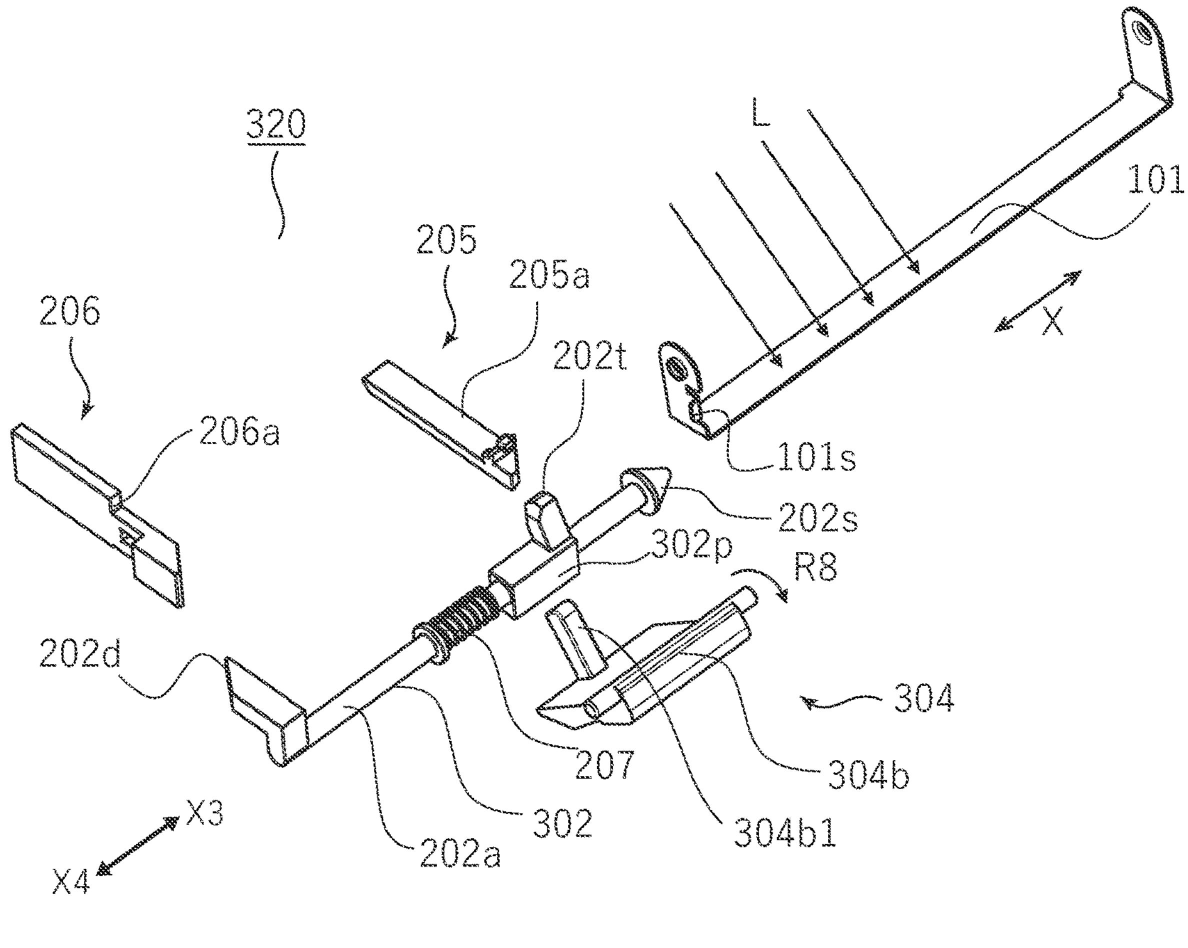
FIG. 11A is a view illustrating a shutter opening/closing mechanism according to a third embodiment.

As illustrated in FIG. 11A, the shutter opening/closing mechanism 320 of the third embodiment includes a shutter opening/closing member 302, a compression spring 207, a P-link mechanism 304, a T-link mechanism 205, and a D-link mechanism 206. The configurations and operations of the compression spring 207, the T-link mechanism 205, and the D-link mechanism 206 are basically the same as those in the second embodiment.

Hereinafter, the configuration and operation of the shutter opening/closing mechanism 320 in the third embodiment will be described with reference to FIGS. 11A to 12C.

Figure 11B:
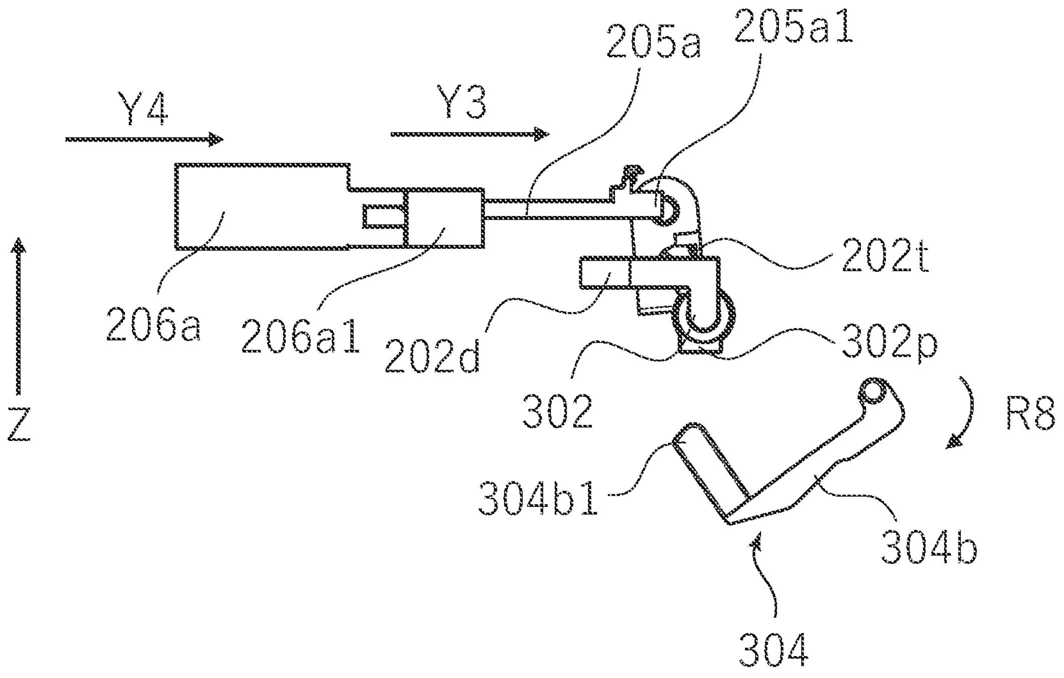
FIG. 11B is a view illustrating the shutter opening/closing mechanism according to the third embodiment.
Figure 12A:
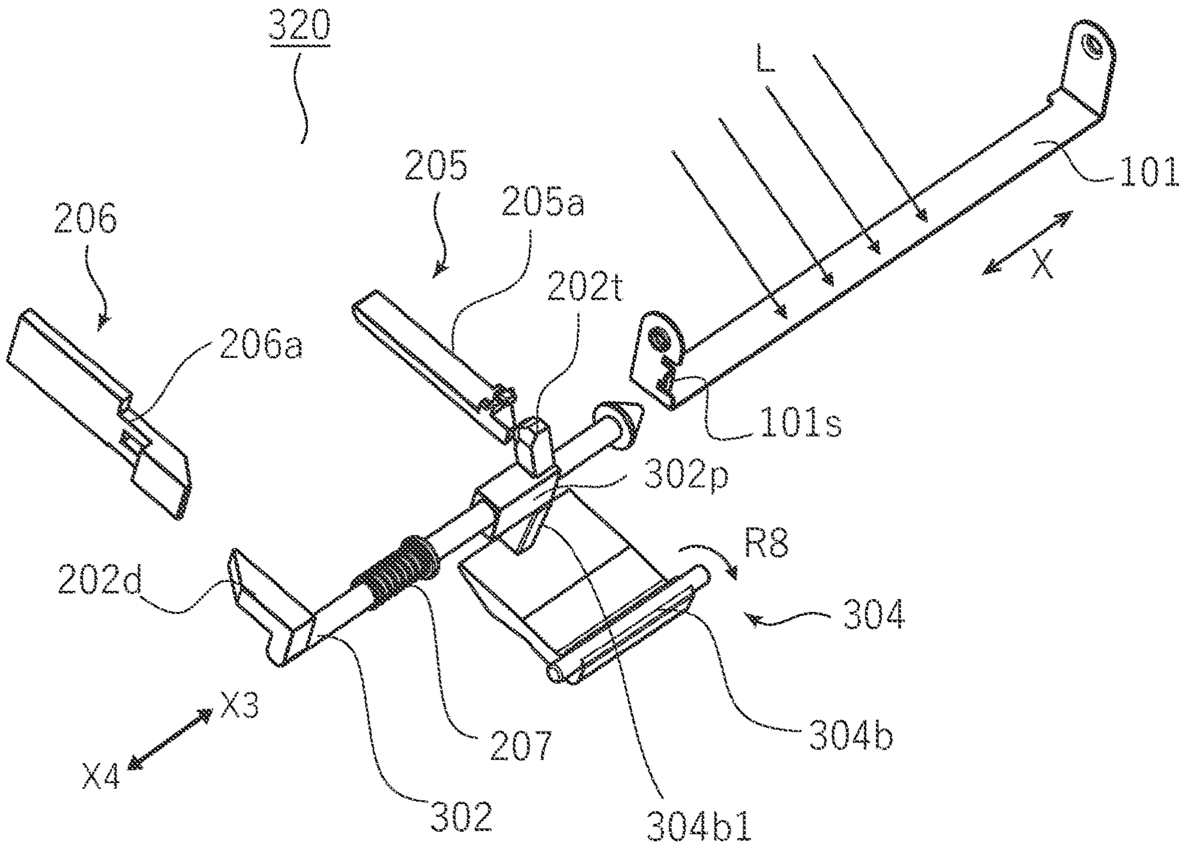
FIG. 12A is a view illustrating the shutter opening/closing mechanism according to the third embodiment.
Figure 12B:
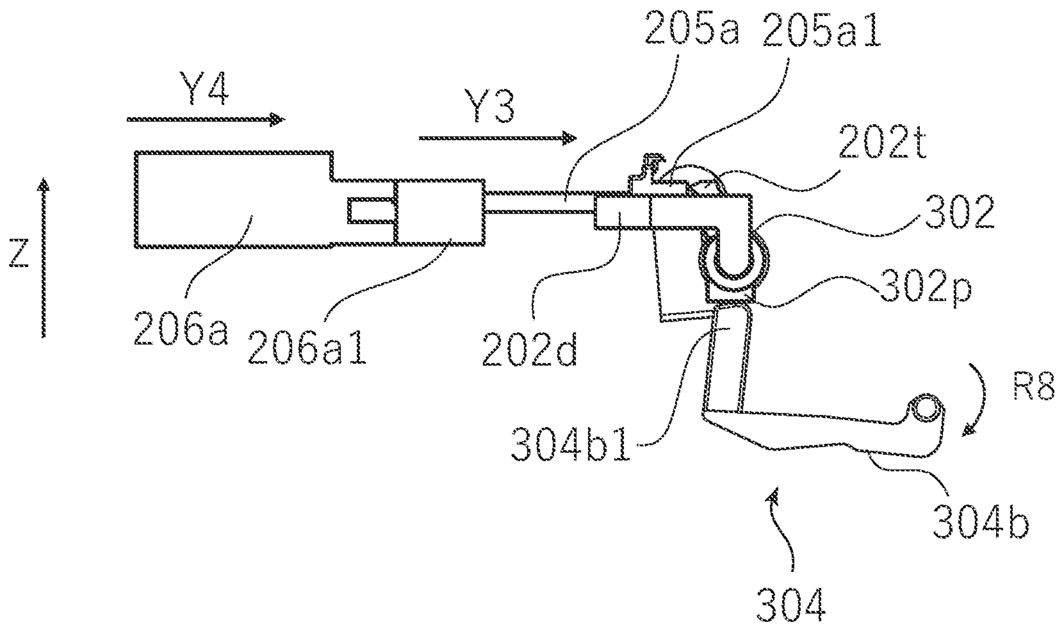
FIG. 12B is a view illustrating the shutter opening/closing mechanism according to the third embodiment.
Figure 12C:
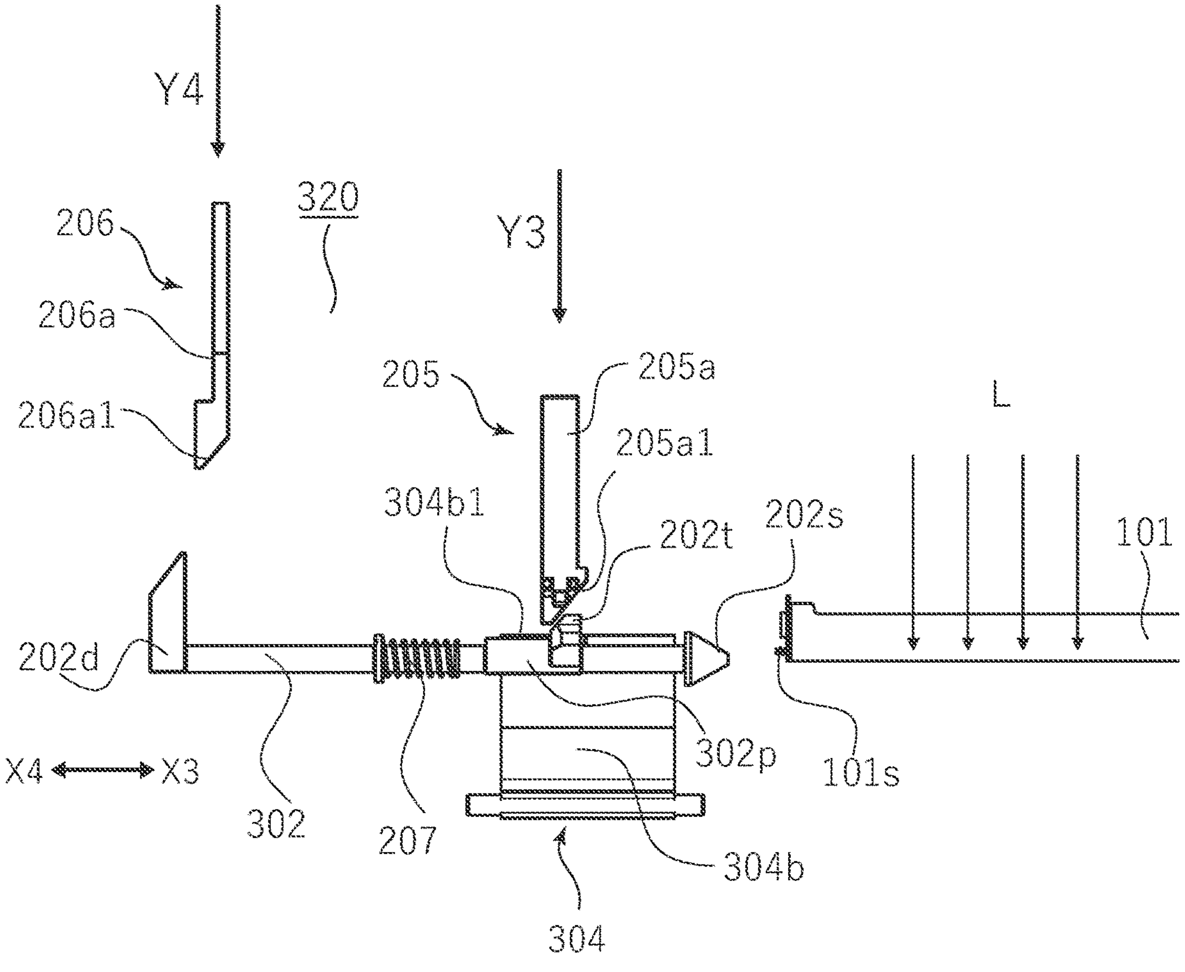
FIG. 12C is a view illustrating the shutter opening/closing mechanism according to the third embodiment.

FIGS. 11A and 11B are diagrams illustrating a state of the apparatus when both the process cartridge 50 and the toner cartridge 60 are not attached to the apparatus body 1 and the door 18 is at the open position. FIGS. 12A to 12C are diagrams illustrating a state of the apparatus when the process cartridge 50 is attached to the apparatus body 1, the toner cartridge 60 is not attached to the apparatus body 1, and the door 18 is at the open position.

FIGS. 11A and 12A are perspective views of the shutter 101 and the shutter opening/closing mechanism 320. FIGS. 11B and 12B are views of the shutter 101 and the shutter opening/closing mechanism 320 as viewed in the X direction. FIG. 12C is a view of the shutter 101 and the shutter opening/closing mechanism 320 as viewed from above. In each of FIGS. 11A to 12C, illustration of non-movable parts such as a holder, the process cartridge 50, and the toner cartridge 60 may be omitted for easy understanding. In any of the drawings, the optical path of the laser beam L is indicated by an arrow indicating a part of the light beam.

Shutter Opening/Closing Member

As illustrated in FIG. 11A, the shutter opening/closing member 302 includes a shaft portion 202*a*, a shutter contact portion 202*s*, a P-link pressed portion 302*p*, a T-link pressed portion 202*t*, and a D-link pressed portion 202*d*. The P-link pressed portion 302*p* is a portion where the shutter opening/closing member 302 receives a force from the P-link mechanism 304.

The shaft portion 202*a* is a shaft-shaped portion extending along the X direction. The shaft portion 202*a* is supported by a holder fixed to the frame body of the apparatus body 1 so as to be movable in the X3 direction and the opposite X4 direction and movable in the Z direction intersecting the X3 direction. That is, the moving member (shutter opening/closing member 302) of the present embodiment has at least two degrees of freedom of movement, that is, linear movement in the third direction (X direction) and linear movement in the second direction (Z direction) intersecting the third direction. In the third embodiment, the rotation angle of the shutter opening/closing member 302 does not change.

In the third embodiment, the shutter opening/closing member 302 is movable to the following four positions.

First position: a position where neither the process cartridge 50 nor the toner cartridge 60 is attached to the apparatus body 1 and the door 18 is in the open position (FIGS. 11A and 11B).

Second position: a position at which the process cartridge 50 is attached to the apparatus body 1, the toner cartridge 60 is not attached to the apparatus body 1, and the door 18 is at the open position (FIGS. 12A to 12C).

Third position: a position at which both the process cartridge 50 and the toner cartridge 60 are attached to the apparatus body 1 and the door 18 is in the open position.

Fourth position: a position where both the process cartridge 50 and the toner cartridge 60 are attached to the apparatus body 1 and the door 18 is in the closed position.

The first position and the second position are the same position in the X direction and different positions in the Z direction. The second position and the third position are different positions in the X direction, and are the same position in the Z direction. The third position and the fourth position are different positions in the X direction, and are the same position in the Z direction. The third position is a position between the second position and the fourth position in the X direction.

P-Link Mechanism

The P-link mechanism 304 interlocked with attachment and detachment of the process cartridge 50 will be described with reference to FIGS. 11A to 12C.

As illustrated in FIG. 11A, the P-link mechanism 304 includes a P-lever 304*b*. The P-lever 304*b* is configured to move by being brought into contact with a part of the process cartridge 50 to press the shutter opening/closing member 302. Note that the P-flap 104*a* (FIG. 2B) similar to that of the first embodiment may be added, and when the P-flap 104*a* comes into contact with a part of the process cartridge 50 and moves, the P-lever 304*b* may be pressed by the P-flap 104*a* and move.

The P-lever 304*b* has a shaft portion rotatably supported by a holder fixed to the frame body of the apparatus body 1, and a contacting portion (first contacting portion) brought into contact with apart of the process cartridge 50. In addition, the P-lever 304*b* includes a pressing portion 304*b*1 (first pressing portion) capable of pressing the P-link pressed portion 302*p* of the shutter opening/closing member 302. The P-lever 304*b* is rotatable about the shaft portion. The P-lever 304*b* of the present embodiment rotates about an axis extending substantially in the X direction.

The operation of the P-link mechanism 204 when the process cartridge 50 is attached to the apparatus body 1 will be described.

In FIG. 11A, the process cartridge 50 and the toner cartridge 60 are not attached to the apparatus body 1, and the door 18 is positioned at the open position. In this case, the shutter opening/closing member 302 is positioned at the first position, and the P-lever 304*b* is not in contact with the P-link pressed portion 302*p* of the shutter opening/closing member 302. Further, since the shutter opening/closing member 302 is positioned at the first position, the shutter 101 is positioned at the blocking position.

As illustrated in FIGS. 12A and 12B, in the process of attaching the process cartridge 50 to the apparatus body 1, a part of the process cartridge 50 comes into contact with the P-lever 304*b*, and the P-lever 304*b* is rotated in the R8 direction. Then, the pressing portion 304*b*1 of the P-lever 304*b* presses the P-link pressed portion 302*p* of the shutter opening/closing member 302, and moves the shutter opening/closing member 302 in the Z direction. As a result, the shutter opening/closing member 302 moves from the first position to the second position.

That is, the P-link mechanism 304 moves the shutter opening/closing member 302 from the first position to the second position in an interlocking manner with the attachment of the process cartridge 50 to the apparatus body 1.

In the process in which the shutter opening/closing member 302 moves from the first position to the second position, the shutter contact portion 202*s* of the shutter opening/closing member 302 does not come into contact with the contacting portion 101*s* of the shutter 101. Therefore, the shutter 101 remains at the blocking position at which the laser beam L is blocked (FIG. 12A). Further, even when the shutter opening/closing member 302 moves from the first position (FIG. 11A) to the second position (FIG. 12A), the position of the shutter opening/closing member 302 in the X direction does not change.

Operation after Attaching Process Cartridge

When the shutter opening/closing member 302 moves from the first position (FIG. 11B) to the second position (FIG. 12B) by attachment of the process cartridge 50, the T-link pressed portion 202*t* of the shutter opening/closing member 302 moves to a position capable of coming into contact with the T-slider 205*a*. That is, the state in which the shutter opening/closing member 302 is positioned at the second position can be said to be the same as the state in which the shutter opening/closing member 302 is positioned at the second position in the second embodiment in relation to the T-link mechanism 205 and the D-link mechanism 206.

Therefore, when the toner cartridge 60 is attached to the apparatus body 1 in the state of FIGS. 12A to 12C and the door 18 is further moved from the open position to the closed position, the shutter opening/closing member 302 moves from the second position to the fourth position via the third position. Then, while the shutter opening/closing member 302 moves from the third position to the fourth position, the shutter 101 is moved from the blocking position to the non-blocking position.

In addition, when the door 18 is closed without attaching the toner cartridge 60 in the state of FIGS. 12A to 12C, the shutter opening/closing member 302 remains at the second position and the shutter 101 is maintained at the blocking position for the same reason as described in the second embodiment.

Case where Door is Closed without Attaching Process Cartridge

Next, an operation of the shutter opening/closing mechanism 320 when the door 18 is moved from the open position to the closed position in a state where the process cartridge 50 is not attached to the apparatus body 1 and the toner cartridge 60 is attached to the apparatus body 1 will be described.

In this case, as illustrated in FIG. 11A, in a state where the shutter opening/closing member 302 is positioned at the first position, the T-slider 205*a* moves in the Y3 direction in an interlocking manner with the attachment of the toner cartridge 60. However, in a state where the shutter opening/closing member 302 is positioned at the first position, as illustrated in FIG. 11B, in the Z direction intersecting the Y3 direction when viewed in the X direction, the T-link pressed portion 202*t* is positioned away from the pressing portion 205*a*1 of the T-slider 205*a*. Therefore, even if the T-slider 205*a* moves in the Y3 direction, the pressing portion 205*a*1 does not come into contact with the T-link pressed portion 202*t*. That is, even when the toner cartridge 60 is attached in a state where the process cartridge 50 is not attached to the apparatus body 1, the shutter opening/closing member 302 remains at the first position.

In the state where the shutter opening/closing member 302 is positioned at the first position, as illustrated in FIG. 11B, in the Z direction intersecting the Y4 direction when viewed in the X direction, the D-link pressed portion 202*d* is positioned away from the pressing portion 206*a*1 of the D-slider 206*a*. Therefore, even if the D-slider 206*a* moves in the Y4 direction, the pressing portion 206*a*1 does not come into contact with the D-link pressed portion 202*d*, and the shutter opening/closing member 302 remains at the first position.

That is, when the door 18 is moved from the open position to the closed position in a state where the process cartridge 50 is not attached to the apparatus body 1 and the toner cartridge 60 is attached to the apparatus body 1, the shutter opening/closing member 302 remains at the first position. Since the shutter opening/closing member 302 remains at the first position, the shutter 101 is maintained at the blocking position.

Case where Door is Closed without Attaching Both Cartridges

Next, an operation of the shutter opening/closing mechanism 220 when the door 18 is moved from the open position to the closed position in a state where both the process cartridge 50 and the toner cartridge 60 are not attached to the apparatus body 1 will be described.

In this case, as illustrated in FIG. 11A, in a state where the shutter opening/closing member 302 is positioned at the first position, the D-slider 206*a* moves in the Y4 direction in an interlocking manner with the movement of the door 18 from the open position to the closed position. However, in a state where the shutter opening/closing member 302 is positioned at the first position, as illustrated in FIG. 11B, in the Z direction intersecting the Y4 direction when viewed in the X direction, the D-link pressed portion 202*d* is positioned away from the pressing portion **206*a*1 of the D-slider 206*a*. Therefore, even if the D-slider 206*a* moves in the Y4 direction, the pressing portion 206*a*1 does not come into contact with the D-link pressed portion 202*d*, and the shutter opening/closing member 302** remains at the first position.

That is, when the door 18 is moved from the open position to the closed position in a state where both the process cartridge 50 and the toner cartridge 60 are not attached to the apparatus body 1, the shutter opening/closing member 302 remains at the first position. Since the shutter opening/closing member 302 remains at the first position, the shutter 101 is maintained at the blocking position.

Summary of Present Embodiment

As described above, when both the process cartridge 50 and the toner cartridge 60 are attached to the apparatus body 1 and the door 18 is at the closed position, the shutter opening/closing mechanism 320 according to the present embodiment positions the shutter 101 at the non-blocking position. In each of a case where the process cartridge 50 is not attached to the apparatus body 1, a case where the toner cartridge 60 is not attached to the apparatus body 1, and a case where the door 18 is at the open position, the shutter 101 is positioned at the blocking position.

In other words, in the interlocking mechanism of the present embodiment, the shutter member is positioned at the non-blocking position in a state where the first unit and the second unit are attached to the apparatus body and the opening/closing member is positioned at the closed position. In each of the case where the first unit is not attached to the apparatus body, the case where the second unit is not attached to the apparatus body, and the case where the opening/closing member is positioned at the open position, the shutter member is positioned at the blocking position.

With this configuration, in the configuration in which the two units (50, 60) are attachable to and detachable from the apparatus body 1, even if the opening/closing member is closed in a state where any of the units is not attached, the possibility that the laser beam leaks to the outside of the image forming apparatus can be reduced.

Further, in the present embodiment, the above-described position control of the shutter 101 is realized by the shutter opening/closing mechanism 320 interlocked with the process cartridge 50, the toner cartridge 60, and the door 18. Therefore, it is possible to reduce the possibility that the laser beam leaks to the outside of the printer P while reducing the number of electric components as compared with a configuration using a plurality of interlock switches.

In the present embodiment, the P-link mechanism 304 linearly moves the shutter opening/closing member 102 to the same position as the predetermined position (third position) in the second direction (Z direction) in an interlocking manner with the attachment of the process cartridge 50 to the apparatus body 1. The T-link mechanism 105 linearly moves the shutter opening/closing member 102 to the same position as a predetermined position (third position) in the third direction (X direction) in an interlocking manner with the attachment of the toner cartridge 60 to the apparatus body 1. In other words, the first interlocking portion linearly moves the moving member to the same position as the predetermined position in the second direction in an interlocking manner with attachment of the first unit to the apparatus body. The second interlocking portion linearly moves the moving member to the same position as the predetermined position in the third direction in an interlocking manner with attachment of the second unit to the apparatus body.

As described above, by disposing the moving member having two or more degrees of freedom of movement and moving the moving member in different directions when the first unit is attached and when the second unit is attached, it is possible to reduce the possibility of leakage of the laser beam to the outside with a relatively simple configuration.

Fourth Embodiment

A fourth embodiment will be described. Hereinafter, elements denoted with the same reference numerals as those in the first embodiment will have substantially the same configurations and functions as those described in the first embodiment unless otherwise specified, and portions different from those in the first embodiment will be mainly described. The present embodiment is different from the first embodiment in the specific configuration of the shutter opening/closing mechanism 420, and the other parts are basically common to the first embodiment.

Figure 13:
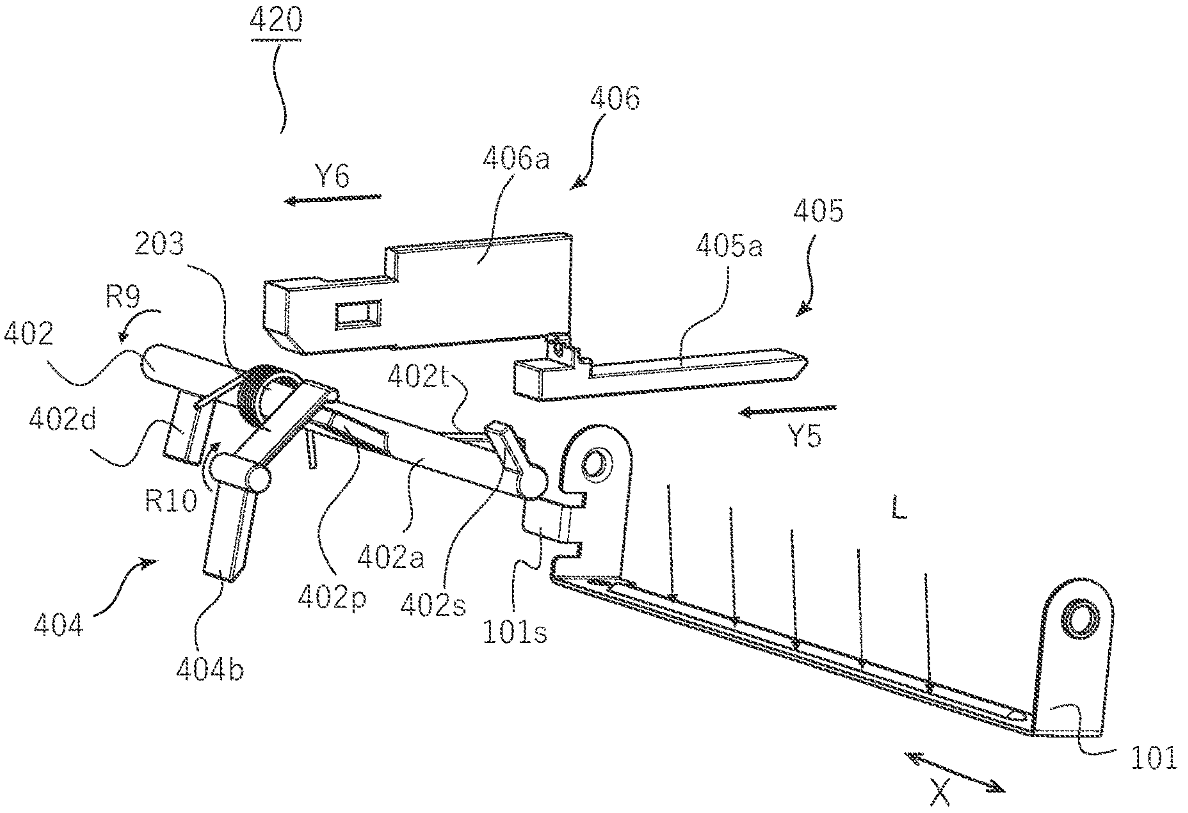
FIG. 13 is a view illustrating a shutter opening/closing mechanism according to a fourth embodiment.

As illustrated in FIG. 13, the shutter opening/closing mechanism 420 of the fourth embodiment includes a shutter opening/closing member 402, a torsion coil spring 203, a P-link mechanism 404, a T-link mechanism 405, and a D-link mechanism 406.

The shutter opening/closing member 402 acts on the shutter 101. The torsion coil spring 203 is an urging member that urges the shutter opening/closing member 402 in a predetermined rotation direction. The P-link mechanism 404 connects (couples) the process cartridge 50 and the shutter opening/closing member 202 in an interlocking manner. The T-link mechanism 405 connects (couples) the toner cartridge 60 and the shutter opening/closing member 202 in an interlocking manner. The D-link mechanism 406 connects (couples) the door 18 and the shutter opening/closing member 202 in an interlocking manner.

Hereinafter, the configuration and operation of each unit of the shutter opening/closing mechanism 420 according to the fourth embodiment will be described with reference to FIGS. 13 to 16.

Figure 14:
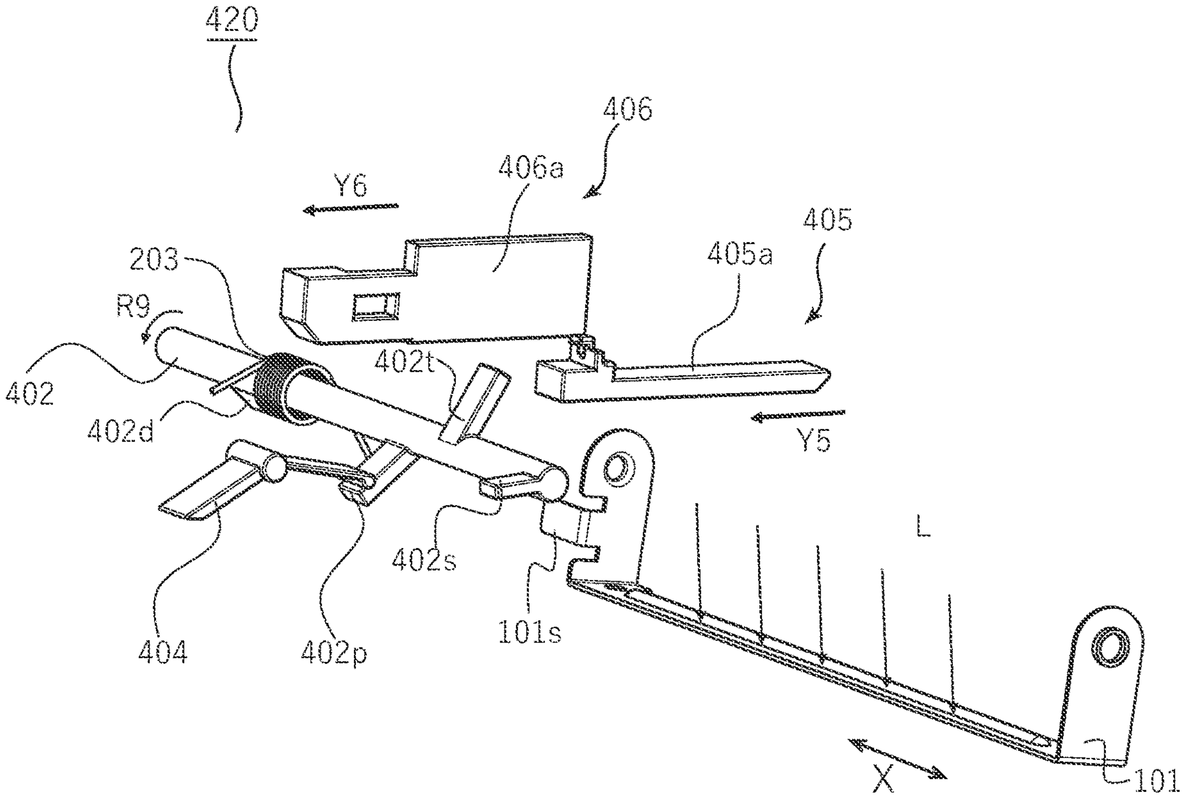
FIG. 14 is a view illustrating the shutter opening/closing mechanism according to the fourth embodiment.
Figure 15:
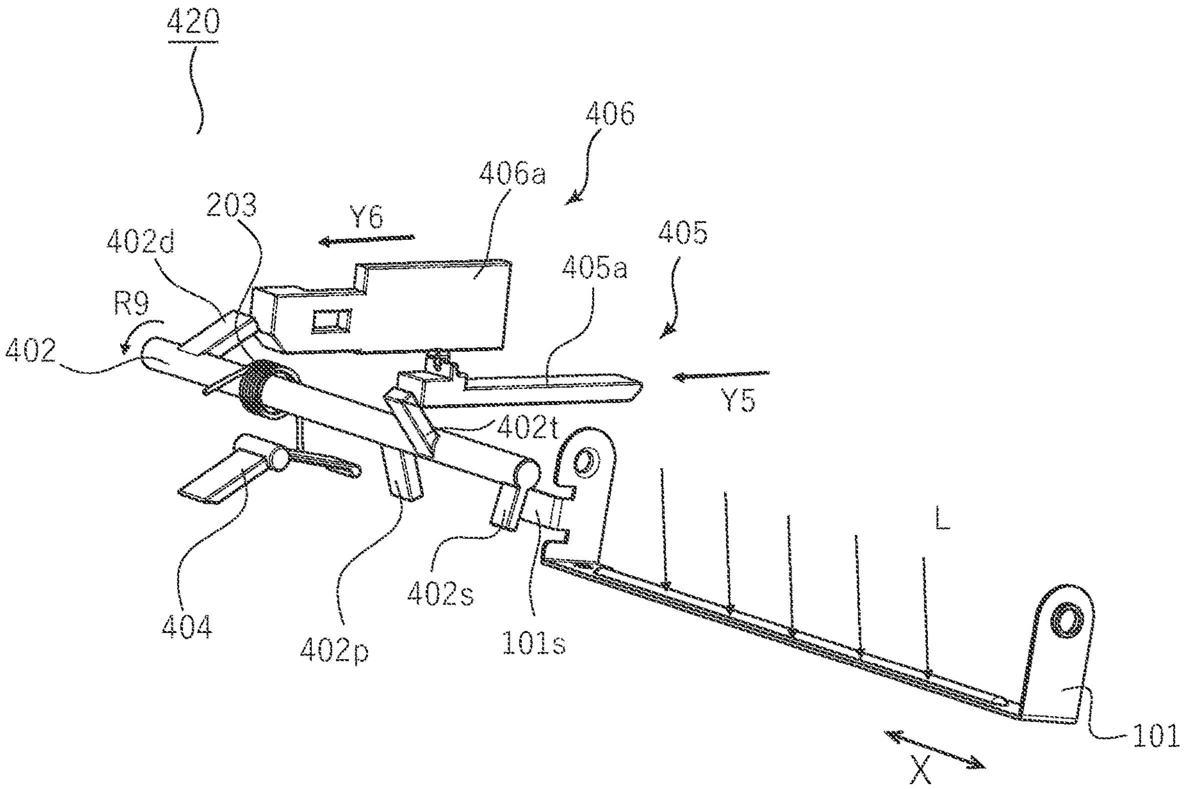
FIG. 15 is a view illustrating the shutter opening/closing mechanism according to the fourth embodiment.
Figure 16:
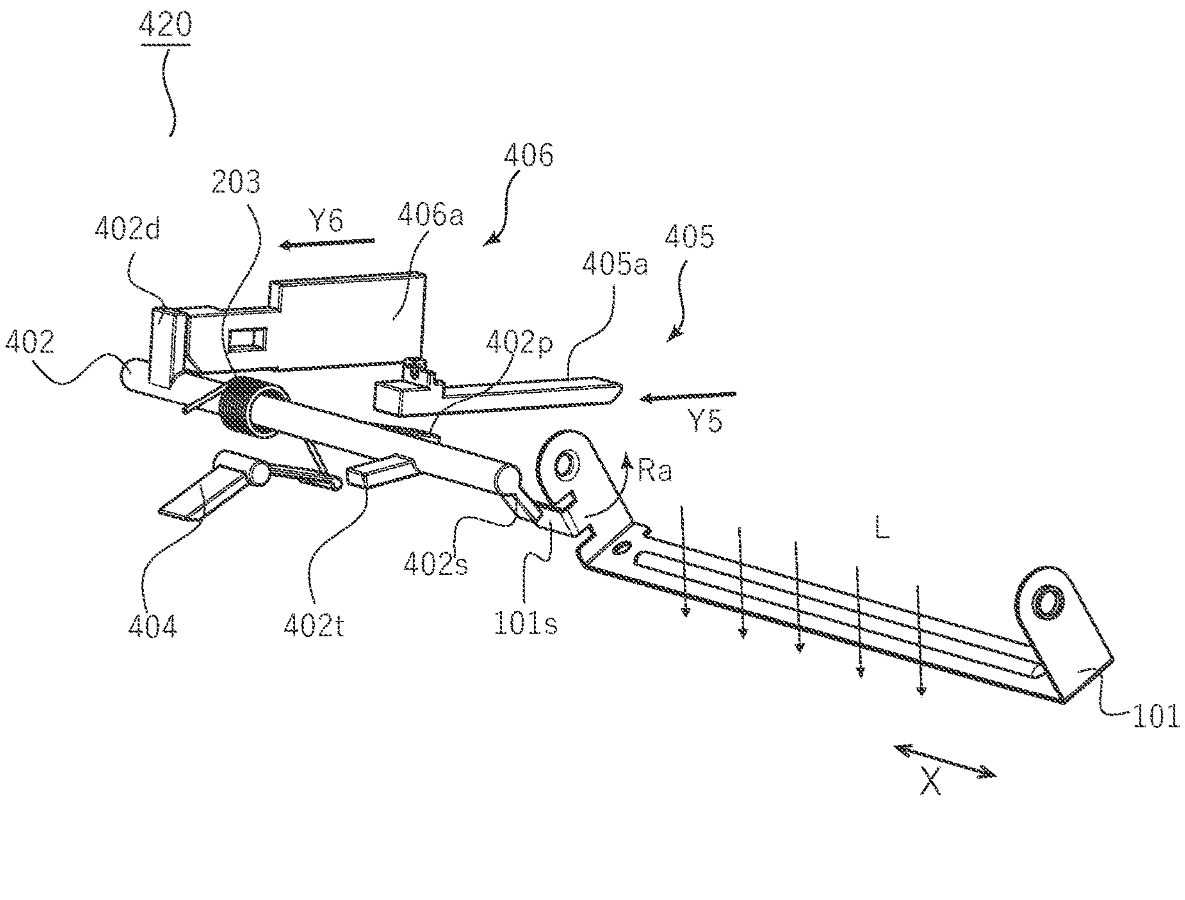
FIG. 16 is a view illustrating the shutter opening/closing mechanism according to the fourth embodiment.

FIG. 13 is a diagram illustrating a state of the apparatus when both the process cartridge 50 and the toner cartridge 60 are not attached to the apparatus body 1 and the door 18 is at the open position. FIG. 14 is a diagram illustrating a state of the apparatus when the process cartridge 50 is attached to the apparatus body 1, the toner cartridge 60 is not attached to the apparatus body 1, and the door 18 is at the open position. FIG. 15 is a diagram illustrating a state of the apparatus when both the process cartridge 50 and the toner cartridge 60 are attached to the apparatus body 1 and the door 18 is at the open position. FIG. 16 is a diagram illustrating a state of the apparatus when both the process cartridge 50 and the toner cartridge 60 are attached to the apparatus body 1 and the door 18 is at the closed position.

Shutter Opening/Closing Member

As illustrated in FIG. 13, the shutter opening/closing member 402 includes a shaft portion **402*a*, a shutter contact portion 402*s*, a P-link pressed portion 402*p*, a T-link pressed portion 402*t*, and a D-link pressed portion 402*d***.

The shaft portion **402*a* is a shaft-shaped portion extending along the X direction. The shaft portion 402*a* is rotatably supported in the R9 direction and the opposite direction around an axis extending in the X direction by a holder fixed to the frame body of the apparatus body 1**.

The shutter contact portion **402*s* is a portion that contacts the contacting portion 101*s* of the shutter 101. The P-link pressed portion 402*p* is a portion where the shutter opening/closing member 402 receives a force from the P-link mechanism 404. The T-link pressed portion 402***t* is a portion where the shutter opening/closing member 402 receives a force from the T-link mechanism 405. The D-link pressed portion 402*d* is a portion where the shutter opening/closing member 402 receives a force from the D-link mechanism 206. The functions of the pressed portions and the shutter contact portion 402*s* will be described later.

In the fourth embodiment, the shutter opening/closing member 402 is movable to the following four positions.

First position: a position where neither the process cartridge 50 nor the toner cartridge 60 is attached to the apparatus body 1 and the door 18 is in the open position (FIG. 13).

Second position: a position at which the process cartridge 50 is attached to the apparatus body 1, the toner cartridge 60 is not attached to the apparatus body 1, and the door 18 is at the open position (FIG. 14).

Third position: a position at which both the process cartridge 50 and the toner cartridge 60 are attached to the apparatus body 1 and the door 18 is in the open position (FIG. 15).

Fourth position: a position at which both the process cartridge 50 and the toner cartridge 60 are attached to the apparatus body 1 and the door 18 is in the closed position (FIG. 16).

The shutter opening/closing member 402 is configured to move from the first position to the fourth position through the second position and the third position when the door 18 is closed after the process cartridge 50 and the toner cartridge 60 are attached to the apparatus body 1 in this order. The shutter opening/closing member 402 moves the shutter 101 from the blocking position to the non-blocking position when moving from the third position to the fourth position. When the shutter opening/closing member 402 is positioned at the fourth position, the shutter 101 is held at the non-blocking position. When the shutter opening/closing member 402 is at a position other than the fourth position, the shutter 101 is configured to remain at the blocking position as in the first embodiment.

The first position, the second position, the third position, and the fourth position have different rotation angles of the shutter opening/closing member 202. When the shutter opening/closing member 402 rotates in the R9 direction from the first position, the shutter opening/closing member 402 reaches the fourth position via the second position and the third position.

The shutter opening/closing member 402 is urged by the torsion coil spring 203 in a direction opposite to the rotation direction (R9 direction) from the fourth position to the first position.

P-Link Mechanism

The P-link mechanism 404 interlocked with attachment and detachment of the process cartridge 50 will be described mainly with reference to FIGS. 13 and 14.

As illustrated in FIG. 13, the P-link mechanism 404 includes a P-lever 404*b*. The P-lever 404*b* is configured to move by being brought into contact with a part of the process cartridge 50 to press the shutter opening/closing member 402. Note that the P-flap 104*a* (FIG. 2B) similar to that of the first embodiment may be added, and when the P-flap 104*a* comes into contact with a part of the process cartridge 50 and moves, the P-lever 404*b* may be pressed by the P-flap 104*a* and move.

The P-lever 404*b* has a shaft portion rotatably supported by a holder fixed to the frame body of the apparatus body 1, and a contacting portion (first contacting portion) brought into contact with a part of the process cartridge 50. In addition, the P-lever 404*b* has a pressing portion (first pressing portion) capable of pressing the P-link pressed portion 402*p* of the shutter opening/closing member 402. The P-lever 404*b* is rotatable about the shaft portion. The P-lever 404*b* of the present embodiment rotates about an axis extending substantially in the X direction.

The operation of the P-link mechanism 404 when the process cartridge 50 is attached to the apparatus body 1 will be described.

In FIG. 13, the process cartridge 50 and the toner cartridge 60 are not attached to the apparatus body 1, and the door 18 is positioned at the open position. In this case, the shutter opening/closing member 402 is positioned at the first position, and the P-lever 404*b* is not in contact with the P-link pressed portion 402*p* of the shutter opening/closing member 402. Further, since the shutter opening/closing member 402 is positioned at the first position, the shutter 101 is positioned at the blocking position.

As illustrated in FIG. 14, in the process of attaching the process cartridge 50 to the apparatus body 1, a part of the process cartridge 50 comes into contact with the P-lever 404*b*, and the P-lever 404*b* is rotated in the R10 direction (FIG. 13). Then, the pressing portion of the P-lever 404*b* presses the P-link pressed portion 402*p* of the shutter opening/closing member 402, and rotates the shutter opening/closing member 402 in the R9 direction against the urging force of the torsion coil spring 203. As a result, the shutter opening/closing member 402 moves from the first position to the second position.

That is, the P-link mechanism 404 moves the shutter opening/closing member 402 from the first position to the second position in an interlocking manner with the attachment of the process cartridge 50 to the apparatus body 1.

In the process in which the shutter opening/closing member 402 moves from the first position to the second position, the shutter contact portion 402*s* of the shutter opening/closing member 402 does not come into contact with the contacting portion 101*s* of the shutter 101. Therefore, the shutter 101 remains at the blocking position at which the laser beam L is blocked (FIG. 14).

In addition, as the shutter opening/closing member 402 moves (rotates) from the first position (FIG. 13) to the second position (FIG. 14), the T-link pressed portion 402*t* of the shutter opening/closing member 402 moves to a position where the T-link mechanism 405 can come into contact with the T-slider 405*a*.

Note that when the process cartridge 50 is removed from the apparatus body 1 in the state of FIG. 14, the shutter opening/closing member 402 moves from the second position to the first position in a process opposite to the above-described operation.

T-Link Mechanism

The T-link mechanism 405 interlocked with attachment and detachment of the toner cartridge 60 will be described mainly with reference to FIGS. 14 and 15.

As illustrated in FIG. 14, the T-link mechanism 405 includes a T-slider 405*a*. The T-slider 405*a* moves by being brought into contact with a part of the toner cartridge 60, and is configured to press the shutter opening/closing member 402. Note that the T-flap 105*g* (FIG. 4B) similar to that of the first embodiment may be added, and the T-slider 405*a* may be pressed by the T-flap 105*g* and moved when the T-flap 105*g* comes into contact with a part of the toner cartridge 60 and moves.

The T-slider 405*a* includes a contacting portion (second contacting portion) brought into contact with a part of the toner cartridge 60 and a pressing portion (second pressing portion) capable of pressing the T-link pressed portion 402*t* of the shutter opening/closing member 402. The T-slider 405*a* is movably supported in the Y5 direction and the opposite direction by a holder fixed to the frame body of the apparatus body 1. The Y5 direction is a direction intersecting (preferably orthogonal to) the X direction. The T-slider 405*a* is urged in the opposite direction of the Y5 direction by a tension spring.

The operation of the T-link mechanism 405 when the toner cartridge 60 is attached to the apparatus body 1 will be described.

In FIG. 14, the process cartridge 50 is attached to the apparatus body 1, the toner cartridge 60 is not attached to the apparatus body 1, and the door 18 is positioned at the open position. In this case, the shutter opening/closing member 402 is positioned at the second position, and the pressing portion of the T-slider 405*a* is not in contact with the T-link pressed portion 402*t* of the shutter opening/closing member 402.

As illustrated in FIG. 15, in the process of attaching the toner cartridge 60 to the apparatus body 1, a part of the toner cartridge 60 comes into contact with the contacting portion of the T-slider 405*a*, and moves the T-slider 405*a* in the Y5 direction. Then, the pressing portion of the T-slider 405*a* comes into contact with the T-link pressed portion 402*t* of the shutter opening/closing member 402, and rotates the shutter opening/closing member 402 in the R9 direction against the urging force of the torsion coil spring 203. As a result, the shutter opening/closing member 402 moves from the second position to the third position.

That is, the T-link mechanism 405 moves the shutter opening/closing member 402 from the second position to the third position in an interlocking manner with the attachment of the toner cartridge 60 to the apparatus body 1.

While the shutter opening/closing member 402 moves from the second position to the third position, the shutter contact portion 402*s* of the shutter opening/closing member 402 does not come into contact with the contacting portion 101*s* of the shutter 101. Therefore, the shutter 101 remains at the blocking position at which the laser beam L is blocked (FIG. 15).

In addition, as the shutter opening/closing member 402 moves (rotates) from the second position (FIG. 14) to the third position (FIG. 15), the D-link pressed portion 402*d* of the shutter opening/closing member 402 moves to a position where the D-link mechanism 406 can come into contact with the D-slider 406*a*.

When the toner cartridge 60 is removed from the apparatus body 1 in the state of FIG. 15, the shutter opening/closing member 402 moves from the third position to the second position in a process opposite to the above-described operation.

D-Link Mechanism

The D-link mechanism 406 interlocked with opening and closing of the door 18 will be described mainly with reference to FIGS. 15 and 16.

As illustrated in FIG. 15, the D-link mechanism 406 includes a D-slider 406*a*. The D-slider 406*a* moves in an interlocking manner with movement of the door 18 (FIG. 1) and presses the shutter opening/closing member 402. Note that the D-slider 406*a* may be directly connected (coupled) to the door 18, or may be connected (coupled) to the door 18 via, for example, the D-rod 106*c* (FIG. 2A) of the first embodiment.

The D-slider 406*a* has a pressing portion (third pressing portion) capable of pressing the D-link pressed portion 402*d* of the shutter opening/closing member 402. The D-slider 406*a* is movably supported in the Y6 direction and the opposite direction by a holder fixed to the apparatus body 1. The Y6 direction is a direction intersecting (preferably orthogonal to) the X direction. The Y6 direction is not necessarily parallel to the Y5 direction (the moving direction of the T-slider 405*a*).

The operation of the D-link mechanism 406 when the door 18 is closed will be described.

In FIG. 15, the process cartridge 50 and the toner cartridge 60 are attached to the apparatus body 1, and the door 18 is positioned at the open position. In this case, the shutter opening/closing member 402 is positioned at the third position, and the D-slider 406*a* is not in contact with the D-link pressed portion 402*d* of the shutter opening/closing member 202.

As illustrated in FIG. 16, as the door 18 moves from the open position to the closed position, the D-slider 406*a* moves in the Y6 direction. Then, the pressing portion of the D-slider 406*a* comes into contact with the D-link pressed portion 402*d* of the shutter opening/closing member 402, and the shutter opening/closing member 402 is rotated in the R9 direction against the urging force of the torsion coil spring 203 (FIG. 15). As a result, the shutter opening/closing member 402 moves from the third position to the fourth position.

That is, the D-link mechanism 406 moves the shutter opening/closing member 402 from the third position to the fourth position in an interlocking manner with the movement of the door 18 from the open position to the closed position.

In the process in which the shutter opening/closing member 402 moves from the third position to the fourth position, the shutter contact portion 402*s* of the shutter opening/closing member 402 comes into contact with the contacting portion 101*s* of the shutter 101, and the shutter opening/closing member 402 is rotated in the Ra direction of FIG. 16. As a result, the shutter 101 moves from the blocking position to the non-blocking position, and the optical path of the laser beam L is opened (FIG. 16).

When the door 18 is moved from the closed position to the open position in the state of FIG. 16, the shutter opening/closing member 402 moves from the fourth position to the third position in a process opposite to the above-described operation.

Case where Door is Closed without Attaching Toner Cartridge

Next, an operation of the shutter opening/closing mechanism 420 when the door 18 is moved from the open position to the closed position in a state where the process cartridge 50 is attached to the apparatus body 1 and the toner cartridge 60 is not attached to the apparatus body 1 will be described.

In this case, as illustrated in FIG. 14, in a state where the shutter opening/closing member 402 is positioned at the second position, the D-slider 406*a* moves in the Y6 direction in an interlocking manner with the movement of the door 18 from the open position to the closed position. However, in a state where the shutter opening/closing member 402 is positioned at the second position, the D-link pressed portion 402*d* of the shutter opening/closing member 402 is separated from the pressing portion of the D-slider 406*a* in the direction orthogonal to the Y6 direction as viewed in the X direction. Therefore, even if the door 18 is moved from the open position to the closed position, the pressing portion of the D-slider 406*a* does not come into contact with the D-link pressed portion 402*d* of the shutter opening/closing member 402, and the shutter opening/closing member 402 remains at the second position.

That is, when the door 18 is moved from the open position to the closed position in a state where the process cartridge 50 is attached to the apparatus body 1 and the toner cartridge 60 is not attached to the apparatus body 1, the shutter opening/closing member 402 remains at the second position. Since the shutter opening/closing member 202 remains at the fourth position, the shutter 101 is maintained at the blocking position.

Case where Door is Closed without Attaching Process Cartridge

Next, an operation of the shutter opening/closing mechanism 220 when the door 18 is moved from the open position to the closed position in a state where the process cartridge 50 is not attached to the apparatus body 1 and the toner cartridge 60 is attached to the apparatus body 1 will be described.

In this case, as illustrated in FIG. 13, in a state where the shutter opening/closing member 402 is positioned at the first position, the T-slider 405*a* moves in the Y5 direction in an interlocking manner with the attachment of the toner cartridge 60. However, in a state where the shutter opening/closing member 402 is positioned at the first position, the T-link pressed portion 402*t* is positioned away from the pressing portion of the T-slider 405*a* in the direction orthogonal to the Y5 direction when viewed in the X direction. Therefore, even if the T-slider 405*a* moves in the Y5 direction, the pressing portion does not come into contact with the T-link pressed portion 202*t*. That is, even when the toner cartridge 60 is attached in a state where the process cartridge 50 is not attached to the apparatus body 1, the shutter opening/closing member 402 remains at the first position.

In the state where the shutter opening/closing member 402 is positioned at the first position, the D-link pressed portion 402*d* is positioned away from the pressing portion of the D-slider 406*a* in the direction orthogonal to the Y6 direction when viewed in the X direction. Therefore, even if the D-slider 406*a* moves in the Y6 direction in an interlocking manner with the movement of the door 18 from the open position to the closed position, the pressing portion does not come into contact with the D-link pressed portion 402*d*, and the shutter opening/closing member 402 remains at the first position.

That is, when the door 18 is moved from the open position to the closed position in a state where the process cartridge 50 is not attached to the apparatus body 1 and the toner cartridge 60 is attached to the apparatus body 1, the shutter opening/closing member 402 remains at the first position. Since the shutter opening/closing member 402 remains at the first position, the shutter 101 is maintained at the blocking position.

Case where Door is Closed without Attaching Both Cartridges

Next, an operation of the shutter opening/closing mechanism 420 when the door 18 is moved from the open position to the closed position in a state where both the process cartridge 50 and the toner cartridge 60 are not attached to the apparatus body 1 will be described.

In this case, as illustrated in FIG. 13, in a state where the shutter opening/closing member 402 is positioned at the first position, the D-slider 406*a* moves in the Y6 direction in an interlocking manner with the movement of the door 18 from the open position to the closed position. However, in a state where the shutter opening/closing member 402 is positioned at the first position, the D-link pressed portion 402*d* is positioned away from the pressing portion of the D-slider 406*a* in the direction orthogonal to the Y6 direction when viewed in the X direction. Therefore, even if the D-slider 406*a* moves in the Y4 direction, the pressing portion does not come into contact with the D-link pressed portion 202*d*, and the shutter opening/closing member 402 remains at the first position.

That is, when the door 18 is moved from the open position to the closed position in a state where both the process cartridge 50 and the toner cartridge 60 are not attached to the apparatus body 1, the shutter opening/closing member 402 remains at the first position. Since the shutter opening/closing member 402 remains at the first position, the shutter 101 is maintained at the blocking position.

Summary of Present Embodiment

As described above, when both the process cartridge 50 and the toner cartridge 60 are attached to the apparatus body 1 and the door 18 is at the closed position, the shutter opening/closing mechanism 420 according to the present embodiment positions the shutter 101 at the non-blocking position. In each of a case where the process cartridge 50 is not attached to the apparatus body 1, a case where the toner cartridge 60 is not attached to the apparatus body 1, and a case where the door 18 is at the open position, the shutter 101 is positioned at the blocking position.

In other words, in the interlocking mechanism of the present embodiment, the shutter member is positioned at the non-blocking position in a state where the first unit and the second unit are attached to the apparatus body and the opening/closing member is positioned at the closed position. In each of the case where the first unit is not attached to the apparatus body, the case where the second unit is not attached to the apparatus body, and the case where the opening/closing member is positioned at the open position, the shutter member is positioned at the blocking position.

With this configuration, in the configuration in which the two units (50, 60) are attachable to and detachable from the apparatus body 1, even if the opening/closing member is closed in a state where any of the units is not attached, the possibility that the laser beam leaks to the outside of the image forming apparatus can be reduced.

Further, in the present embodiment, the above-described position control of the shutter 101 is realized by the shutter opening/closing mechanism 420 interlocked with the process cartridge 50, the toner cartridge 60, and the door 18. Therefore, it is possible to reduce the possibility that the laser beam leaks to the outside of the printer P while reducing the number of electric components as compared with a configuration using a plurality of interlock switches.

In the present embodiment, the P-link mechanism 404 rotates the shutter opening/closing member 102 so as to approach a predetermined position (third position) in the rotation direction (R9 direction) in an interlocking manner with the attachment of the process cartridge 50 to the apparatus body 1. The T-link mechanism 405 rotates the shutter opening/closing member 102 so as to approach a predetermined position (third position) in the rotation direction (R9 direction) in an interlocking manner with the attachment of the toner cartridge 60 to the apparatus body 1. In other words, the first interlocking portion rotates the moving member in a direction approaching the predetermined position in the rotation direction in an interlocking manner with attachment of the first unit to the apparatus body. The second interlocking portion rotates the moving member in a direction approaching a predetermined position in the rotation direction in an interlocking manner with attachment of the second unit to the apparatus body.

This makes it possible to reduce the possibility that the laser beam leaks to the outside with a relatively simple configuration.

Fifth Embodiment

A fifth embodiment will be described. Hereinafter, elements denoted with the same reference numerals as those in the first embodiment will have substantially the same configurations and functions as those described in the first embodiment unless otherwise specified, and portions different from those in the first embodiment will be mainly described.

In the present embodiment, a method of detecting the attachment state of the process cartridge 50 and the toner cartridge 60 in the printer P including the shutter opening/closing mechanism according to any one of the first to fourth embodiments will be described.

As a method of detecting the attachment state of the cartridge on the apparatus body 1, a detection method based on whether or not the photosensitive drum 11 in the cartridge is irradiated with laser beam from the laser scanner 90 can be considered. However, in each of the above-described embodiments, the shutter 101 is allowed to take the non-blocking position only when both the process cartridge 50 and the toner cartridge 60 are attached. Therefore, in each of the above-described embodiments, the detection method using laser beam can only determine whether or not both the process cartridge 50 and the toner cartridge 60 are attached, and it is not possible to determine whether or not each cartridge is attached.

Therefore, in the fifth embodiment, a configuration in which the attachment state of each of the process cartridge 50 and the toner cartridge 60 can be detected without using laser beam will be described.

Figure 17A:
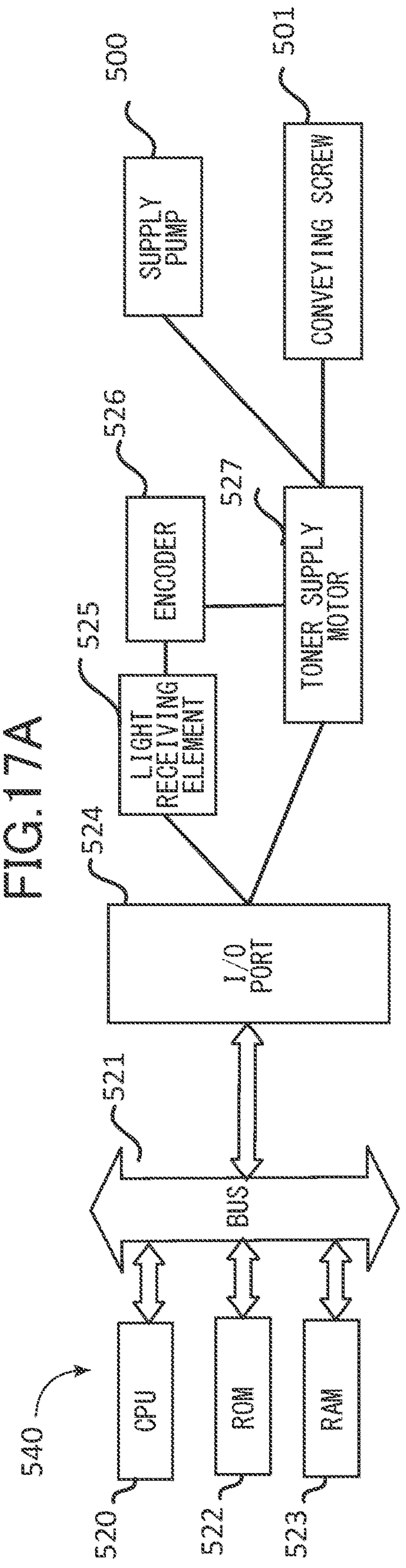
FIG. 17A is a diagram illustrating a hardware configuration of a printer according to a fifth embodiment.

FIG. 17A is a diagram illustrating a hardware configuration of a printer P according to the fifth embodiment. The printer P includes the control unit 540 described above. The control unit 540 includes a CPU 520, a ROM 522, a RAM 523, and an I/O port 524. The CPU 520 is an example of a processor capable of executing a program for controlling the printer P, and the ROM 522 is an example of a non-transitory storage medium readable by a computer storing the program.

The CPU 520 is communicably connected to the ROM 522, the RAM 523, and the I/O port 524 via a communication bus 521. The CPU 520 executes the program stored in the ROM 522, and stores a calculation result at the time of execution in the RAM 523. Further, the CPU 520 monitors the input result of the sensor input circuit via the I/O port 524 based on the program stored in the ROM 522. The CPU 520 controls the operation of each unit of the printer P by operating the driving circuit of each actuator included in the printer P according to the monitoring result.

In the apparatus body 1 of the printer P, a toner supply motor 527 is disposed as an example of an actuator. The toner supply motor 527 is a driving source that drives the supply pump 500 and the conveying screw 501 in the toner cartridge 60. The toner supply motor 527 can be driven in a first driving direction (hereinafter, referred to as forward rotation) and a second driving direction (hereinafter, referred to as reverse rotation) opposite thereto.

In addition, the apparatus body 1 of the printer P includes an encoder 526 and a light receiving element 525 as a detection unit that detects an amount (driving amount) related to the driving of the toner supply motor 527. The encoder 526 is an incremental encoder disk and rotates integrally with a rotor of the toner supply motor 527. The light receiving element 525 is a light receiving unit of a photocoupler capable of detecting an optical pattern on the encoder 526. The light receiving element 525 outputs a signal corresponding to a state of transmission/blocking of light that changes according to the rotation angle of the encoder 526. The CPU 520 can acquire the rotational speed and the driving amount of the toner supply motor 527 based on the signal of the light receiving element 525.

Figure 18A:
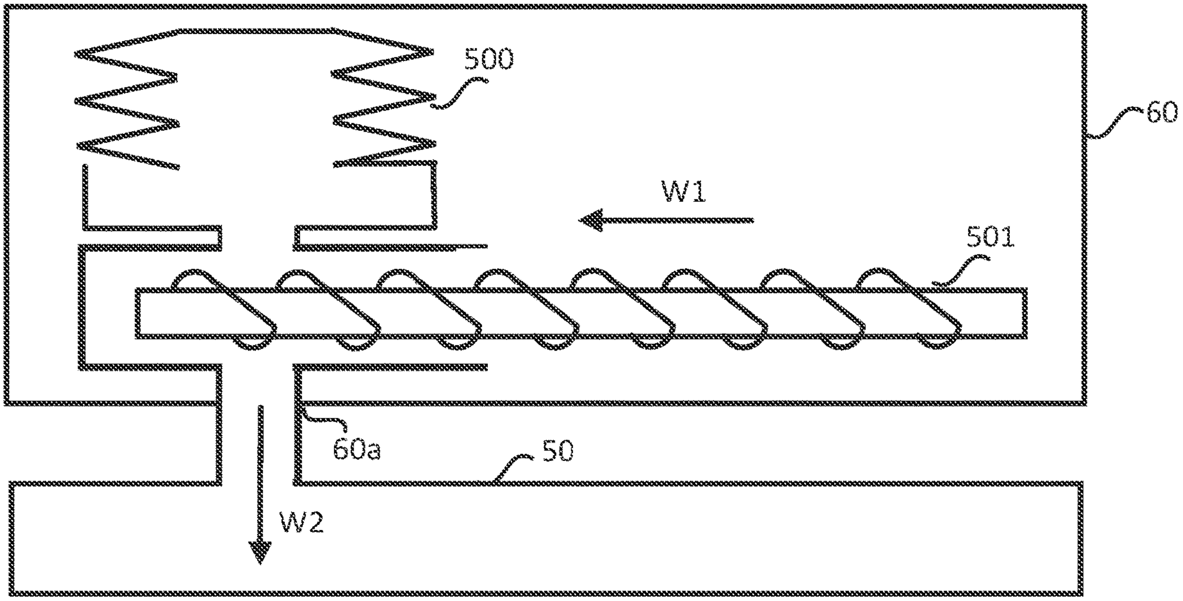
FIG. 18A is a diagram for explaining a supply mechanism of a toner cartridge according to the fifth embodiment.
Figure 18B:
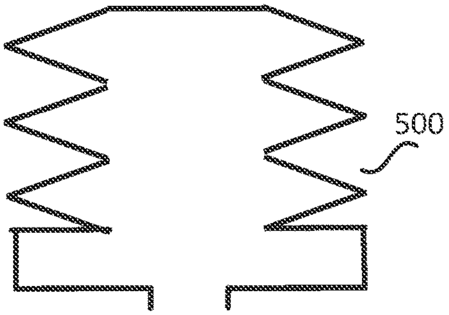
FIG. 18B is a diagram for explaining the supply mechanism of the toner cartridge according to the fifth embodiment.
Figure 18C:
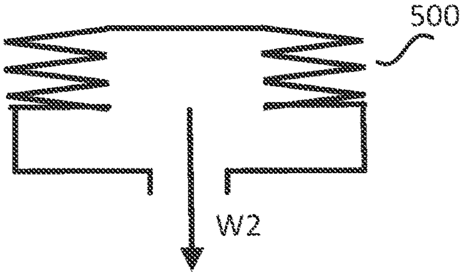
FIG. 18C is a diagram for explaining the supply mechanism of the toner cartridge according to the fifth embodiment.

A configuration related to toner supply from the toner cartridge 60 to the process cartridge 50 will be described with reference to FIGS. 18A to 18C. FIG. 18A is a schematic diagram illustrating an internal configuration of the toner cartridge 60. FIGS. 18B and 18C are schematic diagrams for explaining the operation of the supply pump 500.

Inside the toner cartridge 60 of the present embodiment, a supply pump 500 (pump) that can expand and contract, and a conveying screw 501 are provided. When the toner supply motor 527 is driven to rotate forward, the conveying screw 501 is driven to rotate and convey the toner in the toner cartridge 60 in the W1 direction. The W1 direction is a direction toward the discharge port 60*a* of the toner cartridge 60. In addition, the forward rotation driving of the toner supply motor 527 switches the supply pump 500 between the extended state of FIG. 18B and the compressed state of FIG. 18C. In the process of changing the supply pump 500 from the extended state to the compressed state, the toner is conveyed in the W2 direction of FIG. 18A by the air blown out from the supply pump 500, and is supplied from the toner cartridge 60 to the process cartridge 50.

When the control unit 540 detects the attachment state of the toner cartridge 60, the toner supply motor 527 is reversely driven. When the toner supply motor 527 is reversely driven, the supply pump 500 is driven so as to alternately repeat the extended state in FIG. 18B and the compressed state in FIG. 18C. However, since the conveying screw 501 conveys the toner to the side opposite to the W1 direction when the toner supply motor 527 is reversely driven, the toner is not sent to the discharge port 60*a* even if the reversely driving is continued.

Figure 17B:
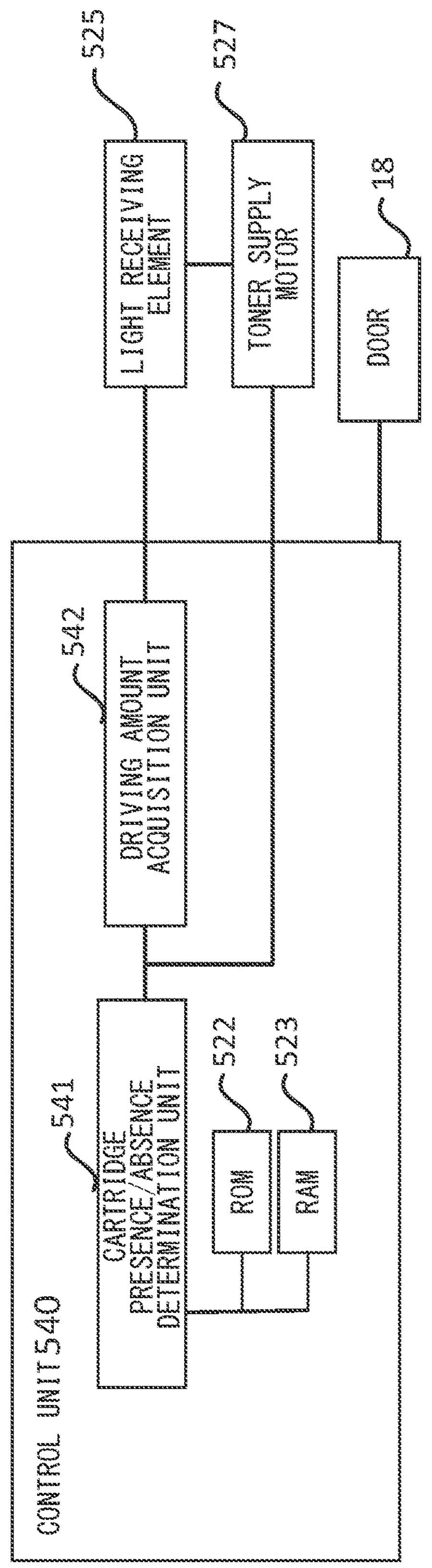
FIG. 17B is a control block diagram according to the fifth embodiment.

A configuration related to control of the present embodiment will be described with reference to FIG. 17B. The control unit 540 of the printer P includes a cartridge presence/absence determination unit 541, a driving amount acquisition unit 542, a ROM 522, and a RAM 523. The CPU 520 can function as the cartridge presence/absence determination unit 541 and the driving amount acquisition unit 542 by the program stored in the ROM 522. The driving amount acquisition unit 542 acquires the rotational speed of the toner supply motor 527 based on the time required for the change of the output signal of the light receiving element 525 as the amount (driving amount) related to the driving of the toner supply motor 527. The cartridge presence/absence determination unit 541 determines whether the toner cartridge 60 is attached using the rotational speed of the toner supply motor 527 obtained by the driving amount acquisition unit 542 and the determination condition stored in the ROM 522.

Figure 19:
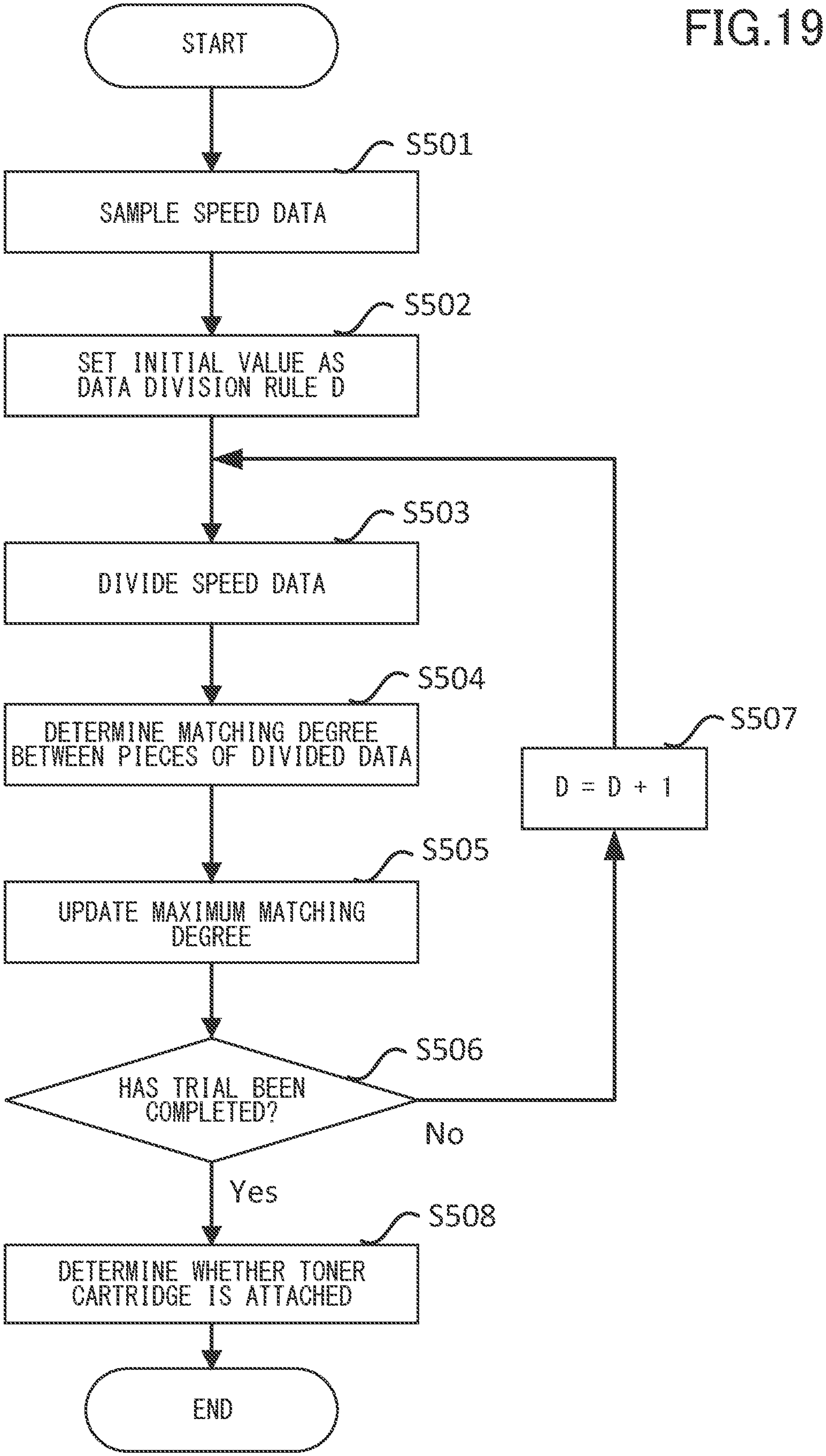
FIG. 19 is a flowchart illustrating a control method according to the fifth embodiment.

FIG. 19 is a flowchart in which the cartridge presence/absence determination unit 541 according to the present embodiment determines the attachment state of the toner cartridge 60. In a case where it is determined that there is a possibility that the attachment state of the toner cartridge 60 has changed, the control unit 540 instructs the cartridge presence/absence determination unit 541 to start the processing flow of FIG. 19. The case where there is a possibility that the attachment state of the toner cartridge 60 has changed is, for example, a case where it is detected based on the opening/closing sensor of the door 18 that the door 18 has changed from the opened state to the closed state.

In a case where the supply pump 500 is provided in the driving train of the toner supply motor 527, the load torque of the toner supply motor 527 greatly fluctuates at the timing when the movement of the supply pump 500 is switched from compression to extension and the timing when the extension is switched to compression. Therefore, the load torque of the toner supply motor 527 changes in a driving cycle corresponding to the expansion and compression cycles of the supply pump 500, and the rotational speed of the toner supply motor 527 periodically changes. When the toner cartridge 60 is not attached, the rotational speed of the toner supply motor 527 does not change in the driving cycle corresponding to the expansion and compression cycles of the supply pump 500. Using this property, in the following flowchart, it is determined that the toner cartridge 60 is attached when the speed data sampled in S501 has a fluctuation cycle in a range (T5 or more and T6 or less) set in advance as the characteristics of the toner supply motor 527.

Figure 20A:
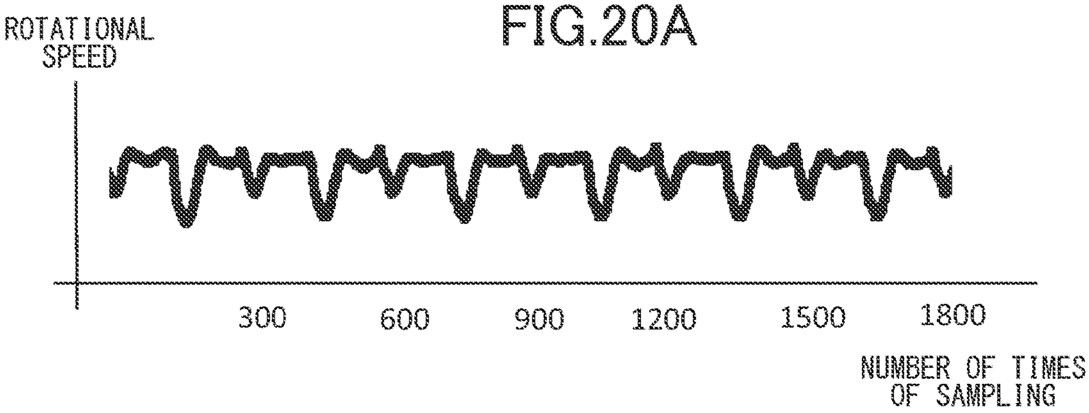
FIG. 20A is a diagram for explaining data processing according to the fifth embodiment.

The cartridge presence/absence determination unit 541 samples the speed data of the toner supply motor 527 in a state where the toner supply motor 527 is reversely driven in S501. Specifically, the cartridge presence/absence determination unit 541 stores the value of the rotational speed acquired by the driving amount acquisition unit 542 in the RAM 523 in time series every time the output signal of the light receiving element 525 changes from the output value in the light blocking state to the output value in the transmission state from the time point when T1 hours have elapsed from the start of driving. When the value of the rotational speed is stored T2 times, the cartridge presence/absence determination unit 541 stops the storage in the RAM 523 and stops the driving of the toner supply motor 527. The speed of the toner supply motor 527 stored in the RAM 523 can be expressed by the number of changes in the output signal of the light receiving element 525 on the horizontal axis and the rotational speed of the toner supply motor 527 on the vertical axis as illustrated in FIG. 20A.

Figure 20B:
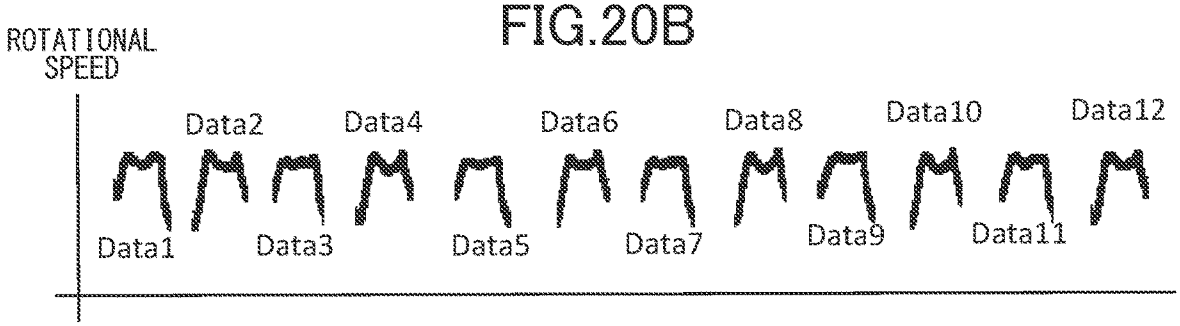
FIG. 20B is a diagram for explaining data processing according to the fifth embodiment.
Figure 20C:
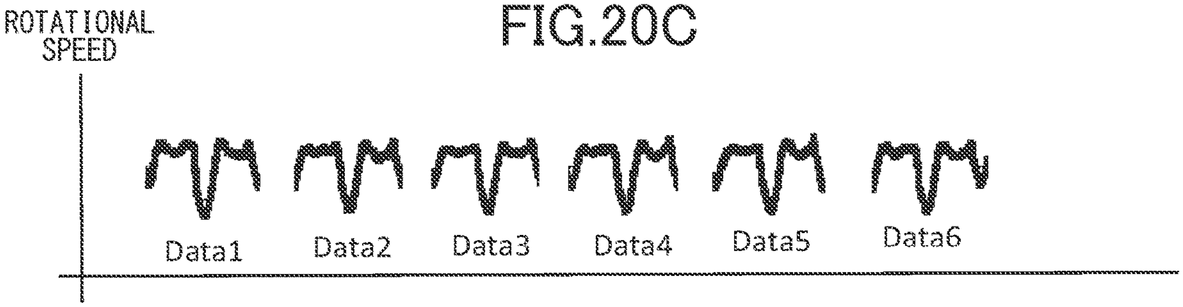
FIG. 20C is a diagram for explaining data processing according to the fifth embodiment.

In S502, the cartridge presence/absence determination unit 541 sets T3 as the data division rule D. In S503, the cartridge presence/absence determination unit 541 divides the data stored in the RAM 523 in S501 into the speed data such that the number of times the output signal of the light receiving element 525 has changed from the output value in the light blocking state to the output value in the transmission state is for each division rule D (data for each set time). The divided data is set as Data1, Data2, Data3, . . . , and DataN. Data1 is data of the first sample to the D-th sample, and Data2 is data of the D+1-th sample to the 2×D-th sample. Examples of the divided data are illustrated in FIGS. 20B and 20C. FIG. 20B illustrates divided data of every 150 samples (D=150), where Data1 is data of the first to 150 samples, and Data2 is data of the 151 to 300 samples. FIG. 20C illustrates divided data of every 300 samples (D=300), where Data1 is data of the first to 300 samples, and Data2 is data of the 301 to 600 samples.

In S504, the cartridge presence/absence determination unit 541 determines a matching degree of each data. The cartridge presence/absence determination unit 541 determines a matching degree between Data1 and Data2 using pattern matching. Similarly, a matching degree between Data2 and Data3, and a matching degree between DataN−1 and DataN are determined. It is assumed that appropriate values of the parameters used for the pattern matching determination are stored in the ROM 522 in advance. The cartridge presence/absence determination unit 541 sets the total value of the obtained matching degrees as the matching degree in the division.

In S505, the cartridge presence/absence determination unit 541 stores the matching degree and the division rule D at that time in the RAM 523. In S506, the cartridge presence/absence determination unit 541 compares the division rule D with T4. When the division rule D is smaller than T4, the process proceeds to S507, and D is increased by 1. Thereafter, the matching degree is similarly obtained in S503 and S504. In S505, the cartridge presence/absence determination unit 541 compares the matching degree stored in the RAM 523 with the matching degree determined in S504. When the matching degree determined in S504 is larger, the matching degree and the division rule stored in the RAM 523 are updated to the matching degree determined in S504 and the division rule D at that time. In a case where D is T4 or more in S506, the process proceeds to S508.

In S508, the cartridge presence/absence determination unit 541 determines whether the division rule D stored in the RAM 523 is T5 or more and T6 or less. When the condition is satisfied, it is determined that the detected driving cycle of the toner supply motor 527 coincides with the driving cycle when the supply pump 500 is in the driving train of the toner supply motor 527, and it is determined that the toner cartridge 60 is attached. When the condition is not satisfied, it is determined that the toner cartridge 60 is not attached.

T1 is a time until the toner supply motor 527 changes from the stopped state to the steady state. In the present embodiment, the time is 500 ms. T2 is the number of times of sampling of data necessary for the cartridge presence/absence determination unit 541 to determine the attachment state of the toner cartridge 60. In the present embodiment, the number of times is set to 1800. T3, T4, T5, and T6 are values based on a theoretical value of the number of times the output signal of the light receiving element 525 changes during one reciprocation of the supply pump 500. In the present embodiment, T3 is set to 150 times, T4 is set to 450 times, T5 is set to 280 times, and T6 is set to 320 times.

As described above, in the present embodiment, the time-series data of the driving amount continuously detected over the predetermined time by the detection unit (525,526) is divided into the data for each set time (D), and the fluctuation cycle is determined based on the matching degree between the data for each set time.

Here, a calculation example of the matching degree will be described. As an example, with respect to the data divided by the division rule D, the matching degree of the data is determined by the sum (type error) of the absolute values of the differences between DataN−1 and DataN. In this case, assuming that the sample data of the nth speed of each Data is Spd_n, the matching degree in the division rule D is obtained by the following (Expression 1).

Expression 1

$$\sum_{i=1}^{T2-D} |Spd_{n+D} - Spd_n|$$

Figure 21:
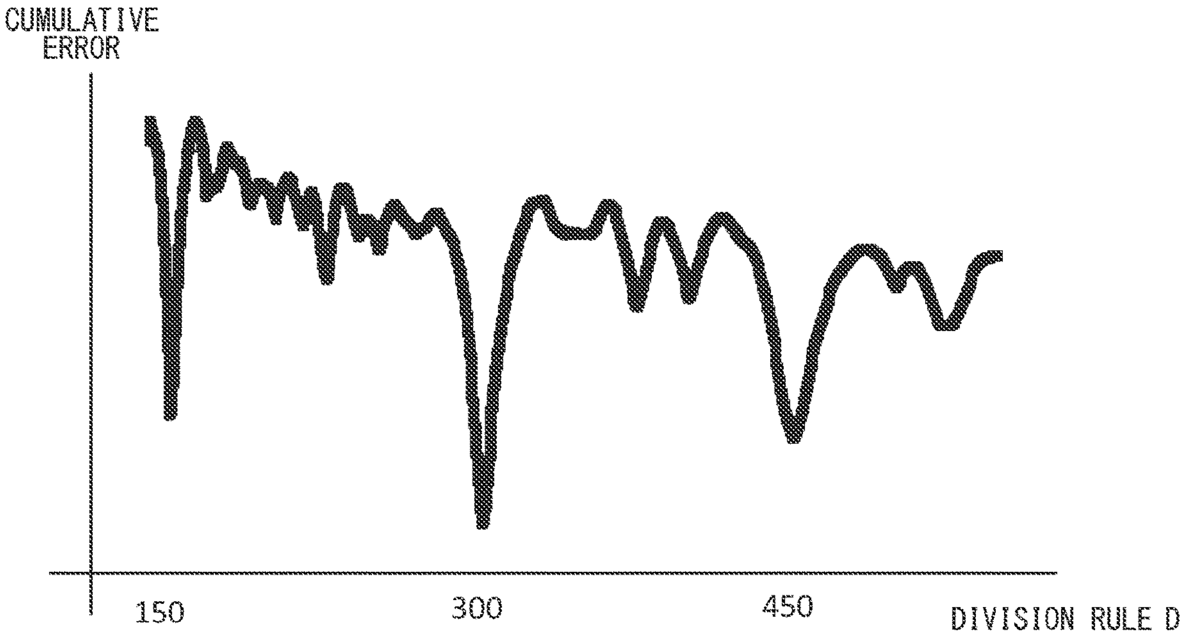
FIG. 21 is a diagram illustrating an example of a data processing result according to the fifth embodiment.

FIG. 21 illustrates an example in which the matching degree of the speed data of FIG. 20A is calculated. In FIG. 21, the horizontal axis represents the division rule D, and the vertical axis represents the calculation result of (Expression 1). Since it can be said that the smaller the difference between the data is, the more similar the data is, the smaller the calculation result of (Expression 1) is, the higher the matching degree is. That is, in FIG. 21, it can be said that the smaller the type error, the higher the matching degree.

It can be seen from FIG. 21 that the matching degree is minimum when the division rule D is 300. That is, in the case of the speed data of FIG. 20A, it can be seen that the speed data of the toner supply motor 527 has periodicity with a period in which the output signal of the light receiving element 525 changes 300 times as a driving cycle.

In a case where T5=280 and T6=320, the division rule with the highest matching degree is T5 or more and T6 or less. In this case, the cartridge presence/absence determination unit 541 determines that the toner cartridge 60 is attached.

In this manner, the cartridge presence/absence determination unit 541 can determine the attachment state of the toner cartridge 60.

When the cartridge presence/absence determination unit 541 determines that the toner cartridge 60 is attached, the control unit 540 subsequently determines the attached state of the process cartridge 50. Since the toner cartridge 60 is attached, the control unit 540 can determine the attached state of the process cartridge 50 based on whether or not the process cartridge 50 is irradiated with laser beam. That is, in a case where the photosensitive drum 11 is irradiated with the laser beam L from the laser scanner 90 in a state where the door 18 is closed, it can be determined that the process cartridge 50 is attached. In addition, in a case where the photosensitive drum 11 is not irradiated with the laser beam L from the laser scanner 90 in a state where the door 18 is closed, it can be determined that the process cartridge 50 is not attached. As a specific means for detecting the attachment state of the process cartridge 50, a known means can be used. For example, in the surface of the photosensitive drum 11, a portion irradiated with the laser beam L is defined as a bright portion, and a portion not irradiated with the laser beam L is defined as a dark portion. The value of the current flowing through the charging roller 12 is different between when the charging roller 12 comes into contact with the bright portion and when the charging roller 12 comes into contact with the dark portion. Therefore, it is possible to detect whether or not a bright portion is formed on the surface of the photosensitive drum 11 (whether or not the process cartridge 50 is attached) based on a change in the value of the current flowing through the charging roller 12.

Furthermore, the control unit 540 notifies the user of the determination result of the attachment state of the cartridge using a notification unit (not illustrated). In a case where the toner cartridge 60 is not attached, since the attachment state of the process cartridge 50 is unknown, the control unit 540 notifies the user of "no toner cartridge". In a case where the toner cartridge 60 is attached but the process cartridge 50 is not attached, the control unit 540 notifies the user of "no process cartridge". In a case where both are attached, the control unit 540 notifies the user of "cartridge present".

As described above, in the present embodiment, the control unit 540 can determine the attachment state of the toner cartridge 60 based on the detection result of the rotational speed of the toner supply motor 527. Furthermore, the attachment state of the toner cartridge 60 and the process cartridge 50 can be determined by combining with an existing method for determining the cartridge attachment state based on whether the cartridge is irradiated with the laser beam. As a result, even in a configuration in which the laser beam L is not emitted unless both the process cartridge 50 and the toner cartridge 60 are attached, it is possible to determine the attachment state of each cartridge and notify the user of the attachment state.

Modified Example

In the fifth embodiment, the configuration in which the attachment state of the toner cartridge 60 is determined using the rotational speed of the toner supply motor 527 as the amount related to the driving of the toner supply motor 527 has been described. However, the attachment state of the toner cartridge 60 may be determined using an amount other than the rotational speed as long as the amount changes depending on the extension and compression of the supply pump 500.

Figure 22A:
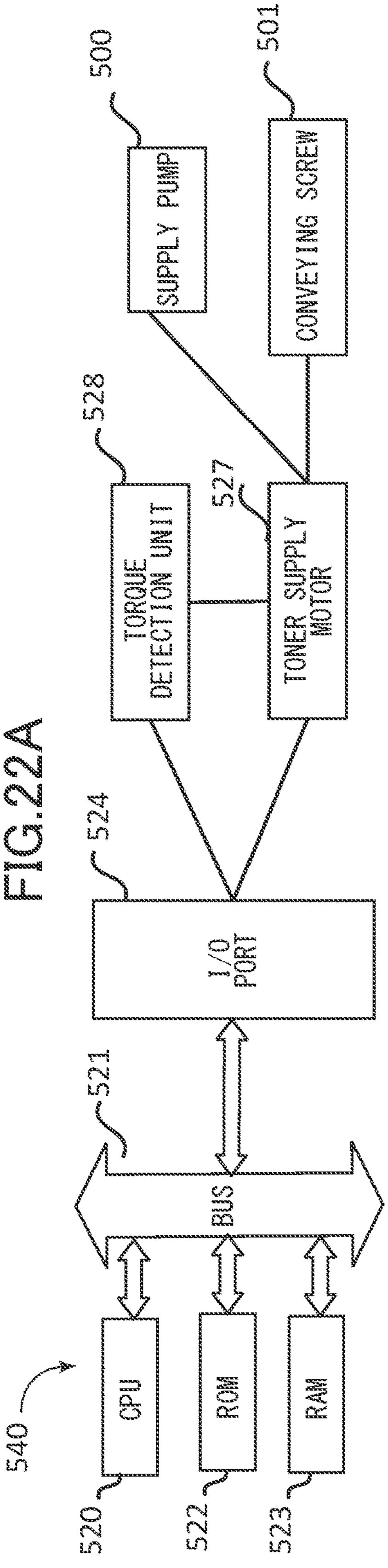
FIG. 22A is a diagram illustrating a hardware configuration of a printer according to a modified example.
Figure 22B:
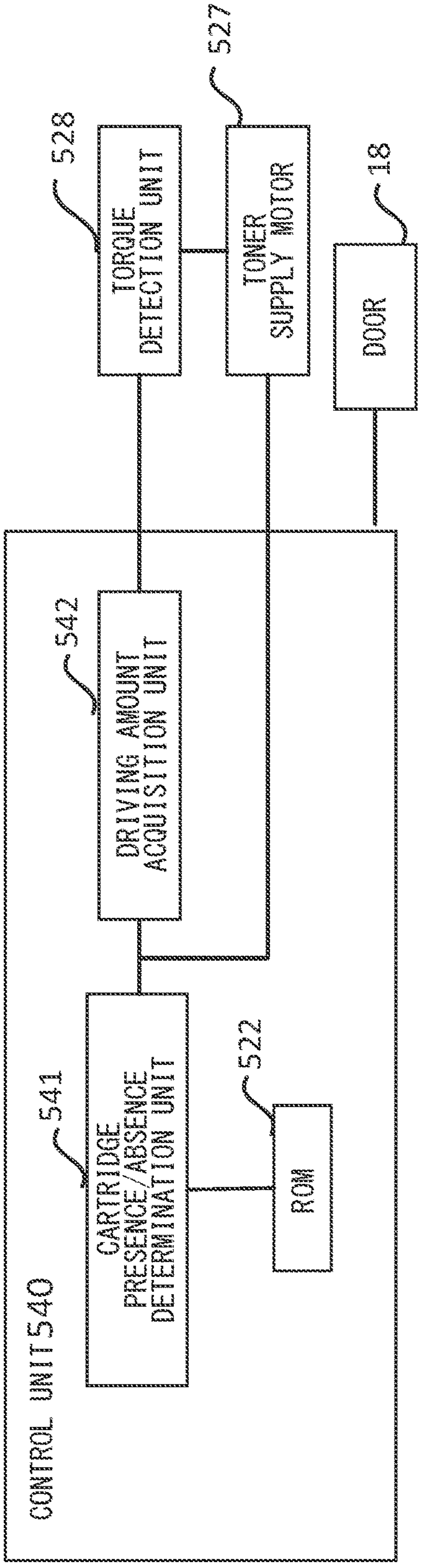
FIG. 22B is a control block diagram according to the modified example.

For example, as illustrated in FIGS. 22A and 22B, a torque detection unit 528 that acquires the load torque of the toner supply motor 527 may be provided. The torque detection unit 528 may be an ammeter circuit that detects a current supplied to the toner supply motor 527. In the case of using the torque detection unit 528, when the toner cartridge 60 is attached, the load torque greatly fluctuates at the timing when the movement of the supply pump 500 is switched from compression to extension and the timing when the extension is switched to compression. Therefore, when the detection results of the torque detection unit 528 are arranged in time series while the toner supply motor 527 is driven, data similar to the speed data of FIGS. 20A to 20C can be obtained.

That is, when the toner cartridge 60 is attached, periodicity appears in the time-series data of the load torque of the toner supply motor 527 at a driving cycle corresponding to one reciprocation of the supply pump 500. Accordingly, the attachment state of the toner cartridge 60 can be determined by dividing the load torque data into data at predetermined time intervals and applying the determination method (S502 to S508 in FIG. 19) using the degree of coincidence similar to that in the fifth embodiment.

In the fifth embodiment, the method for determining the driving cycle of the toner supply motor 527 from the degree of coincidence between the pieces of divided data obtained by dividing the time-series data has been described. A method other than the above may be used as long as the driving cycle can be determined.

For example, time-series data of numerical values related to driving of the toner supply motor 527 may be frequency-resolved by a method such as Fourier transform. In general, an arbitrary function can be converted into a sum of sine functions as in (Expression 2) below.

Expression 2

$$f(x)=\sum \alpha_n \sin\theta_n$$

Here, $a_n$ is the intensity (coefficient) of the nth term, and f(x) is an approximate function of the sampling data acquired in S501.

That is, the frequency having the highest intensity among the frequency components obtained by performing the frequency analysis on the time-series data of the driving amount continuously detected over the predetermined time by the detection unit may be determined as the fluctuation cycle of the driving amount.

Other Modifications

In each of the above-described embodiments, the process cartridge 50 has been described as an example of the "first unit" detachable from the apparatus body 1, and the toner cartridge 60 has been described as an example of the "second unit" detachable from the apparatus body 1. However, the first unit and the second unit may be other units detachable from apparatus body 1.

As a modified example, the drum unit 10 and the developing unit 15 of the process cartridge 50 described in the embodiment can be independently detachable from the apparatus body 1. In this case, the drum unit 10 is an example of a first unit, and the developing unit 15 is an example of a second unit. As another modified example, the second unit may be a waste toner cartridge capable of storing waste toner received from the process cartridge 50.

In addition to the first unit and the second unit, the image forming apparatus may include a unit attachable to and detachable from the apparatus body.

In each of the above-described embodiments, the configuration of the direct transfer system in which the toner image is directly transferred from the photosensitive drum 11 to the sheet S has been exemplified, but the image forming apparatus may be of the intermediate transfer system. The intermediate transfer method is a method in which a toner image is primarily transferred from the photosensitive drum 11 (photosensitive member) to an intermediate transfer member such as an intermediate transfer belt, and then the toner image is secondarily transferred from the intermediate transfer member to the sheet S (recording material).

Furthermore, in each of the above-described embodiments, the configuration in which the image forming apparatus includes only one process cartridge 50 has been exemplified, but the image forming apparatus may include a plurality of process cartridges 50. For example, the color image forming apparatus may be a color image forming apparatus that forms a color image on the sheet S by attaching a plurality of process cartridges 50 containing toners of different colors to the apparatus body 1. In this case, one cartridge of the plurality of process cartridges 50 is an example of a "first unit", and the other cartridge of the plurality of process cartridges 50 is an example of a "second unit".

According to the present disclosure, it is possible to provide an image forming apparatus capable of reducing the possibility of light leakage to the outside.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-025586, filed on Feb. 21, 2023, which is hereby incorporated by reference herein in its entirety.

What is claimed is:

1. An image forming apparatus comprising:

an apparatus body having an opening portion;

an opening/closing member configured to move with respect to the apparatus body between a closed position where the opening/closing member closes the opening portion and an open position where the opening portion is opened;

a first unit that includes a photosensitive member and is configured to be attachable to and detachable from the apparatus body via the opening portion in a state where the opening/closing member is positioned at the open position;

a second unit configured to be attachable to and detachable from the apparatus body via the opening portion in a state where the opening/closing member is positioned at the open position;

an exposure unit provided in the apparatus body and configured to irradiate the photosensitive member with a laser beam to expose the photosensitive member;

a shutter member provided in the apparatus body and configured to move to a blocking position where the shutter member blocks an optical path of the laser beam from the exposure unit toward the photosensitive member and a non-blocking position where the shutter member does not block the optical path; and an interlocking mechanism provided in the apparatus body and configured to operate in an interlocking manner with the first unit, the second unit, and the opening/closing member, wherein the interlocking mechanism is configured to position the shutter member at the non-blocking position in a state where the first unit and the second unit are attached to the apparatus body and the opening/closing member is positioned at the closed position, and wherein the shutter member is configured to be positioned at the blocking position in each of a case where the first unit is not attached to the apparatus body, a case where the second unit is not attached to the apparatus body, and a case where the opening/closing member is positioned at the open position.

2. The image forming apparatus according to claim 1, wherein the interlocking mechanism includes a moving member configured to move the shutter member, a first interlocking portion configured to move the moving member in an interlocking manner with attachment of the first unit to the apparatus body, a second interlocking portion configured to move the moving member in an interlocking manner with attachment of the second unit to the apparatus body, and a third interlocking portion configured to move the moving member in an interlocking manner with movement of the opening/closing member from the open position to the closed position.

3. The image forming apparatus according to claim 2, wherein the moving member includes a force receiving portion configured to receive a force from the third interlocking portion, and wherein in a state where the first unit and the second unit are attached to the apparatus body, the first interlocking portion and the second interlocking portion position the moving member at a predetermined position where the force receiving portion can receive the force from the third interlocking portion in a case where the opening/closing member is moved from the open position to the closed position.

4. The image forming apparatus according to claim 3, wherein the moving member is linearly movable in a first direction and is rotatable in a rotation direction around an axis along the first direction, wherein the first interlocking portion is configured to rotate the moving member to the same position as the predetermined position in the rotation direction in an interlocking manner with attachment of the first unit to the apparatus body, and wherein the second interlocking portion is configured to linearly move the moving member to the same position as the predetermined position in the first direction in an interlocking manner with attachment of the second unit to the apparatus body.

5. The image forming apparatus according to claim 3, wherein the moving member is linearly movable in a first direction and is rotatable in a rotation direction around an axis along the first direction, wherein the first interlocking portion is configured to linearly move the moving member to the same position as the predetermined position in the first direction in an interlocking manner with attachment of the first unit to the apparatus body, and wherein the second interlocking portion is configured to rotate the moving member to the same position as the predetermined position in the rotation direction in an interlocking manner with attachment of the second unit to the apparatus body.

6. The image forming apparatus according to claim 3, wherein the moving member is rotatable in a rotation direction, wherein the first interlocking portion is configured to rotate the moving member in a direction approaching the predetermined position in the rotation direction in an interlocking manner with attachment of the first unit to the apparatus body, and wherein the second interlocking portion is configured to rotate the moving member in the direction approaching the predetermined position in the rotation direction in an interlocking manner with attachment of the second unit to the apparatus body.

7. The image forming apparatus according to claim 2, wherein the interlocking mechanism further includes (i) a first urging member configured to urge the moving member and (ii) a second urging member configured to urge the moving member in a direction different from the first urging member, wherein the first interlocking portion is configured to move the moving member against an urging force of the first urging member in an interlocking manner with attachment of the first unit to the apparatus body, and wherein the second interlocking portion is configured to move the moving member against an urging force of the second urging member in an interlocking manner with attachment of the second unit to the apparatus body.

8. The image forming apparatus according to claim 2, wherein the first interlocking portion includes (i) a first contacting portion configured to come into contact with the first unit and (ii) a first pressing portion configured to press the moving member in a case where the first contacting portion comes into contact with the first unit, wherein the second interlocking portion includes (i) a second contacting portion configured to come into contact with the second unit and (ii) a second pressing portion configured to press the moving member in a case where the second contacting portion comes into contact with the second unit, and wherein the third interlocking portion includes a third pressing portion configured to press the moving member in a case where the opening/closing member is moved from the open position to the closed position.

9. The image forming apparatus according to claim 2, wherein the moving member is configured such that (i) in a case where the first unit and the second unit are not attached to the apparatus body and the opening/closing member is positioned at the open position, the moving member is positioned at a first position, (ii) in a case where the first unit is attached to the apparatus body in a state where the moving member is positioned at the first position, the moving member is moved from the first position to a second position by the first interlocking portion, (iii) in a case where the second unit is attached to the apparatus body in a state where the moving member is positioned at the second position, the moving member is moved from the second position to a third position by the second interlocking portion, (iv) in a case where the opening/closing member is moved from the open position to the closed position in a state where the moving member is positioned at the third position, the moving member is moved from the third position to a fourth position by the third interlocking portion, and (v) the moving member moves the shutter member from the first position to the second position while being moved from the third position to the fourth position.

10. The image forming apparatus according to claim 9, wherein the moving member is configured such that (vi) in a case where the second unit is attached to the apparatus body in a state where the moving member is positioned at the first position, the moving member is moved from the first position to a fifth position by the second interlocking portion, and (vii) in a case where the first unit is attached to the apparatus body in a state where the moving member is positioned at the fifth position, the moving member is moved from the fifth position to the third position by the first interlocking portion.

11. The image forming apparatus according to claim 1, wherein the second unit is a developing unit configured to supply developer to the photosensitive member to develop an electrostatic latent image on the photosensitive member.

12. The image forming apparatus according to claim 1, wherein the first unit includes a cleaning member configured to collect waste toner from the photosensitive member, and wherein the second unit is configured to store the waste toner received from the first unit.

13. The image forming apparatus according to claim 1, wherein the first unit includes a developing unit configured to supply developer to the photosensitive member to develop an electrostatic latent image on the photosensitive member, and wherein the second unit is configured to store developer to be supplied to the developing unit.

14. The image forming apparatus according to claim 13, wherein the second unit includes a supply mechanism configured to supply developer toward the developing unit, and wherein the image forming apparatus further comprises:

a driving source configured to drive the supply mechanism;

a detection unit configured to detect a driving amount of the driving source; and a control unit configured to detect whether the second unit is attached to the apparatus body based on a fluctuation cycle of the driving amount detected by the detection unit.

15. The image forming apparatus according to claim 14, wherein the supply mechanism includes a screw configured to convey toner and a pump configured to expand and contract to discharge the developer to outside of the second unit, wherein the driving source is rotatable in a first driving direction and a second driving direction opposite to the first driving direction, wherein in a case where the driving source rotates in the first driving direction, the pump expands and contracts, and the screw conveys the developer toward a discharge port through which the developer is discharged from the second unit, wherein in a case where the driving source rotates in the second driving direction, the pump expands and contracts, and the screw conveys the developer to a side opposite to the discharge port, and wherein the control unit is configured to detect whether the second unit is attached to the apparatus body based on the fluctuation cycle of the driving amount detected in a state where the driving source is rotating in the second driving direction.

16. The image forming apparatus according to claim 14, wherein the control unit is configured to divide time-series data of the driving amount continuously detected for a predetermined time by the detection unit into data for each set time, and to determine the fluctuation cycle based on a matching degree between the data for each set time.

17. The image forming apparatus according to claim 14, wherein the control unit is configured to determine, as the fluctuation cycle, a frequency having highest intensity among frequency components obtained by performing frequency analysis on time-series data of the driving amount continuously detected by the detection unit for a predetermined time.

18. The image forming apparatus according to claim 14, wherein the detection unit is configured to detect a rotational speed of the driving source.

19. The image forming apparatus according to claim 14, wherein the detection unit is configured to detect a load torque of the driving source.

* * * * *